US012621452B2

(12) United States Patent  
Tsukuba

(10) Patent No.: US 12,621,452 B2  
(45) Date of Patent: May 5, 2026

(54) IMAGE PROCESSING DEVICE AND METHOD

(71) Applicant: Sony Group Corporation, Tokyo (JP)

(72) Inventor: Takeshi Tsukuba, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 58 days.

(21) Appl. No.: 18/951,844

(22) Filed: Nov. 19, 2024

(65) Prior Publication Data

US 2025/0080736 A1 Mar. 6, 2025

Related U.S. Application Data

(63) Continuation of application No. 17/781,732, filed as application No. PCT/JP2020/047338 on Dec. 18, 2020, now Pat. No. 12,177,435.

(Continued)

(51) Int. Cl.  
*H04N 19/124* (2014.01)  
*H04N 19/184* (2014.01)

(Continued)

(52) U.S. Cl.  
CPC ......... *H04N 19/124* (2014.11); *H04N 19/184* (2014.11); *H04N 19/60* (2014.11); *H04N 19/65* (2014.11)

(58) Field of Classification Search  
CPC ................................................... H04N 19/124

(Continued)

(56) References Cited

U.S. PATENT DOCUMENTS

2015/0043641 A1* 2/2015 Gamei ................. H04N 19/136  
 375/240.12  
2017/0318301 A1* 11/2017 Li ........................ H04N 19/186

(Continued)

FOREIGN PATENT DOCUMENTS

CN 104429068 A 3/2015  
KR 20190006953 A 1/2019

OTHER PUBLICATIONS

International Search Report and Written Opinion mailed on Feb. 16, 2021, received for PCT Application No. PCT/JP2020/047338, Filed on Dec. 18, 2020, 8 pages including English Translation.

(Continued)

*Primary Examiner* — Yulin Sun  
(74) *Attorney, Agent, or Firm* — XSENSUS LLP

(57) ABSTRACT

The present disclosure relates to an image processing device and method for enabling control of a value of a quantization parameter within a desired range. A quantization parameter is corrected on the basis of a parameter regarding adaptive color transform and further correcting the quantization parameter on the basis of a parameter regarding transform skip, and coefficient data of an image to be encoded is quantized using a corrected quantization parameter that is the quantization parameter that has been corrected. The present disclosure can be applied to, for example, an image processing device, an image encoding device, an image decoding device, a transmission device, a reception device, a transmission/reception device, an information processing device, an imaging device, a reproduction device, an electronic device, an image processing method, an information processing method, or the like.

14 Claims, 20 Drawing Sheets

| | QP CORRECTION PROCESSING BY TRANSFORM SKIP IS PERFORMED AFTER QP CORRECTION PROCESSING BY ACT IS PERFORMED |
|---|---|
| 1 | IN QP CORRECTION PROCESSING BY TRANSFORM SKIP, QUANTIZATION PARAMETER IS CLIPPED BY TRANSFORM SKIP MINIMUM QP (QpPrimeTsMin) IN CASE OF TRANSFORM SKIP, OR CLIP IS OMITTED IN CASE OF NON-TRANSFORM SKIP |
| 2 | IN QP CORRECTION PROCESSING BY TRANSFORM SKIP, QUANTIZATION PARAMETER IS CLIPPED BY TRANSFORM SKIP MINIMUM QP (QpPrimeTsMin) IN CASE OF TRANSFORM SKIP, OR QUANTIZATION PARAMETER IS CLIPPED BY NON-TRANSFORM SKIP MINIMUM QP (0) IN CASE OF NON-TRANSFORM SKIP |
| 3 | IN QP CORRECTION PROCESSING BY TRANSFORM SKIP IN WHICH CORRECTED QP BY ACT IS CLIPPED BY QP MINIMUM VALUE (0) AND QP MAXIMUM VALUE (63+QpBdOffset), QUANTIZATION PARAMETER IS CLIPPED BY TRANSFORM SKIP MINIMUM QP (QpPrimeTsMin) IN CASE OF TRANSFORM SKIP OR CLIP IS OMITTED IN CASE OF NON-TRANSFORM SKIP |
| 4 | IN QP CORRECTION PROCESSING BY TRANSFORM SKIP, QUANTIZATION PARAMETER IS CLIPPED BY TRANSFORM SKIP MINIMUM QP (QpPrimeTsMin) AND QP MAXIMUM VALUE (63+QpBdOffset) IN CASE OF TRANSFORM SKIP, OR QUANTIZATION PARAMETER IS CLIPPED BY qP MINIMUM VALUE (0) AND QP MAXIMUM VALUE (63+QpBdOffset) IN CASE OF NON-TRANSFORM SKIP |

Related U.S. Application Data

(60) Provisional application No. 62/950,055, filed on Dec. 18, 2019.

(51) Int. Cl.
  *H04N 19/60*          (2014.01)
  *H04N 19/65*          (2014.01)

(58) Field of Classification Search
  USPC ..................................................... 375/240.02
  See application file for complete search history.

(56)              References Cited

U.S. PATENT DOCUMENTS

| | | | |
|---|---|---|---|
| 2018/0084284 A1* | 3/2018 | Rosewarne .......... | H04N 19/124 |
| 2018/0159556 A1* | 6/2018 | Dumchin ........... | H03M 13/6511 |
| 2020/0162735 A1* | 5/2020 | Ueno ................... | H04N 19/124 |

OTHER PUBLICATIONS

Bross et al., "Versatile Video Coding (Draft 7)", JVET-P2001-vE, Joint Video Experts Team (JVET) of ITU-T SG 16 WP 3 and ISO/IEC JTC 1/SC 29/WG 11, Oct. 1-11, 2019, pp. 1-465.

Jung et al., "On QP adjustment in adaptive color transform", Joint Video Experts Team (JVET) of ITU-T SG 16 WP 3 and ISO/IEC JTC 1/SC 29/WG 11, JVET-Q0241-v3, Jan. 7-17, 2020, pp. 1-6.

Chen et al., "Algorithm description for Versatile Video Coding and Test Model 7 (VTM 7)", Joint Video Experts Team (JVET) of ITU-T SG 16 WP 3 and ISO/IEC J1TC 1/SC 29/WG 11, JVET-P2002-v1, Oct. 1-11, 2019, pp. 1-89.

Unno et al., "Clipping of minimum QP prime value", Joint Video Experts Team (JVET) of ITU-T SG 16 WP 3 and ISO/IEC JTC 1/SC 29/WG 11, JVET-Q0142, Jan. 7-17, 2020, pp. 1-4.

Tsukuba et al., "On QP Adjustment for Adaptive Color Transform", Joint Video Experts Team (JVET) of ITU-T SG 16 WP 3 and ISO/IEC JTC 1/SC 29/WG 11, JVET-Q0098-v4, Jan. 7-17, 2020, pp. 1-8.

Nguyen et al., "Non-CE8: Minimum Allowed QP for Transform Skip Mode", Joint Video Experts Team (JVET) of ITU-T SG 16 WP 3 and ISO/IEC JTC 1/SC 29/WG 11, JVET-O0405-v1, Jul. 3-12, 2019, pp. 1-4.

Xiu et al., "Support of adaptive color transform for 444 video coding in VVC", Joint Video Experts Team (JVET) of ITU-TSG 16 WP 3 and ISO/IEC JTC 1/SC 29/WG 11, JVET-P0517_r1, Oct. 1-11, 2019, pp. 1-4.

ITU-T, "Advanced video coding for generic audiovisual services", Telecommunication Standardization Sector of Itu, H.264, Apr. 2017,. 812 pages.

ITU-T, "High efficiency video coding", Telecommunication Standardization Sector of ITU, H.265, Apr. 2017,. 664 pages.

* cited by examiner

FIG. 1

| | QP CORRECTION PROCESSING BY TRANSFORM SKIP IS PERFORMED AFTER QP CORRECTION PROCESSING BY ACT IS PERFORMED |
|---|---|
| 1 | IN QP CORRECTION PROCESSING BY TRANSFORM SKIP, QUANTIZATION PARAMETER IS CLIPPED BY TRANSFORM SKIP MINIMUM QP (QpPrimeTsMin) IN CASE OF TRANSFORM SKIP, OR CLIP IS OMITTED IN CASE OF NON-TRANSFORM SKIP |
| 2 | IN QP CORRECTION PROCESSING BY TRANSFORM SKIP, QUANTIZATION PARAMETER IS CLIPPED BY TRANSFORM SKIP MINIMUM QP (QpPrimeTsMin) IN CASE OF TRANSFORM SKIP, OR QUANTIZATION PARAMETER IS CLIPPED BY NON-TRANSFORM SKIP MINIMUM QP (0) IN CASE OF NON-TRANSFORM SKIP |
| 3 | IN QP CORRECTION PROCESSING BY TRANSFORM SKIP IN WHICH CORRECTED QP BY ACT IS CLIPPED BY QP MINIMUM VALUE (0) AND QP MAXIMUM VALUE (63 +QpBdOffset), QUANTIZATION PARAMETER IS CLIPPED BY TRANSFORM SKIP MINIMUM QP (QpPrimeTsMin) IN CASE OF TRANSFORM SKIP OR CLIP IS OMITTED IN CASE OF NON-TRANSFORM SKIP |
| 4 | IN QP CORRECTION PROCESSING BY TRANSFORM SKIP, QUANTIZATION PARAMETER IS CLIPPED BY TRANSFORM SKIP MINIMUM QP (QpPrimeTsMin) AND QP MAXIMUM VALUE (63 +QpBdOffset) IN CASE OF TRANSFORM SKIP, OR QUANTIZATION PARAMETER IS CLIPPED BY qP MINIMUM VALUE (0) AND QP MAXIMUM VALUE (63 +QpBdOffset) IN CASE OF NON-TRANSFORM SKIP |

START INVERSE QUANTIZATION
INVERSE TRANSFORM PROCESSING

PERFORM INVERSE QUANTIZATION    S441

PERFORM INVERSE ORTHOGONAL TRANSFORM    S442

PERFORM INVERSE ADAPTIVE COLOR TRANSFORM    S443

RETURN

START INVERSE QUANTIZATION PROCESSING

CORRECT QUANTIZATION PARAMETER    S451

PERFORM INVERSE QUANTIZATION PROCESSING    S452

RETURN

*FIG. 22*

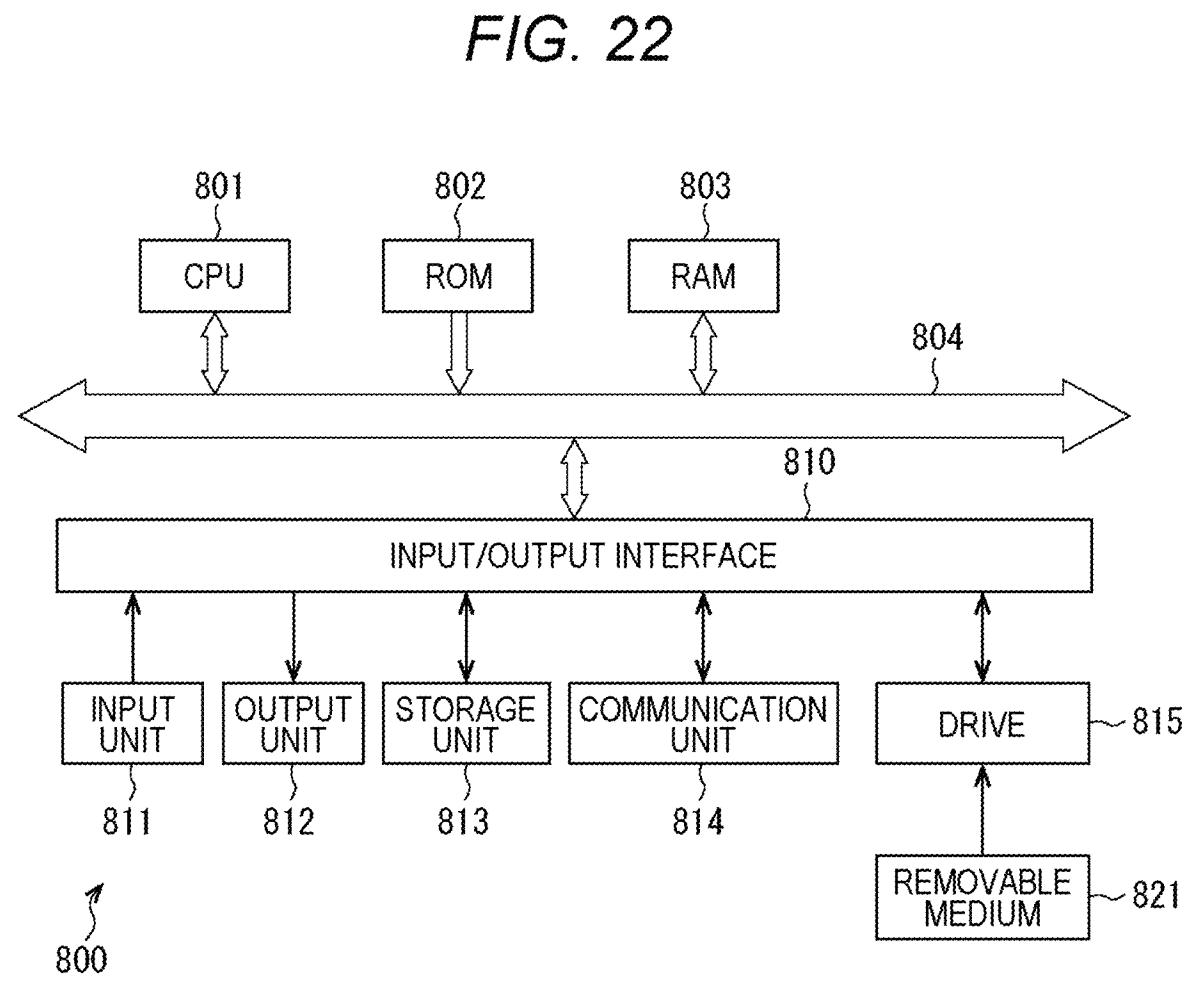

801 CPU

802 ROM

803 RAM

804

810

INPUT/OUTPUT INTERFACE

811 INPUT UNIT

812 OUTPUT UNIT

813 STORAGE UNIT

814 COMMUNICATION UNIT

815 DRIVE

821 REMOVABLE MEDIUM

800

IMAGE PROCESSING DEVICE AND METHOD

CROSS-REFERENCE TO RELATED APPLICATIONS

This is a continuation application of U.S. patent application Ser. No. 17/781,732, filed Jun. 2, 2022, which is based on PCT filing PCT/JP2020/047338, filed Dec. 18, 2020, which claims priority to U.S. Provisional Application No. 62/950,055, filed Dec. 18, 2019, the entire contents of each are incorporated herein by reference.

TECHNICAL FIELD

The present disclosure relates to an image processing device and method, and particularly relates to an image processing device and method for enabling control of a value of a quantization parameter within a desired range.

BACKGROUND ART

In the past, there has been proposed an encoding method for deriving a prediction residual of a moving image, performing coefficient transform, quantizing, and encoding (for example, see Non-Patent Documents 1 and 2). Furthermore, as an encoding tool for improving encoding efficiency in RGB444, adaptive color transform (ACT) for executing RGB-to-YCgCo transform on a residual domain has been proposed (see, for example, Non-Patent Document 3).

Furthermore, Non-Patent Document 3 has proposed processing of correcting a quantization parameter qP to be applied to a residual of each component by (dqPY, dqPCg, dqPCo)=(−5, −5, −3) in consideration of transform of a dynamic range of a signal between the residual before the transform (C0, C1, C2) and the residual after the transform (C0', C1', C2'). Non-Patent Document 1 discloses a method of correcting a quantization parameter based on application of transform skip and adaptive color transform.

CITATION LIST

Non-Patent Document

Non-Patent Document 1: Benjamin Bross, Jianle Chen, Shan Liu, Ye-Kui Wang, "Versatile Video Coding (Draft 7)", JVET-P2001-VE, Joint Video Experts Team (JVET) of ITU-T SG 16 WP 3 and ISO/IEC JTC 1/SC 29/WG 11 16th Meeting: Feneva, CH, 1-11 Oct. 2019

Non-Patent Document 2: Jianle Chen, Yan Ye, Seung Hwan Kim, "Algorithm description for Versatile Video Coding and Test Model 7 (VTM 7)", JVET-P2002-v1, Joint Video Experts Team (JVET) of ITU-T SG 16 WP 3 and ISO/IEC JTC 1/SC 29/WG 11 16th Meeting: Geneva, CH, 1-11 Oct. 2019

Non-Patent Document 3: Xiaoyu Xiu, Yi-Wen Chen, Tsung-Chuan Ma, Hong-Jheng Jhu, Xianglin Wang, "Support of adaptive color transform for 444 video coding in VVC", JVET-P0517_r1, Joint Video Experts Team (JVET) of ITU-T SG 16 WP 3 and ISO/IEC JTC 1/SC 29/WG 11 16th Meeting: Geneva, CH, 1-11 Oct. 2019

SUMMARY OF THE INVENTION

Problems to be Solved by the Invention

However, in the case of the method disclosed in Non-Patent Document 1, after correction of the quantization parameter based on a parameter regarding the transform skip is executed, correction of the quantization parameter based on a parameter regarding the adaptive color transform is executed. In the correction of the quantization parameter based on the parameter regarding the transform skip, a value of the quantization parameter is clipped within a desired range. Furthermore, in the correction of the quantization parameter based on the parameter regarding the adaptive color transform, a predetermined correction amount is added. Therefore, in this method, the range that can be taken by the value of the corrected quantization parameter cannot be controlled.

The present disclosure has been made in view of such a situation, and enables control of a value of a quantization parameter within a desired range.

Solutions to Problems

An image processing device according to one aspect of the present technology is an image processing device that includes: a quantization parameter correction unit configured to correct a quantization parameter on the basis of a parameter regarding adaptive color transform and further correct the quantization parameter on the basis of a parameter regarding transform skip; and a quantization unit configured to quantize coefficient data of an image to be encoded by using a corrected quantization parameter that is the quantization parameter corrected by the quantization parameter correction unit.

An image processing method according to one aspect of the present technology is an image processing method that includes: correcting a quantization parameter on the basis of a parameter regarding adaptive color transform and further correcting the quantization parameter on the basis of a parameter regarding transform skip; and quantizing coefficient data of an image to be encoded by using a corrected quantization parameter that is the quantization parameter that has been corrected.

An image processing device according to another aspect of the present technology is an image processing device that includes: a quantization parameter correction unit configured to correct a quantization parameter on the basis of a parameter regarding adaptive color transform and further correct the quantization parameter on the basis of a parameter regarding transform skip; and an inverse quantization unit configured to inversely quantize quantized coefficient data that is obtained by quantizing coefficient data of an image by using a corrected quantization parameter that is the quantization parameter corrected by the quantization parameter correction unit.

An image processing method according to another aspect of the present technology is an image processing method that includes: correcting a quantization parameter on the basis of a parameter regarding adaptive color transform and further correcting the quantization parameter on the basis of a parameter regarding transform skip; and inversely quantizing quantized coefficient data that is obtained by quantizing coefficient data of an image by using a corrected quantization parameter that is the quantization parameter that has been corrected.

In the image processing device and method according to one aspect of the present technology, a quantization parameter is corrected on the basis of a parameter regarding adaptive color transform and the quantization parameter is further corrected on the basis of a parameter regarding transform skip, and coefficient data of an image to be encoded is quantized by using a corrected quantization parameter that is the quantization parameter that has been corrected.

In the image processing device and method according to another aspect of the present technology, a quantization parameter is corrected on the basis of a parameter regarding adaptive color transform and the quantization parameter is further corrected on the basis of a parameter regarding transform skip, and quantized coefficient data that is obtained by quantizing coefficient data of an image is inversely quantized by using a corrected quantization parameter that is the quantization parameter that has been corrected.

BRIEF DESCRIPTION OF DRAWINGS

FIG. 1 is a diagram for describing an example of a method of correcting a quantization parameter.

FIG. 10 is a block diagram illustrating a main configuration example of an image encoding device.

FIG. 12 is a block diagram illustrating a main configuration example of a quantization unit.

FIG. 18 is a block diagram illustrating a main configuration example of an inverse quantization unit.

FIG. 22 is a block diagram illustrating a main configuration example of a computer.

MODE FOR CARRYING OUT THE INVENTION

Figure 2:
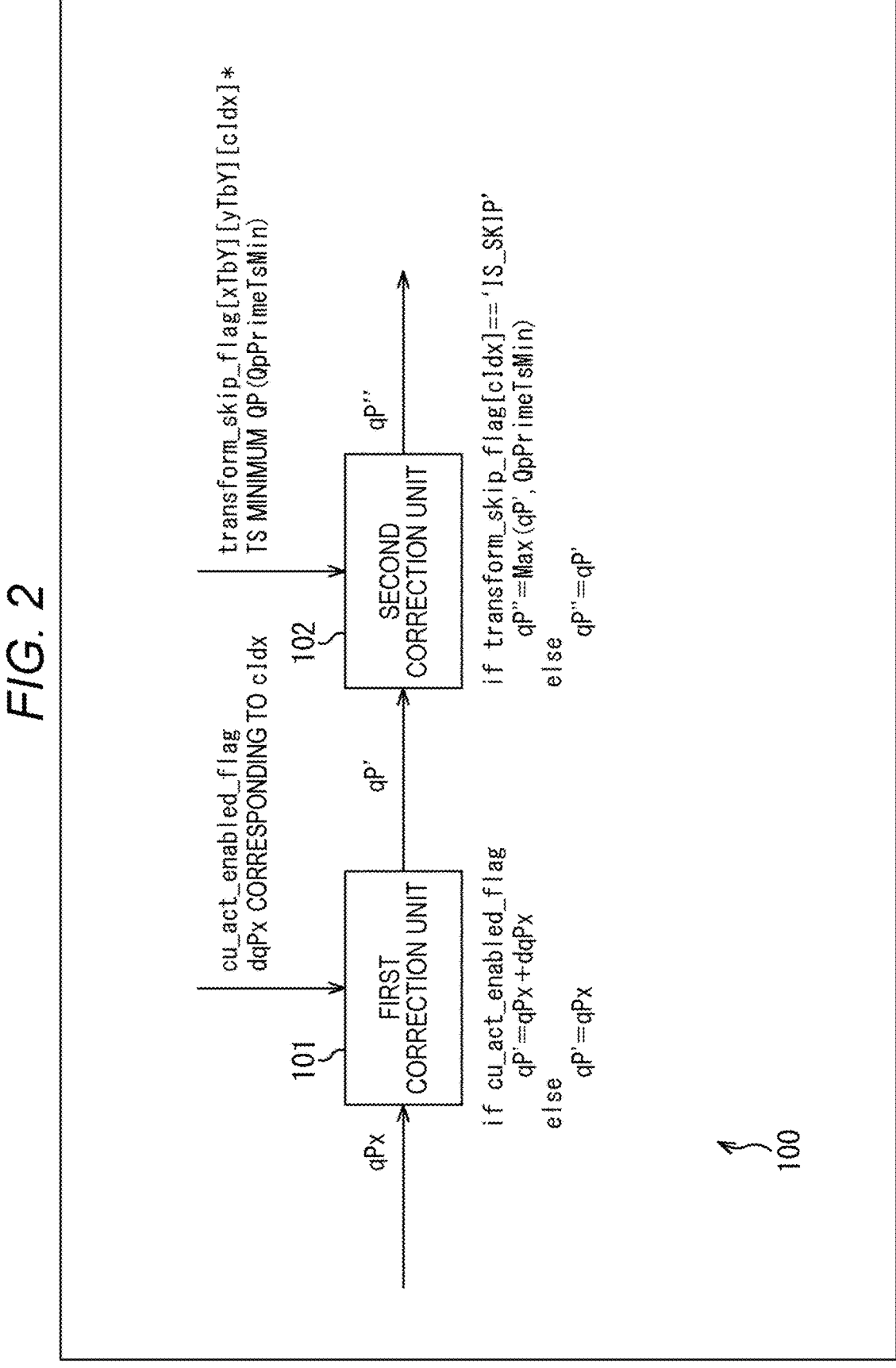
FIG. 2 is a block diagram illustrating a main configuration example of a quantization parameter correction device.

Hereinafter, modes for implementing the present disclosure (hereinafter referred to as embodiments) will be described. Note that description will be given in the following order.

1. Correction of Quantization Parameter
2. First Embodiment (Quantization Parameter Correction Device)
3. Second Embodiment (Quantization Parameter Correction Device)
4. Third Embodiment (Quantization Parameter Correction Device)
5. Fourth Embodiment (Quantization Parameter Correction Device)
6. Fifth Embodiment (Image Encoding Device)
7. Sixth Embodiment (Image Decoding Device)
8. Supplementary Note 1. Correction of Quantization Parameter <Documents and the Like that Support Technical Content and Technical Terms>

The scope disclosed in the present technology includes not only the content described in the embodiments but also the content described in the following non-patent documents and the like and the content of other documents referred to in the following non-patent documents that are known at the time of filing the application.

Non-Patent Document 1: (described above)

Non-Patent Document 2: (described above)

Non-Patent Document 3: (described above)

Non-Patent Document 4: Recommendation ITU-T H.264 (April 2017) "Advanced video coding for generic audio-visual services", April 2017

Non-Patent Document 5: Recommendation ITU-T H.265 (February 2018) "High efficiency video coding", February 2018

That is, the content described in Non-Patent Documents above also serves as a basis for determining the support requirements. For example, the quad-tree block structure described in Non-Patent Documents above and the quad tree plus binary tree (QTBT) block structure fall within the disclosure range of the present technology and satisfy the support requirements of the claims even in a case where these pieces of content are not directly described in the examples. Furthermore, for example, technical terms such as parsing, syntax, and semantics are similarly fall within the disclosure range of the present technology and satisfy the support requirements of claims even in a case where these technical terms are not directly described in the examples.

Furthermore, in the present specification, a "block" (not a block representing a processing unit) used for description as a partial region or a unit of processing of an image (picture) indicates an arbitrary partial region in a picture unless otherwise specified, and the size, shape, characteristics, and the like of the block are not limited. For example, the "block" includes an arbitrary partial region (unit of processing) such as a transform block (TB), a transform unit (TU), a prediction block (PB), a prediction unit (PU), a smallest coding unit (SCU), a coding unit (CU), a largest coding unit (LCU), a coding tree block (CTB), a coding tree unit (CTU), a transform block, a subblock, a macro block, a tile, or a slice, described in Non-Patent Documents above.

Furthermore, in specifying the size of such a block, not only the block size is directly specified but also the block size may be indirectly specified. For example, the block size may be specified using identification information for identifying the size. Furthermore, for example, the block size may be specified by a ratio or a difference from the size of a reference block (for example, an LCU, an SCU, or the like). For example, in a case of transmitting information for specifying the block size as a syntax element or the like, information for indirectly specifying the size as described above may be used as the information. With the configuration, the amount of information can be reduced, and the encoding efficiency can be improved in some cases. Furthermore, the specification of the block size also includes specification of a range of the block size (for example, specification of a range of an allowable block sizes, or the like).

Furthermore, in the present specification, encoding includes not only the whole processing of transforming an image into a bitstream but also part of the processing. For example, encoding includes not only processing that includes prediction processing, orthogonal transform, quantization, arithmetic encoding, and the like but also processing that collectively refers to quantization and arithmetic encoding, processing including prediction processing, quantization, and arithmetic encoding, and the like. Similarly, decoding includes not only the whole processing of transforming a bitstream into an image but also part of the processing. For example, decoding includes not only processing including inverse arithmetic decoding, inverse quantization, inverse orthogonal transform, prediction processing, and the like but also processing including inverse arithmetic decoding and inverse quantization, processing including inverse arithmetic decoding, inverse quantization, and prediction processing, and the like.

<Adaptive Color Transform>

Non-Patent Document 3 has proposed, as an encoding tool for improving encoding efficiency in RGB444, adaptive color transform (ACT) for executing RGB-to-YCgCo transform on a residual domain. The following expression (1) expresses the RGB-to-YCgCo transform. Furthermore, the expression (2) expresses inverse transform (YCgCo-RGB transform). In the expressions (1) and (2), coefficients $C0$, $C1$, and $C2$ correspond to R, G, and B, respectively. $C0'$, $C1'$, and $C2'$ correspond to Y, Cg, and Co, respectively.

$$\begin{bmatrix} C0' \\ C1' \\ C2' \end{bmatrix} = \begin{bmatrix} 2 & 1 & 1 \\ 2 & -1 & -1 \\ 0 & -2 & 2 \end{bmatrix} / 4 \tag{1}$$

$$\begin{bmatrix} C0 \\ C1 \\ C2 \end{bmatrix} = \begin{bmatrix} 1 & 1 & 0 \\ 1 & -1 & 1 \\ 1 & -1 & 1 \end{bmatrix} \begin{bmatrix} C0' \\ C1' \\ C2' \end{bmatrix} \tag{2}$$

As illustrated in the expressions (1) and (2), by the adaptive color transform, an RGB signal can be transformed into a YCgCo signal equivalent to a YCbCr signal only by simple shift operation and addition/subtraction. The same similarly applies to inverse transform. Therefore, by applying such adaptive color transform, redundancy between components can be easily reduced, and reduction in encoding efficiency can be suppressed.

Furthermore, in the case where this adaptive color transform is applied, processing of correcting the residual ($C0$, $C1$, $C2$) before transform and the quantization parameter qP to be applied to the residual of each component by the correction amount (dqPY, dqPCg, dqPCo)=(−5, −5, −3) of the quantization parameter of each component has been executed by the RGB-YCgCo transform. This processing takes into consideration transform of a dynamic range of the signal with the residual ($C0'$, $C1'$, $C2'$) after transform.

<Transform Skip>

By the way, Non-Patent Document 1 discloses transform skip that is a mode for skipping (omitting) orthogonal transform processing. In the present disclosure, a case where the transform skip is not applied is also referred to as non-transform skip.

<Correction of Quantization Parameter by Transform Skip and Adaptive Color Transform>

Non-Patent Document 1 discloses a method of correcting a quantization parameter based on application of transform skip and adaptive color transform. In this method, the correction of the quantization parameter is controlled according to whether or not to apply the transform skip and whether or not to apply the adaptive color transform. For example, in a case where the adaptive color transform is applicable and the transform skip is applied, the correction of the quantization parameter is executed as in the following expression (3). In contrast, in a case where the adaptive color transform is applicable and non-transform skip is applied (that is, the transform skip is not applied), the correction of the quantization parameter is executed as in the following expression (4).

$$qP = \text{Max}\,(QpPrimeTsMin,\, qP) - \tag{3}$$
$$(\text{cu\_act\_enabled\_flag}[xTbY][yTbY]\,?\,(cIdx < 2\,?\,5:3):0)$$

$$qP = qP - (\text{cu\_act\_enabled\_flag}[xTbY][yTbY]\,?\,(cIdx < 2\,?\,5:3):0) \tag{4}$$

As illustrated in the expression (3), in the case where the transform skip is applied, a lower limit of the quantization parameter is first clipped with a minimum value (OpPrimeTsMin) of the quantization parameter in the case of the transform skip. Thereafter, a correction amount corresponding to a component to be processed is added to a result of the clip according to a value of cu_act_enabled_flag. cu_act_enabled_flag is flag information in units of CUs indicating whether or not to apply the adaptive color transform. A case where cu_act_enabled_flag is true (for example, "1") indicates that the adaptive color transform is applied. A case where cu_act_enabled_flag is false (for example, "0") indicates that the adaptive color transform is not applied. That is, after the correction based on the parameter regarding the transform skip is executed, the correction based on the parameter regarding the adaptive color transform is executed.

In the case where the non-transform skip is applied as illustrated in the expression (4), the correction based on the parameter regarding the transform skip is executed, and then the correction based on the parameter regarding the adaptive color transform is executed, similarly to the case of the expression (3). Note that, in this case, the above-described clip processing is skipped (omitted) in the correction based on the parameter regarding the transform skip. In other words, the lower limit of the quantization parameter is clipped with the minimum value that can be taken on the basis of a specification of hardware, software, or the like.

As described above, in the correction method described in Non-Patent Document 1, since the correction amount is added after the clip processing, the range that can be taken by the value of the corrected quantization parameter cannot be controlled.

<Priority of Correction of Quantization Parameter by Adaptive Color Transform>

Therefore, as illustrated in the top row of the table illustrated in FIG. 1, the quantization parameter is corrected by transform skip after the quantization parameter by adaptive color transform is corrected.

For example, in an image processing method, a quantization parameter is corrected on the basis of a parameter regarding adaptive color transform and the quantization parameter is further corrected on the basis of a parameter regarding transform skip, and coefficient data of an image to be encoded is quantized by using a corrected quantization parameter that is the quantization parameter that has been corrected.

Furthermore, for example, an image processing device includes a quantization parameter correction unit configured to correct a quantization parameter on the basis of a parameter regarding adaptive color transform and further correct the quantization parameter on the basis of a parameter regarding transform skip, and a quantization unit configured to quantize coefficient data of an image to be encoded by using a corrected quantization parameter that is the quantization parameter corrected by the quantization parameter correction unit.

For example, in an image processing method, a quantization parameter is corrected on the basis of a parameter regarding adaptive color transform and the quantization parameter is further corrected on the basis of a parameter regarding transform skip, and quantized coefficient data that is obtained by quantizing coefficient data of an image is inversely quantized by using a corrected quantization parameter that is the quantization parameter that has been corrected.

Furthermore, for example, an image processing device includes a quantization parameter correction unit configured to correct a quantization parameter on the basis of a parameter regarding adaptive color transform and further correct the quantization parameter on the basis of a parameter regarding transform skip, and an inverse quantization unit configured to inversely quantize quantized coefficient data that is obtained by quantizing coefficient data of an image by using a corrected quantization parameter that is the quantization parameter corrected by the quantization parameter correction unit.

By doing so, since the clip processing can be executed after the correction amount is added, the range that can be taken by the value of the corrected quantization parameter can be controlled.

Note that, in the case where the adaptive color transform is applied, the quantization parameter may be corrected with a correction amount corresponding to a component to be processed as the correction based on the parameter regarding the adaptive color transform. For example, in the image processing device, in the case of applying the adaptive color transform, the quantization parameter correction unit may correct the quantization parameter with the correction amount corresponding to the component to be processed.

Furthermore, in the case where the adaptive color transform is not applied, the quantization parameter may be corrected with the correction amount set to "0" as the correction based on the parameter regarding the adaptive color transform. In other words, the correction based on the parameter regarding the adaptive color transform may be skipped (omitted). For example, in the image processing device, in the case of applying the adaptive color transform, the quantization parameter correction unit may correct the quantization parameter with the correction amount set to "0".

2. First Embodiment

<Lower Limit Control During Transform Skip>

As described above, in the correction method described in Non-Patent Document 1, in a case where transform skip is applied, a quantization parameter qP is corrected as illustrated in the expression (3). That is, a lower limit of the quantization parameter qP is first clipped with a minimum value OpPrimeTsMin of the quantization parameter at the time of transform skip, and a first corrected quantization parameter qP' is obtained. The minimum value OpPrimeTsMin of the quantization parameter at the time of transform skip is set in advance.

Next, in a case where cu_act_enabled_flag is true (for example, "1"), a correction amount dqP corresponding to a component identifier cIdx indicating a component to be processed is added to the first corrected quantization parameter qP' to derive a second corrected quantization parameter qP". Note that, in the case where cu_act_enabled_flag is false (for example, "0"), similar calculation is executed with the correction amount dqP set to "0", and the second corrected quantization parameter qP" is derived. The second corrected quantization parameter qP" derived in this manner is used for quantization processing and inverse quantization processing as a corrected quantization parameter qP (that is, a correction result).

That is, in a case where adaptive color transform and transform skip are applied, the lower limit of the quantization parameter qP is clipped with OpPrimeTsMin, and then the correction amount dqP corresponding to the component identifier cIdx is added.

Note that the lower limit of the quantization parameter qP is clipped with OpPrimeTsMin in order to avoid a phenomenon in which a peak signal-to-noise ratio (PSNR) decreases when a quantization step size $\Delta < 1$ in the transform skip (because the quantization step size $\Delta < 1$ can occur).

However, as described above, by adding the correction amount dqP corresponding to the component identifier cIdx after clipping the lower limit with OpPrimeTsMin, the second corrected quantization parameter qP" (that is, the corrected quantization parameter qP) can be a value smaller than OpPrimeTsMin. That is, in the case where the adaptive color transform and the transform skip are applied, there is a possibility that the quantization parameter smaller than the minimum value of the quantization parameter at the time of transform skip is used for the quantization and the inverse quantization (the quantization step size $\Delta < 1$ can occur). Therefore, there is a possibility that the PSNR is reduced. That is, there has been a possibility that the encoding efficiency is reduced.

Therefore, as described above, as illustrated in the top row of the table illustrated in FIG. 1, the quantization parameter is corrected by transform skip after the quantization parameter by adaptive color transform is corrected. Moreover, as illustrated in the second row from the top of the table illustrated in FIG. 1, in the quantization parameter correction processing by transform skip, in the case of the transform skip, the lower limit may be clipped with the minimum value OpPrimeTsMin of the quantization parameter at the time of transform skip (method 1).

For example, in the image processing device, in the case of applying the transform skip, the quantization parameter correction unit may clip the lower limit of the quantization parameter corrected on the basis of the parameter regarding adaptive color transform with the preset minimum value QpPrimeTsMin of the quantization parameter of the case of the transform skip.

By doing so, in the case where the adaptive color transform and the transform skip are applied, the quantization step size Δ<1 can be avoided, so that the reduction in the PSNR can be suppressed and the reduction in the encoding efficiency can be suppressed.

Furthermore, as illustrated in the second row from the top of the table illustrated in FIG. 1, in the quantization parameter correction processing by transform skip, in the case of non-transform skip, the clip of the lower limit may be omitted. For example, in the image processing device, in a case of not applying the transform skip, the quantization parameter correction unit may omit the clip of the lower limit of the quantization parameter corrected on the basis of the parameter regarding adaptive color transform. In other words, in that case, the lower limit of the quantization parameter may be clipped with a minimum value that can be taken on the basis of a specification of hardware, software, or the like.

<Quantization Parameter Correction Device>

The above-described present technology can be applied to any device. FIG. 2 is a block diagram illustrating an example of a configuration of a quantization parameter correction device that is one aspect of an image processing device to which the present technology is applied. A quantization parameter correction device 100 illustrated in FIG. 2 is a device that corrects a quantization parameter to be used for quantization processing and inverse quantization processing of coefficient data related to an image. The quantization parameter correction device 100 corrects the quantization parameter according to, for example, application of adaptive color transform and transform skip in image encoding or decoding. At that time, the quantization parameter correction device 100 corrects the quantization parameter by applying the above-described "method 1".

Note that FIG. 2 illustrates main processing units, data flows, and the like, and those illustrated in FIG. 2 are not necessarily everything. That is, in the quantization parameter correction device 100, there may be a processing unit not illustrated as a block in FIG. 2, or there may be processing or a data flow not illustrated as an arrow or the like in FIG. 2.

As illustrated in FIG. 2, the quantization parameter correction device 100 includes a first correction unit 101 and a second correction unit 102.

The first correction unit 101 executes processing regarding correction based on a parameter regarding adaptive color transform. For example, the first correction unit 101 acquires a quantization parameter qPx at a CU level corresponding to a component identifier cIdx indicating a component to be processed. Furthermore, the first correction unit 101 acquires cu_act_enabled_flag as the parameter regarding adaptive color transform. Moreover, the first correction unit 101 acquires a correction amount dqPx corresponding to the component identifier cIdx.

Note that the component identifier cIdx is an identifier indicating the component to be processed. Furthermore, the quantization parameter qPx indicates the quantization parameter corresponding to a component. For example, the quantization parameter qPx includes a quantization parameter qPy corresponding to luminance Y, a quantization parameter qPcb corresponding to chrominance Cb, a quantization parameter qPcr corresponding to chrominance Cr, and a quantization parameter qPcbcr corresponding to chrominance CbCr. Moreover, the correction amount dqPx corresponding to each component (Y, Cg, Co) when the adaptive color transform is applied is (−5, −5, −3). These parameters are similar in other embodiments unless otherwise specified.

In the case where cu_act_enabled_flag is true (for example, "1"), the first correction unit 101 adds the correction amount dqPx corresponding to the component identifier cIdx to the quantization parameter qPx at the CU level corresponding to the component identifier cIdx to derive the first corrected quantization parameter qP'. Furthermore, in the case where cu_act_enabled_flag is false (for example, "0"), the first correction unit 101 adds the correction amount "0" to the quantization parameter qPx at the CU level corresponding to the component identifier cIdx to derive the first corrected quantization parameter qP'. That is, the first correction unit 101 executes processing of the following syntax.

```
if cu_act_enabled_flag
    qP' = qPx + dqPx
else
    qP' = qPx
```

The first correction unit 101 supplies the derived first corrected quantization parameter qP' to the second correction unit 102.

The second correction unit 102 executes processing regarding correction based on a parameter regarding transform skip. For example, the second correction unit 102 acquires the first corrected quantization parameter qP' supplied from the first correction unit 101. Furthermore, the second correction unit 102 acquires transform_skip_flag [xTbY][yTbY][cIdx] corresponding to the component identifier cIdx as the parameter regarding transform skip. Moreover, the second correction unit 102 acquires the minimum value OpPrimeTsMin of the quantization parameter at the time of transform skip as the parameter regarding transform skip.

Note that transform_skip_flag is flag information indicating whether or not to apply the transform skip. A case where transform_skip_flag is true (for example, "1") indicates that the transform skip is applied. Furthermore, a case where transform_skip_flag is false (for example, "0") indicates that the non-transform skip is applied (that is, no transform skip is applied). Furthermore, the minimum value OpPrimeTsMin of the quantization parameter at the time of transform skip is set in advance. Note that, in a case of signaling (transmitting) OpPrimeTsMin from an encoding-side device to a decoding-side device, OpPrimeTsMin is signaled using, for example, a parameter set. These parameters are similar in other embodiments unless otherwise specified.

In the case where transform_skip_flag is true (for example, "1"), the second correction unit 102 clips a lower limit of the first corrected quantization parameter qP' using OpPrimeTsMin to derive the second corrected quantization parameter qP''. In other words, in the case where transform_skip_flag is true, the second correction unit 102 sets OpPrimeTsMin or the first corrected quantization parameter qP', whichever is larger, as the second corrected quantization parameter qP''. Furthermore, in the case where transform_skip_flag is false (for example, "0"), the second correction unit 102 skips (omits) this clip processing and sets the first corrected quantization parameter qP' as the second corrected quantization parameter qP''. In other words, in the case where transform_skip_flag is false, the second correction unit 102 clips the lower limit of the first corrected quantization parameter qP' with the minimum value that can be taken on the basis of a specification of hardware, software, or the like, and derives the second corrected quantization parameter qP". That is, the second correction unit 102 executes processing of the following syntax.

```
if transform_skip_flag[cIdx] == 'IS_SKIP'
qP" = Max(qP', OpPrimeTsMin)
else
qP" = qP'
```

The second correction unit 102 outputs the derived second corrected quantization parameter qP" to the outside of the quantization parameter correction device 100 as a correction result (corrected quantization parameter) of the input quantization parameter qP.

In other words, in the case of transform skip, the quantization parameter correction device 100 executes processing as illustrated in the following expression (5) to correct the quantization parameter. Furthermore, in the case of non-transform skip, the quantization parameter correction device 100 executes processing as illustrated in the following expression (6) to correct the quantization parameter.

$$qP'' = \text{Max} (QpPrimeTsMin, \tag{5}$$

$$qP - (\text{cu\_act\_enabled\_flag}[xTbY][yTbY]?(cIdx < 2?5:3):0))$$

$$qP'' =$$

$$qP - (\text{cu\_act\_enabled\_flag}[xTbY][yTbY]?(cIdx < 2?5:3):0) \tag{6}$$

In other words, the quantization parameter correction device 100 derives the quantization parameter qP to be applied to a transform block to be processed corresponding to the component identifier cIdx by reference to the adaptive color transform flag (cu_act_enabled_flag), the correction amount dqP corresponding to ACT, the transform_skip_flag (transform_skip_flag) corresponding to the component identifier cIdx, the quantization parameter (qPx) at the CU level corresponding to the component identifier cIdx, and the minimum value OpPrimeTsMin of the quantization parameter at the time of transform skip.

By doing so, the quantization parameter correction device 100 can correct the quantization parameter so that quantization step size Δ<1 is avoided in the quantization or the inverse quantization in the case where the adaptive color transform and the transform skip are applied. Therefore, for example, an encoder or a decoder executes the quantization or the inverse quantization for the coefficient data of an image using the quantization parameter corrected in this manner, so that the reduction in the PSNR can be suppressed and the reduction in the encoding efficiency can be suppressed.

Note that mts_idx may be applied instead of transform_skip_flag, and notification of whether or not the transform skip is applied may be provided as one mode of mts_idx. That is, the quantization parameter correction device 100 (the second correction unit 102) may acquire mts_idx instead of transform_skip_flag and determine whether or not the transform skip is applied on the basis of the value. Furthermore, notification of OpPrimeTsMin may be provided for each component (Y, Cb, Cr, or CbCr). That is, the quantization parameter correction device 100 (the second correction unit 102) may acquire OpPrimeTsMin corresponding to the component identifier cIdx and clip the lower limit of the first corrected quantization parameter qP' using QpPrimeTsMin corresponding to the component identifier cIdx.

<Flow of Quantization Parameter Correction Processing>

Figure 3:
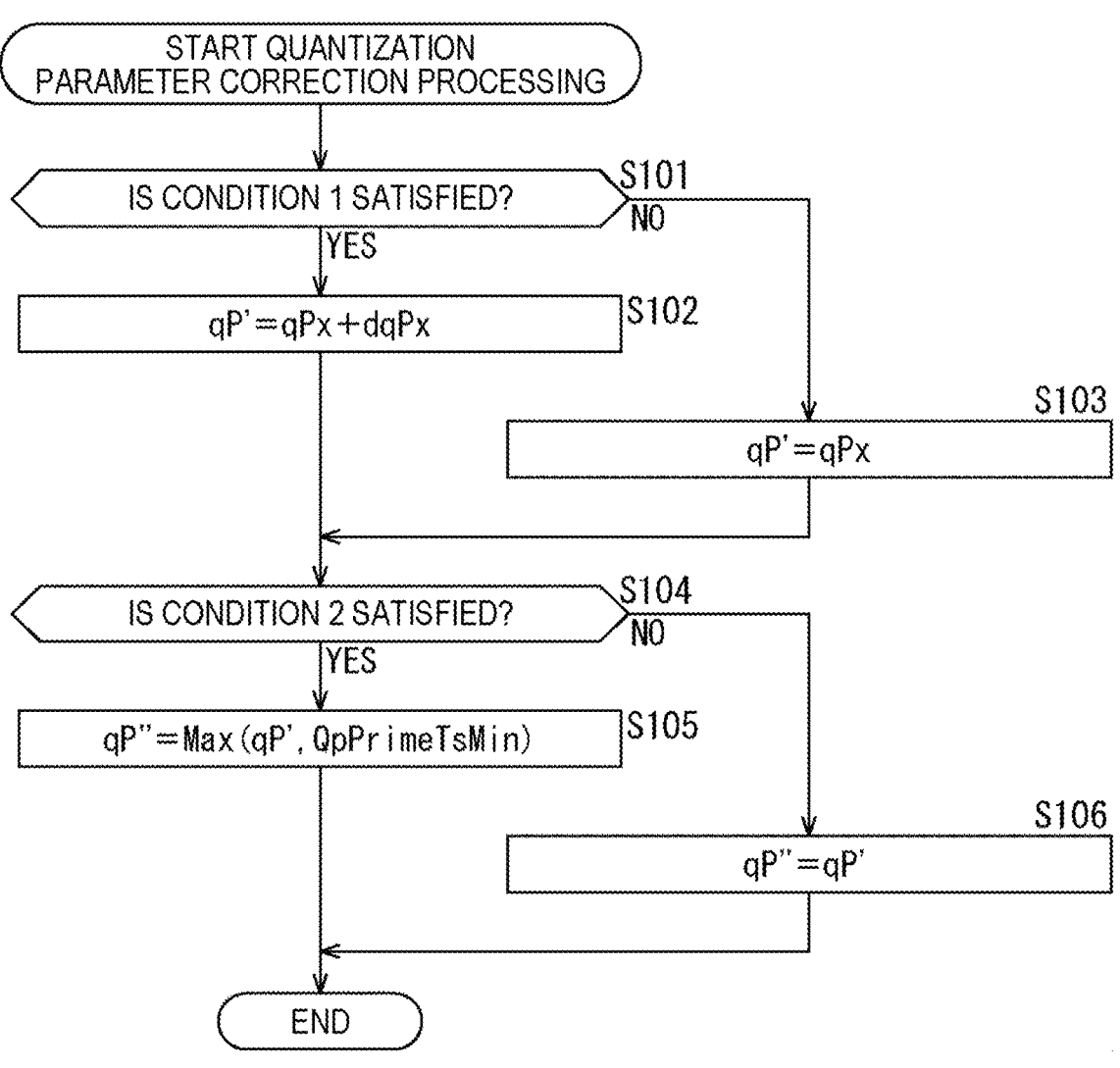
FIG. 3 is a flowchart illustrating an example of a flow of quantization parameter correction processing.

Next, an example of a flow of quantization parameter correction processing executed by the quantization parameter correction device 100 will be described with reference to the flowchart of FIG. 3.

When the quantization parameter correction processing is started, in step S101, the first correction unit 101 of the quantization parameter correction device 100 determines whether or not to apply the adaptive color transform by determining whether or not condition 1 is satisfied. For example, the condition 1 may be cu_act_enabled_flag=1. In a case where it is determined that the condition 1 is satisfied (that is, the adaptive color transform is applied), the processing proceeds to step S102.

In step S102, the first correction unit 101 adds the correction amount dqPx corresponding to the component identifier cIdx to the quantization parameter qPx at the CU level corresponding to the component identifier cIdx to derive the first corrected quantization parameter qP'. That is, the first correction unit 101 executes calculation of the following expression (7).

$$qP' = qPx + dqPx \tag{7}$$

At that time, the correction amount dqPx may be set as in the following expression (8) or may be set as in the following expression (9).

$$dqPx = cIdx < 2?-5:-3 \tag{8}$$

$$dqPx = codedCIdx < 2?-5:3 \tag{9}$$

When the processing in step S102 is completed, the processing proceeds to step S104. Furthermore, in a case where it is determined in step S101 that the condition 1 is not satisfied (that is, the adaptive color transform is not applied), the processing proceeds to step S103.

In step S103, the first correction unit 101 adds the correction amount "0" to the quantization parameter qPx at the CU level corresponding to the component identifier cIdx to derive the first corrected quantization parameter qP'. That is, the first correction unit 101 executes calculation of the following expression (10).

$$qP' = qP \tag{10}$$

When the processing in step S103 is completed, the processing proceeds to step S104.

In step S104, the second correction unit 102 determines whether or not the transform skip is applied by determining whether or not condition 2 is satisfied. For example, the condition 2 may be transform_skip_flag[cIdx]=='IS SKIP'. Alternatively, the condition 2 may be mts_idx[cIdx]=='IS SKIP'. When it is determined that the condition 2 is satisfied (that is, the transform skip is performed), the processing proceeds to step S105.

In step S105, the second correction unit 102 clips the lower limit of the first corrected quantization parameter qP' using OpPrimeTsMin to derive the second corrected quantization parameter qP". That is, the second correction unit 102 executes calculation of the following expression (11).

$$qP'' = \text{Max}(QpPrimeTsMin, qP') \tag{11}$$

When the processing of step S105 ends, the quantization parameter correction processing ends. Furthermore, in a case where it is determined in step S104 that the condition 2 is not satisfied (that is, the non-transform skip is applied), the processing proceeds to step S106.

In step S106, the second correction unit 102 skips (omits) this clip processing and sets the first corrected quantization parameter qP' as the second corrected quantization parameter qP". That is, the second correction unit 102 executes calculation of the following expression (12).

$$qP'' = qP' \tag{12}$$

When the processing of step S106 ends, the quantization parameter correction processing ends.

By executing the quantization parameter correction processing as described above, the quantization parameter correction device 100 can correct the quantization parameter so that the quantization step size $\Delta < 1$ is avoided in the quantization or the inverse quantization when the adaptive color transform and the transform skip are applied. Therefore, for example, an encoder or a decoder executes the quantization or the inverse quantization for the coefficient data of an image using the quantization parameter corrected in this manner, so that the reduction in the PSNR can be suppressed and the reduction in the encoding efficiency can be suppressed.

3. Second Embodiment

<Lower Limit Control During Non-Transform Skip>

As described above, in the correction method described in Non-Patent Document 1, in the case where non-transform skip is applied, clip is omitted as illustrated in the expression (4). Then, in the case where cu_act_enabled_flag is true (for example, "1"), the correction amount dqP corresponding to the component identifier cIdx is added to the first corrected quantization parameter qP' to derive the second corrected quantization parameter qP". Note that, in the case where cu_act_enabled_flag is false (for example, "0"), similar calculation is executed with the correction amount dqP set to "0", and the second corrected quantization parameter qP" is derived. The second corrected quantization parameter qP" derived in this manner is used for quantization processing and inverse quantization processing as a corrected quantization parameter qP (that is, a correction result).

Therefore, in the case of non-transform skip, the second corrected quantization parameter qP" (that is, corrected quantization parameter qP) may be a value smaller than the minimum value "0" of the quantization parameter. That is, in the case where adaptive color transform and non-transform skip are applied, there is a possibility that the quantization parameter smaller than the minimum value "0" of the quantization parameter at the time of non-transform skip is used for quantization and inverse quantization (a quantization step size $\Delta < 1$ may occur). Therefore, there is a possibility that the PSNR is reduced. That is, there has been a possibility that the encoding efficiency is reduced.

Therefore, as described above, as illustrated in the top row of the table illustrated in FIG. 1, the quantization parameter is corrected by transform skip after the quantization parameter by adaptive color transform is corrected. Moreover, as illustrated in the third row from the top of the table illustrated in FIG. 1, in quantization parameter correction processing by transform skip, in a case of the transform skip, a lower limit of a quantization parameter may be clipped with a minimum value OpPrimeTsMin of the quantization parameter at the time of transform skip, and in a case of non-transform skip, the lower limit of the quantization parameter may be clipped with a minimum value "0" of the quantization parameter at the time of non-transform skip (method 2).

For example, in an image processing device, in the case of not applying the transform skip, a quantization parameter correction unit may clip the lower limit of the quantization parameter corrected on the basis of a parameter regarding adaptive color transform with the preset minimum value of the quantization parameter.

For example, the minimum value of the quantization parameter may be "0". That is, in the case of not applying the transform skip, the quantization parameter correction unit may clip the lower limit of the quantization parameter corrected on the basis of the parameter regarding adaptive color transform with the value "0".

In doing so, in the case where the adaptive color transform and the non-transform skip are applied, a quantization step size $\Delta < 1$ can be avoided, so that reduction in PSNR can be suppressed and reduction in encoding efficiency can be suppressed.

<Quantization Parameter Correction Device>

Figure 4:
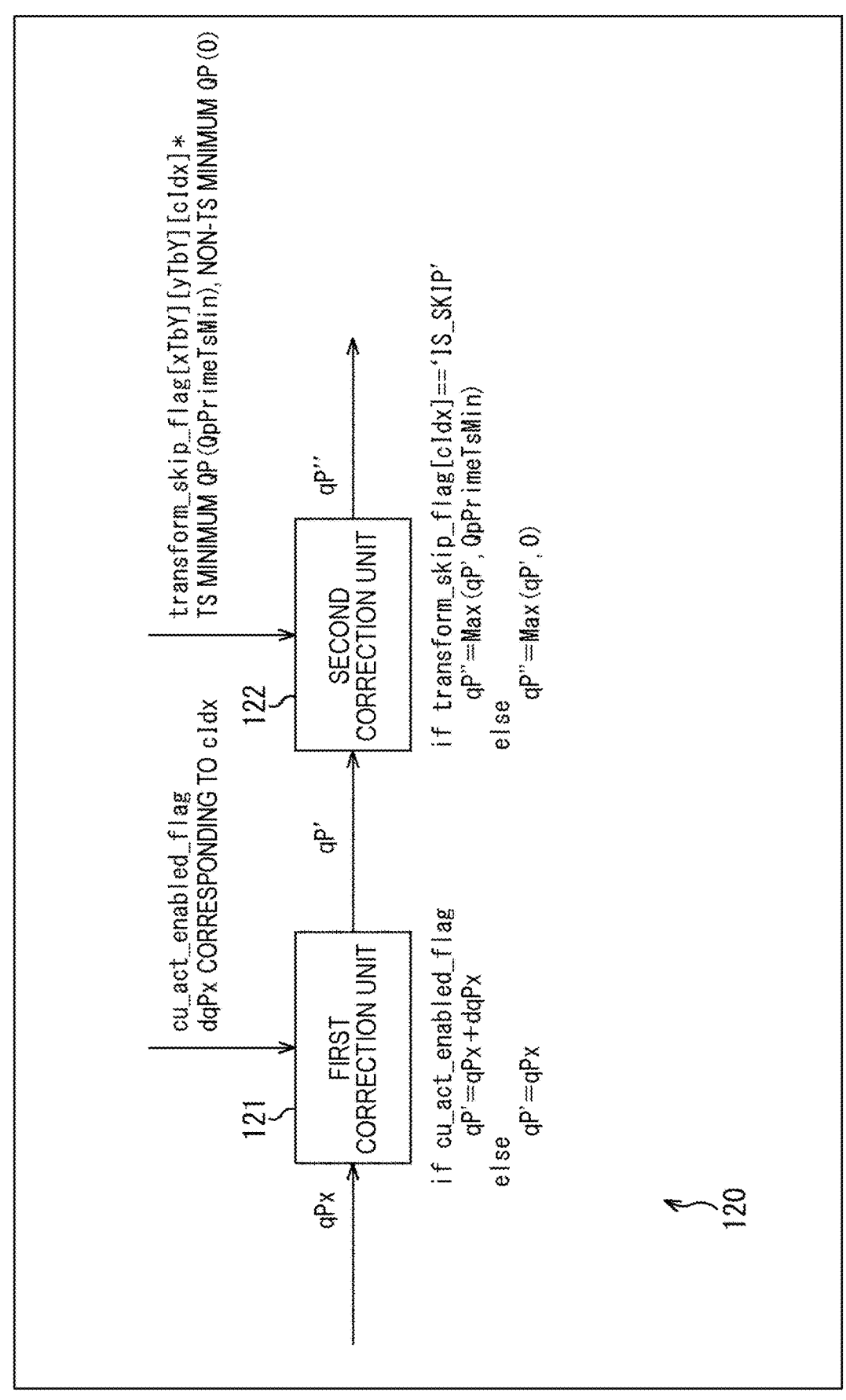
FIG. 4 is a block diagram illustrating a main configuration example of the quantization parameter correction device.

The above-described present technology can be applied to any device. FIG. 4 is a block diagram illustrating an example of a configuration of a quantization parameter correction device that is one aspect of an image processing device to which the present technology is applied. A quantization parameter correction device 120 illustrated in FIG. 4 is a device similar to the quantization parameter correction device 100, and corrects a quantization parameter used for quantization processing and inverse quantization processing of coefficient data related to an image. At that time, the quantization parameter correction device 120 corrects the quantization parameter by applying the above-described "method 2".

Note that FIG. 4 illustrates main processing units, data flows, and the like, and those illustrated in FIG. 4 are not necessarily everything. That is, in the quantization parameter correction device 120, there may be a processing unit not illustrated as a block in FIG. 4, or there may be processing or a data flow not illustrated as an arrow or the like in FIG. 4.

As illustrated in FIG. 4, the quantization parameter correction device 120 includes a first correction unit 121 and a second correction unit 122.

The first correction unit 121 is a processing unit similar to the first correction unit 101 of the quantization parameter correction device 100 and executes similar processing. That is, the first correction unit 121 executes processing regarding correction based on the parameter regarding adaptive color transform. For example, the first correction unit 121 acquires a quantization parameter qPx at a CU level corresponding to the component identifier cIdx indicating the component to be processed. Furthermore, the first correction unit 121 acquires cu_act_enabled_flag as the parameter regarding adaptive color transform. Moreover, the first correction unit 121 acquires a correction amount dqPx corresponding to the component identifier cIdx.

In the case where cu_act_enabled_flag is true (for example, "1"), the first correction unit 121 adds the correction amount dqPx corresponding to the component identifier cIdx to the quantization parameter qPx at the CU level corresponding to the component identifier cIdx to derive the first corrected quantization parameter qP'. Furthermore, in the case where cu_act_enabled_flag is false (for example, "0"), the first correction unit 121 adds the correction amount "0" to the quantization parameter qPx at the CU level corresponding to the component identifier cIdx to derive the first corrected quantization parameter qP'. That is, the first correction unit 121 executes processing of the following syntax.

```
if cu__act__enabled__flag
    qP' = qPx + dqPx
else
    qP' = qPx
```

The first correction unit 121 supplies the derived first corrected quantization parameter qP' to the second correction unit 122.

Similarly to the second correction unit 102 of the quantization parameter correction device 100, the second correction unit 122 executes processing regarding correction based on the parameter regarding transform skip. For example, the second correction unit 122 acquires the first corrected quantization parameter qP' supplied from the first correction unit 121. Furthermore, the second correction unit 122 acquires transform_skip_flag[xTbY][yTbY][cIdx] corresponding to the component identifier cIdx as the parameter regarding transform skip. Moreover, the second correction unit 122 acquires the minimum value OpPrimeTsMin of the quantization parameter at the time of transform skip as the parameter regarding the transform skip. Furthermore, the second correction unit 122 acquires the minimum value "0" of the quantization parameter at the time of non-transform skip as the parameter regarding transform skip.

In the case where transform_skip_flag is true (for example, "1"), the second correction unit 122 clips a lower limit of the first corrected quantization parameter qP' using OpPrimeTsMin to derive the second corrected quantization parameter qP". In other words, in the case where transform_skip_flag is true, the second correction unit 122 sets OpPrimeTsMin or the first corrected quantization parameter qP', whichever is larger, as the second corrected quantization parameter qP".

In contrast, in the case where transform_skip_flag is false (for example, "0"), the second correction unit 122 clips a lower limit of the quantization parameter with the minimum value "0" of the quantization parameter at the time of non-transform skip, and derives the second corrected quantization parameter qP". In other words, in the case where transform_skip_flag is false, the second correction unit 122 sets the value "0" or the first corrected quantization parameter qP', whichever is larger, as the second corrected quantization parameter qP". That is, the second correction unit 122 executes processing of the following syntax.

```
if transform__skip__flag[cIdx] == 'IS__SKIP'
    qP" = Max(qP', OpPrimeTsMin)
else
    qP" = Max(qP', 0)
```

The second correction unit 122 outputs the derived second corrected quantization parameter qP" to the outside of the quantization parameter correction device 120 as a correction result (corrected quantization parameter) of the input quantization parameter qP.

In other words, in the case of transform skip, the quantization parameter correction device 120 executes processing as illustrated in expression (5) above to correct the quantization parameter. Furthermore, in the case of non-transform skip, the quantization parameter correction device 120 executes processing as illustrated in the following expression (13) to correct the quantization parameter.

$$qP'' = \text{Max}\,(OpPrimeTsMin, qP - \qquad\qquad \text{(5)(re-described)}$$
$$(\text{cu\_act\_enabled\_flag}[xTbY][yTbY]\,?\,(cIdx < 2\,?\,5:3):0))$$

$$qP'' = \qquad\qquad\qquad\qquad\qquad\qquad\qquad\qquad (13)$$
$$\text{Max}\,(0, qP - (\text{cu\_act\_enabled\_flag}[xTbY][yTbY]\,?\,(cIdx < 2\,?\,5:3):0))$$

In other words, the quantization parameter correction device 120 derives the quantization parameter qP to be applied to a transform block to be processed corresponding to the component identifier cIdx by reference to the adaptive color transform flag (cu_act_enabled_flag), the correction amount dqP corresponding to ACT, the transform_skip_flag (transform_skip_flag) corresponding to the component identifier cIdx, the quantization parameter (qPx) at the CU level corresponding to the component identifier cIdx, the minimum value "0" of the quantization parameter at the time of non-transform skip, and the minimum value OpPrimeTsMin of the quantization parameter at the time of transform skip.

By doing so, the quantization parameter correction device 120 can correct the quantization parameter so that the quantization step size Δ<1 is avoided in quantization or inverse quantization when the adaptive color transform and the non-transform skip are applied. That is, the quantization parameter correction device 120 can correct the quantization parameter so that the quantization step size Δ<1 is avoided in the quantization or inverse quantization, regardless of whether or not the transform skip is applied, in the case where the adaptive color transform is applied. Therefore, for example, an encoder or a decoder executes the quantization or the inverse quantization for the coefficient data of an image using the quantization parameter corrected in this manner, so that the reduction in the PSNR can be suppressed and the reduction in the encoding efficiency can be suppressed.

Note that mts_idx may be applied instead of transform_skip_flag, and notification of whether or not the transform skip is applied may be provided as one mode of mts_idx. That is, the quantization parameter correction device 120 (the second correction unit 122) may acquire mts_idx instead of transform_skip_flag and determine whether or not the transform skip is applied on the basis of the value. Furthermore, notification of OpPrimeTsMin may be provided for each component (Y, Cb, Cr, or CbCr). That is, the quantization parameter correction device 120 (the second correction unit 122) may acquire OpPrimeTsMin corresponding to the component identifier cIdx and clip the lower limit of the first corrected quantization parameter qP' using OpPrimeTsMin corresponding to the component identifier cIdx.

<Flow of Quantization Parameter Correction Processing>

Figure 5:
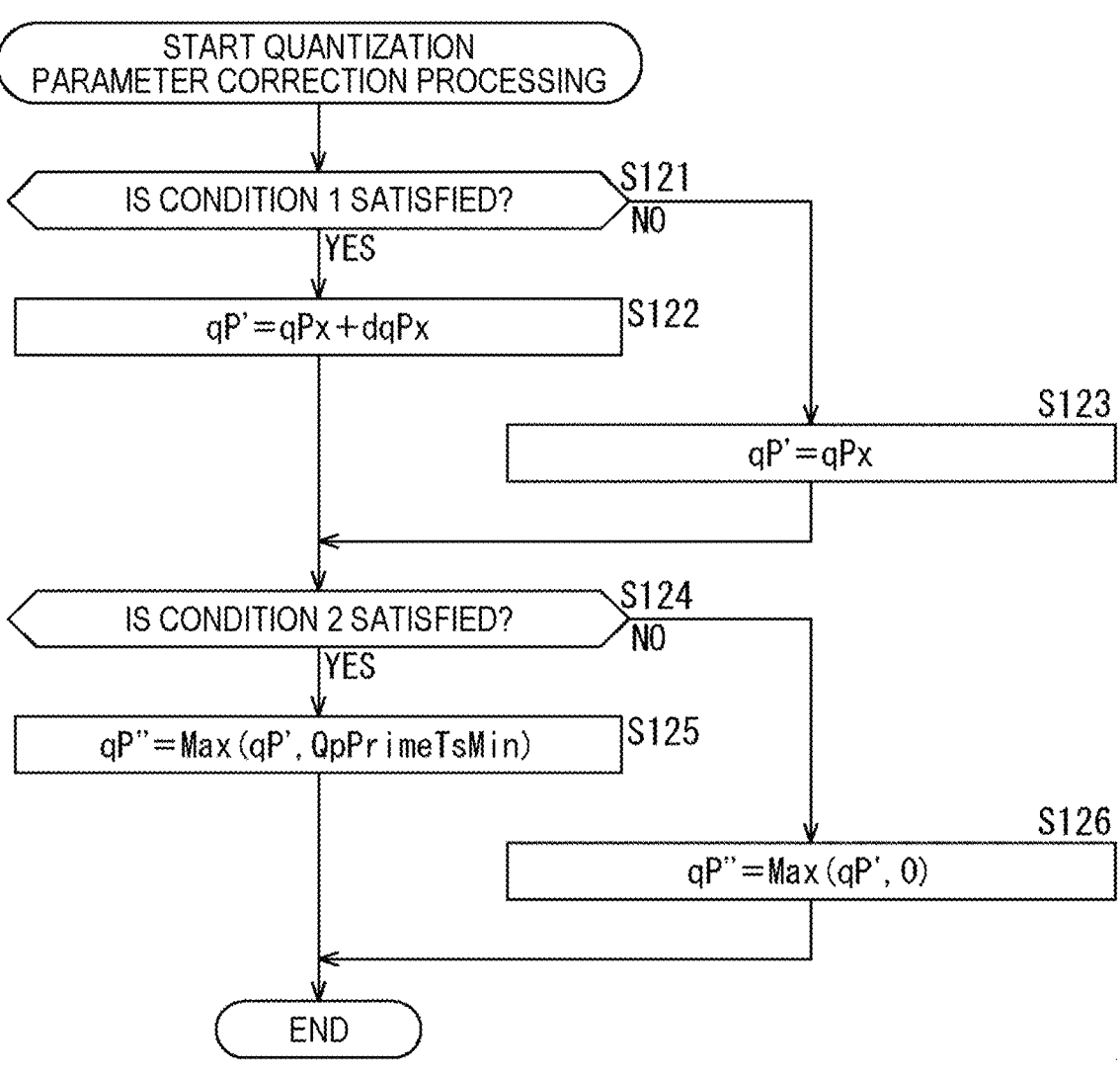
FIG. 5 is a flowchart illustrating an example of a flow of the quantization parameter correction processing.

Next, an example of a flow of quantization parameter correction processing executed by the quantization parameter correction device 120 will be described with reference to a flowchart of FIG. 5.

When the quantization parameter correction processing is started, in step S121, the first correction unit 121 of the quantization parameter correction device 120 determines whether or not to apply the adaptive color transform by determining whether or not condition 1 is satisfied. This condition 1 is similar to the case of the first embodiment (FIG. 3). In a case where it is determined that the condition 1 is satisfied (that is, the adaptive color transform is applied), the processing proceeds to step S122.

In step S122, the first correction unit 121 adds the correction amount dqPx corresponding to the component identifier cIdx to the quantization parameter qPx at the CU level corresponding to the component identifier cIdx to derive the first corrected quantization parameter qP'. This processing is executed similarly to the processing in step S102 of FIG. 3.

When the processing in step S122 is completed, the processing proceeds to step S124. Furthermore, in a case where it is determined in step S121 that the condition 1 is not satisfied (that is, the adaptive color transform is not applied), the processing proceeds to step S123.

In step S123, the first correction unit 121 adds the correction amount "0" to the quantization parameter qPx at the CU level corresponding to the component identifier cIdx to derive the first corrected quantization parameter qP'. This processing is executed similarly to the processing in step S103 of FIG. 3.

When the processing in step S123 is completed, the processing proceeds to step S124.

In step S124, the second correction unit 122 determines whether or not the transform skip is applied by determining whether or not condition 2 is satisfied. This condition 2 is similar to the case of the first embodiment (FIG. 3). When it is determined that Condition 2 is satisfied (that is, the transform skip is performed), the processing proceeds to step S125.

In step S125, the second correction unit 122 clips the lower limit of the first corrected quantization parameter qP' using OpPrimeTsMin to derive the second corrected quantization parameter qP''. This processing is executed similarly to the processing in step S105 of FIG. 3.

When the processing of step S125 ends, the quantization parameter correction processing ends. Furthermore, in a case where it is determined in step S124 that the condition 2 is not satisfied (that is, the non-transform skip is applied), the processing proceeds to step S126.

In step S126, the second correction unit 122 clips the lower limit of the first corrected quantization parameter qP' using the minimum value "0" of the quantization parameter at the time of non-transform skip to derive the second corrected quantization parameter qP''. That is, the second correction unit 122 executes calculation of the following expression (14).

$$qP'' = \mathrm{Max}(0, qP') \qquad (14)$$

When the processing of step S126 ends, the quantization parameter correction processing ends.

By executing the quantization parameter correction processing as described above, the quantization parameter correction device 100 can correct the quantization parameter so that the quantization step size $\Delta < 1$ is avoided in the quantization or the inverse quantization when the adaptive color transform and the non-transform skip are applied. Therefore, for example, an encoder or a decoder executes the quantization or the inverse quantization for the coefficient data of an image using the quantization parameter corrected in this manner, so that the reduction in the PSNR can be suppressed and the reduction in the encoding efficiency can be suppressed.

4. Third Embodiment

<Upper Limit Control of Quantization Parameter>

Moreover, an upper limit of a quantization parameter may be clipped. For example, as illustrated in the fourth row from the top of the table illustrated in FIG. 1, correction of the quantization parameter by adaptive color transform is executed. Then, the corrected quantization parameter may be clipped with a minimum value and a maximum value of the quantization parameter (method 3).

Assuming that the quantization parameter is set in a range from 0 to 63, the minimum value of the quantization parameter is "0", and the maximum value of the quantization parameter is "63+QpBdOffset". Note that QpBdOffset is a correction amount corresponding to a bit depth of the quantization parameter.

For example, in an image processing device, a quantization parameter correction unit may clip an upper limit of the quantization parameter corrected on the basis of a parameter regarding adaptive color transform with the maximum value (63+QpBdOffset) of the quantization parameter and clip a lower limit with the minimum value (value "0") of the quantization parameter.

That is, after the quantization parameter is corrected by adaptive color transform, the quantization parameter may be corrected to fall within a valid value on the basis of the minimum value and the maximum value of the quantization parameter. By doing so, the value of the corrected quantization parameter falls within the range from the minimum value to the maximum value of the quantization parameter. Therefore, reduction in PSNR can be suppressed, and reduction in encoding efficiency can be suppressed.

Note that the clipped quantization parameter may be corrected on the basis of a parameter regarding transform skip. The correction based on the parameter regarding transform skip may be executed similarly to the case of the method 1. Furthermore, in the case of transform skip, a lower limit of the clipped quantization parameter may be further clipped with a minimum value OpPrimeTsMin of the quantization parameter at the time of transform skip. Furthermore, in the case of non-transform skip, the lower limit clipping processing may be skipped (omitted).

By doing so, the corrected quantization parameter does not become a value smaller than OpPrimeTsMin. Therefore, regardless of whether the transform skip or the non-transform skip is applied, the reduction in the PSNR can be suppressed, and the reduction in the encoding efficiency can be suppressed.

Note that, in the case of non-transform skip, the lower limit of the quantization parameter may be clipped with the minimum value (value "0") of the quantization parameter at the time of non-transform skip. Since the lower limit of the quantization parameter to undergo the clipping processing is clipped with the value "0" by the clip for the quantization parameter corrected on the basis of the parameter regarding adaptive color transform described above, a correction result substantially equivalent to the case of skipping the clip with the lower limit is also obtained in this case.

<Quantization Parameter Correction Device>

Figure 6:
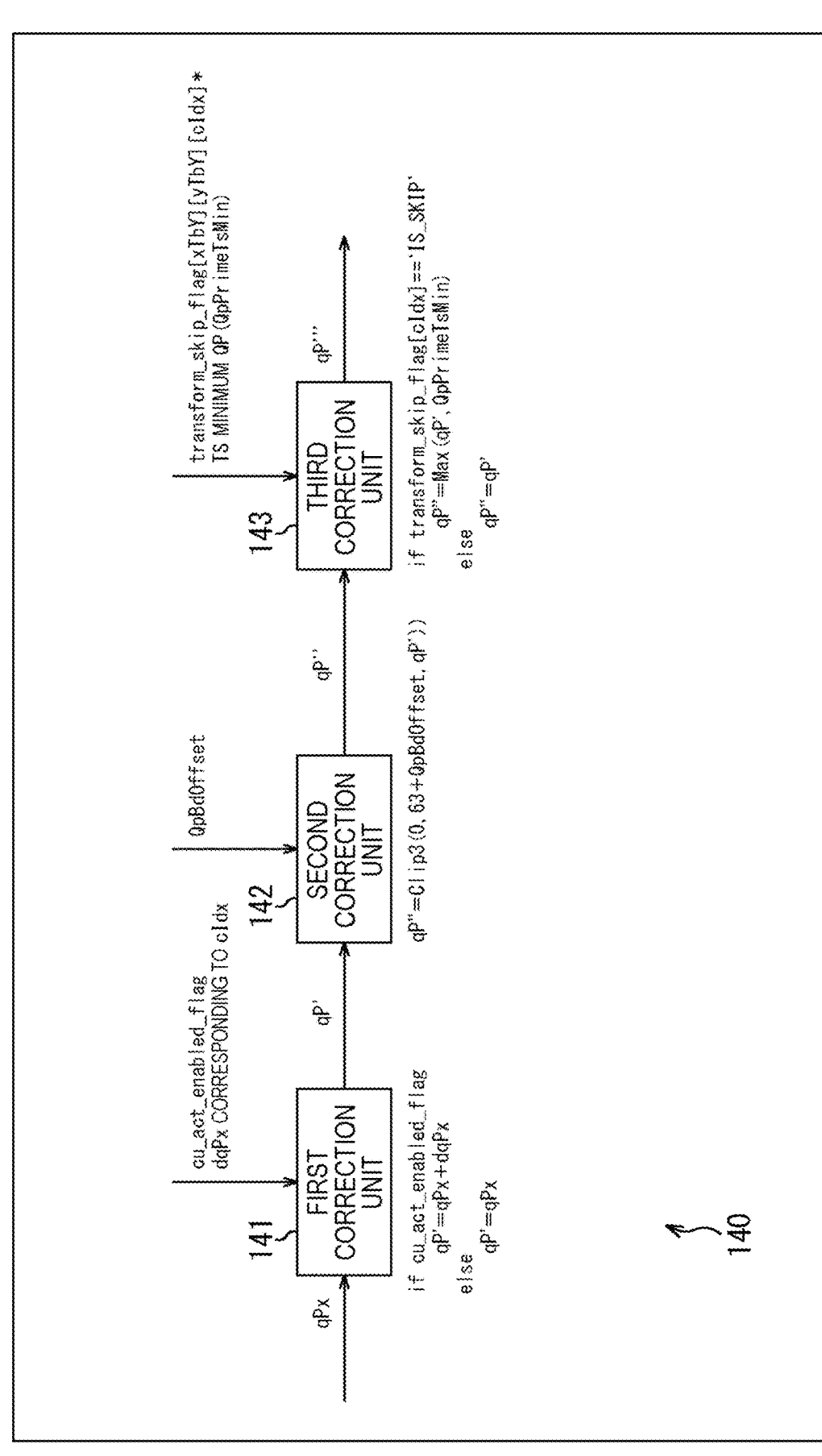
FIG. 6 is a block diagram illustrating a main configuration example of the quantization parameter correction device.

The above-described present technology can be applied to any device. FIG. 6 is a block diagram illustrating an example of a configuration of a quantization parameter correction device that is one aspect of an image processing device to which the present technology is applied. A quantization parameter correction device 140 illustrated in FIG. 6 is a device similar to the quantization parameter correction device 100, and corrects a quantization parameter used for quantization processing and inverse quantization processing of coefficient data related to an image. At that time, the quantization parameter correction device 140 corrects the quantization parameter by applying the above-described "method 3".

Note that FIG. 6 illustrates main processing units, data flows, and the like, and those illustrated in FIG. 6 are not necessarily everything. That is, in the quantization parameter correction device 140, there may be a processing unit not illustrated as a block in FIG. 6, or there may be processing or a data flow not illustrated as an arrow or the like in FIG. 6.

As illustrated in FIG. 6, the quantization parameter correction device 140 includes a first correction unit 141, a second correction unit 142, and a third correction unit 143.

The first correction unit 141 is a processing unit similar to the first correction unit 101 of the quantization parameter correction device 100 and executes similar processing. That is, the first correction unit 141 executes processing regarding correction based on the parameter regarding adaptive color transform. For example, the first correction unit 141 acquires a quantization parameter qPx at a CU level corresponding to a component identifier cIdx indicating a component to be processed. Furthermore, the first correction unit 141 acquires cu_act_enabled_flag as the parameter regarding adaptive color transform. Moreover, the first correction unit 141 acquires a correction amount dqPx corresponding to the component identifier cIdx.

In the case where cu_act_enabled_flag is true (for example, "1"), the first correction unit 141 adds the correction amount dqPx corresponding to the component identifier cIdx to the quantization parameter qPx at the CU level corresponding to the component identifier cIdx to derive a first corrected quantization parameter qP'. Furthermore, in the case where cu_act_enabled_flag is false (for example, "0"), the first correction unit 141 adds the correction amount "0" to the quantization parameter qPx at the CU level corresponding to the component identifier cIdx to derive the first corrected quantization parameter qP'. That is, the first correction unit 141 executes processing of the following syntax.

```
if cu_act_enabled_flag
qP' = qPx + dqPx
else
qP' = qPx
```

The first correction unit 141 supplies the derived first corrected quantization parameter qP' to the second correction unit 142.

The second correction unit 142 executes clipping processing for the first corrected quantization parameter qP'. For example, the second correction unit 142 acquires the first corrected quantization parameter qP' supplied from the first correction unit 141. The second correction unit 142 acquires the correction amount QpBdOffset corresponding to the bit depth.

The second correction unit 142 clips an upper limit of the first corrected quantization parameter qP' with the maximum value (63+QpBdOffset) of the quantization parameter and clips the lower limit of the first corrected quantization parameter qP' with the minimum value (value "0") of the quantization parameter. By this processing, the second correction unit 142 derives a second corrected quantization parameter qP".

In other words, the second correction unit 142 executes processing as in the following expression (15) for the first corrected quantization parameter qP' to derive the second corrected quantization parameter qP".

$$qP'' = \text{Clip} 3(0, 63 + QpBdOffset, qP') \tag{15}$$

The second correction unit 142 supplies the derived second corrected quantization parameter qP" to the third correction unit 143.

Similarly to the second correction unit 102 of the quantization parameter correction device 100, the third correction unit 143 executes processing regarding correction based on the parameter regarding transform skip. For example, the third correction unit 143 acquires the second corrected quantization parameter qP" supplied from the second correction unit 142. Furthermore, the third correction unit 143 acquires transform_skip_flag[xTbY][yTbY][cIdx] corresponding to the component identifier cIdx as the parameter regarding transform skip. Moreover, the third correction unit 143 acquires the minimum value OpPrimeTsMin of the quantization parameter at the time of transform skip as the parameter regarding transform skip.

In the case where transform_skip_flag is true (for example, "1"), the third correction unit 143 clips a lower limit of the second corrected quantization parameter q" using OpPrimeTsMin to derive a third corrected quantization parameter qP'''. In other words, in the case where transform_skip_flag is true, the third correction unit 143 sets OpPrimeTsMin or the second corrected quantization parameter qP", whichever is larger, as the third corrected quantization parameter qP'''.

In contrast, in the case where transform_skip_flag is false (for example, "0"), the third correction unit 143 skips (omits) this clip processing and sets the second corrected quantization parameter qP" as the third corrected quantization parameter qP'''. In other words, in the case where transform_skip_flag is false, the third correction unit 143 clips the lower limit of the first corrected quantization parameter qP' with a minimum value that can be taken on the basis of a specification of hardware, software, or the like, and derives the third corrected quantization parameter qP'''. That is, the third correction unit 143 executes processing of the following syntax.

```
if transform_skip_flag[cIdx] == 'IS_SKIP'
qP''' = Max(qP", QpPrimeTsMin)
else
qP''' = qP"
```

The third correction unit 143 outputs the derived third corrected quantization parameter qP''' to the outside of the quantization parameter correction device 140 as a correction result (corrected quantization parameter) of the input quantization parameter qP.

In other words, in the case of transform skip, the quantization parameter correction device 140 executes processing as illustrated in the following expression (16) to correct the quantization parameter. Furthermore, in the case of non-transform skip, the quantization parameter correction device 140 executes processing as illustrated in the following expression (17) to correct the quantization parameter.

$$qP'' = \text{Max}\left(QpPrimeTsMin, \text{Clip3}(0, 63 + QpBdOffset, \quad (16)\right.$$

$$\left. qP - (cu\_act\_enabled\_flag[xTbY][yTbY] ? (cIdx < 2 ? 5 : 3) : 0))\right)$$

$$qP'' = \text{Clip3}(0, 63 + QpBdOffset, \quad (17)$$

$$qP - (cu\_act\_enabled\_flag[xTbY][yTbY] ? (cIdx < 2 ? 5 : 3) : 0))$$

In other words, the quantization parameter correction device 120 derives the quantization parameter qP to be applied to a transform block to be processed corresponding to the component identifier cIdx by reference to the adaptive color transform flag (cu_act_enabled_flag), the correction amount dqP corresponding to ACT, the transform_skip_flag (transform_skip_flag) corresponding to the component identifier cIdx, the quantization parameter (qPx) at the CU level corresponding to the component identifier cIdx, the correction amount QpBdOffset corresponding to the bit depth, the minimum value "0" of the quantization parameter, the maximum value "63" of the quantization parameter before correction with the correction amount QpBdOffset corresponding to the bit depth, and the minimum value QpPrimeTsMin of the quantization parameter at the time of transform skip.

In this way, the quantization parameter correction device 140 corrects the quantization parameter to fall within a valid value on the basis of the minimum value and the maximum value of the quantization parameter after correcting the quantization parameter by adaptive color transform. That is, by correcting the quantization parameter in this way, the value of the corrected quantization parameter falls within the range from the minimum value to the maximum value of the quantization parameter. Therefore, for example, an encoder or a decoder executes the quantization or the inverse quantization for the coefficient data of an image using the quantization parameter corrected in this manner, so that the reduction in the PSNR can be suppressed and the reduction in the encoding efficiency can be suppressed.

Furthermore, in the case of transform skip, since the lower limit of the quantization parameter is further clipped with the minimum value OpPrimeTsMin of the quantization parameter at the time of the transform skip, the corrected quantization parameter does not become a value smaller than OpPrimeTsMin. Therefore, for example, the encoder or the decoder executes the quantization or the inverse quantization for the coefficient data of an image using the quantization parameter corrected in this manner, so that the reduction in the PSNR can be suppressed and the reduction in the encoding efficiency can be suppressed, regardless of whether the transform skip or the non-transform skip is performed.

Note that mts_idx may be applied instead of transform_skip_flag, and notification of whether or not the transform skip is applied may be provided as one mode of mts_idx. That is, the quantization parameter correction device 140 (third correction unit 143) may acquire mts_idx instead of transform_skip_flag and determine whether or not the transform skip is applied on the basis of the value. Furthermore, notification of OpPrimeTsMin may be provided for each component (Y, Cb, Cr, or CbCr). That is, the quantization parameter correction device 140 (the third correction unit 143) may acquire OpPrimeTsMin corresponding to the component identifier cIdx and clip the lower limit of the second corrected quantization parameter qP" using OpPrimeTsMin corresponding to the component identifier cIdx.

<Flow of Quantization Parameter Correction Processing>

Figure 7:
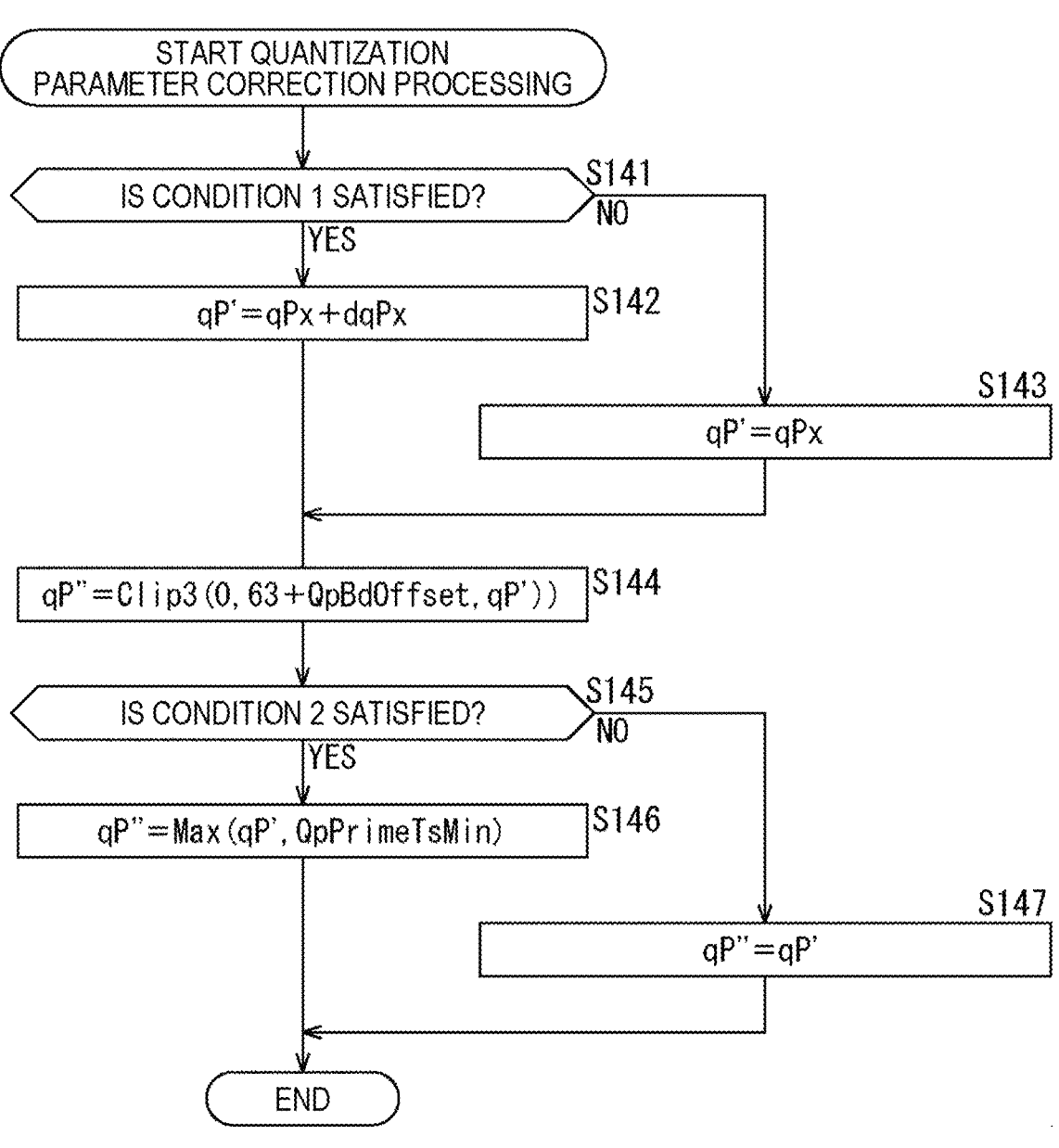
FIG. 7 is a flowchart illustrating an example of a flow of the quantization parameter correction processing.

Next, an example of a flow of quantization parameter correction processing executed by the quantization parameter correction device 140 will be described with reference to a flowchart of FIG. 7.

When the quantization parameter correction processing is started, in step S141, the first correction unit 141 of the quantization parameter correction device 140 determines whether or not to apply the adaptive color transform by determining whether or not condition 1 is satisfied. This condition 1 is similar to the case of the first embodiment (FIG. 3). In a case where it is determined that the condition 1 is satisfied (that is, the adaptive color transform is applied), the processing proceeds to step S142.

In step S142, the first correction unit 141 adds the correction amount dqPx corresponding to the component identifier cIdx to the quantization parameter qPx at the CU level corresponding to the component identifier cIdx to derive the first corrected quantization parameter qP'. This processing is executed similarly to the processing in step S102 of FIG. 3.

When the processing in step S142 is completed, the processing proceeds to step S144. Furthermore, in a case where it is determined in step S141 that the condition 1 is not satisfied (that is, the adaptive color transform is not applied), the processing proceeds to step S143.

In step S143, the first correction unit 141 adds the correction amount "0" to the quantization parameter qPx at the CU level corresponding to the component identifier cIdx to derive the first corrected quantization parameter qP'. This processing is executed similarly to the processing in step S103 of FIG. 3.

When the processing in step S143 is completed, the processing proceeds to step S144.

In step S144, the second correction unit 142 clips the upper limit of the first corrected quantization parameter qP' with the maximum value (63+QpBdOffset) of the quantization parameter and clips the lower limit of the first corrected quantization parameter qP' with the minimum value (value "0") of the quantization parameter. By this processing, the second correction unit 142 derives the second corrected quantization parameter qP".

That is, the second correction unit 142 executes processing as in the above-described expression (15) for the first corrected quantization parameter qP' to derive the second corrected quantization parameter qP". When the processing in step S144 is completed, the processing proceeds to step S145.

In step S145, the third correction unit 143 determines whether or not the transform skip is applied by determining whether or not condition 2 is satisfied. This condition 2 is similar to the case of the first embodiment (FIG. 3). When it is determined that Condition 2 is satisfied (that is, the transform skip is performed), the processing proceeds to step S146.

In step S146, the third correction unit 143 clips the lower limit of the second corrected quantization parameter qP" using OpPrimeTsMin to derive the third corrected quantization parameter qP'". This processing is executed similarly to the processing in step S105 of FIG. 3.

When the processing of step S146 ends, the quantization parameter correction processing ends. Furthermore, in a case where it is determined in step S145 that the condition 2 is not satisfied (that is, the non-transform skip is applied), the processing proceeds to step S147.

In step S147, the third correction unit 143 skips (omits) the clip processing in step S146 and sets the second corrected quantization parameter qP″ as the third corrected quantization parameter qP‴. This processing is executed similarly to the processing in step S106 of FIG. 3.

When the processing of step S147 ends, the quantization parameter correction processing ends.

By executing the quantization parameter correction processing as described above, the quantization parameter correction device 140 can keep the value of the corrected quantization parameter within the range from the minimum value to the maximum value of the quantization parameter.

Therefore, for example, an encoder or a decoder executes the quantization or the inverse quantization for the coefficient data of an image using the quantization parameter corrected in this manner, so that the reduction in the PSNR can be suppressed and the reduction in the encoding efficiency can be suppressed.

Furthermore, even in the case of transform skip, since the lower limit of the quantization parameter is clipped with OpPrimeTsMin, the corrected quantization parameter does not become a value smaller than OpPrimeTsMin. Therefore, for example, the encoder or the decoder executes the quantization or the inverse quantization for the coefficient data of an image using the quantization parameter corrected in this manner, so that the reduction in the PSNR can be suppressed and the reduction in the encoding efficiency can be suppressed, regardless of whether the transform skip or the non-transform skip is performed.

5. Fourth Embodiment

<Upper Limit Control of Quantization Parameter>

The clip processing for the first corrected quantization parameter qP′ in the method 3 described in the third embodiment may be combined with clip processing for correction based on a parameter regarding transform skip.

That is, as illustrated at the bottom of the table illustrated in FIG. 1, quantization parameter correction processing by transform skip may be executed as follows. That is, in a case of transform skip, a lower limit of a first corrected quantization parameter qP′ may be clipped with a minimum value OpPrimeTsMin of a quantization parameter at the time of transform skip, and an upper limit thereof may be clipped with a maximum value (63+QpBdOffset) of the quantization parameter. Furthermore, in a case of non-transform skip, the lower limit of the first corrected quantization parameter qP′ may be clipped with a minimum value "0" of the quantization parameter at the time of non-transform skip, and the upper limit thereof may be clipped with the maximum value (63+QpBdOffset) of the quantization parameter (method 4).

For example, in an image processing device, in a case of applying transform skip, a quantization parameter correction unit clips the lower limit of the quantization parameter corrected on the basis of a parameter regarding adaptive color transform with a preset minimum value of the quantization parameter of the case of applying the transform skip, and clips the upper limit of the quantization parameter corrected on the basis of the parameter regarding adaptive color transform with a preset maximum value of the quantization parameter. The maximum value of the quantization parameter may be a value corrected with a correction amount based on a bit depth. For example, the maximum value of the quantization parameter may be a sum of the maximum value of the quantization parameter before being corrected with the correction amount based on the bit depth and the correction amount based on the bit depth.

Furthermore, for example, in the image processing device, in a case of not applying transform skip, the quantization parameter correction unit clips the lower limit of the quantization parameter corrected on the basis of the parameter regarding adaptive color transform with the preset minimum value of the quantization parameter, and clips the upper limit of the quantization parameter corrected on the basis of the parameter regarding adaptive color transform with the preset maximum value of the quantization parameter. The maximum value of the quantization parameter may be a value corrected with a correction amount based on a bit depth. For example, the maximum value of the quantization parameter may be a sum of the maximum value of the quantization parameter before being corrected with the correction amount based on the bit depth and the correction amount based on the bit depth.

By doing so, the value of the corrected quantization parameter similar to the case of the method 3 is obtained. That is, the value of the corrected quantization parameter falls within a range from the minimum value to the maximum value of the quantization parameter. Therefore, reduction in PSNR can be suppressed, and reduction in encoding efficiency can be suppressed.

Furthermore, in the case of transform skip, since the lower limit of the quantization parameter is clipped with the minimum value OpPrimeTsMin of the quantization parameter at the time of transform skip, the corrected quantization parameter does not become a value smaller than QpPrimeTsMin. Therefore, regardless of whether the transform skip or the non-transform skip is applied, the reduction in the PSNR can be suppressed, and the reduction in the encoding efficiency can be suppressed.

<Quantization Parameter Correction Device>

Figure 8:
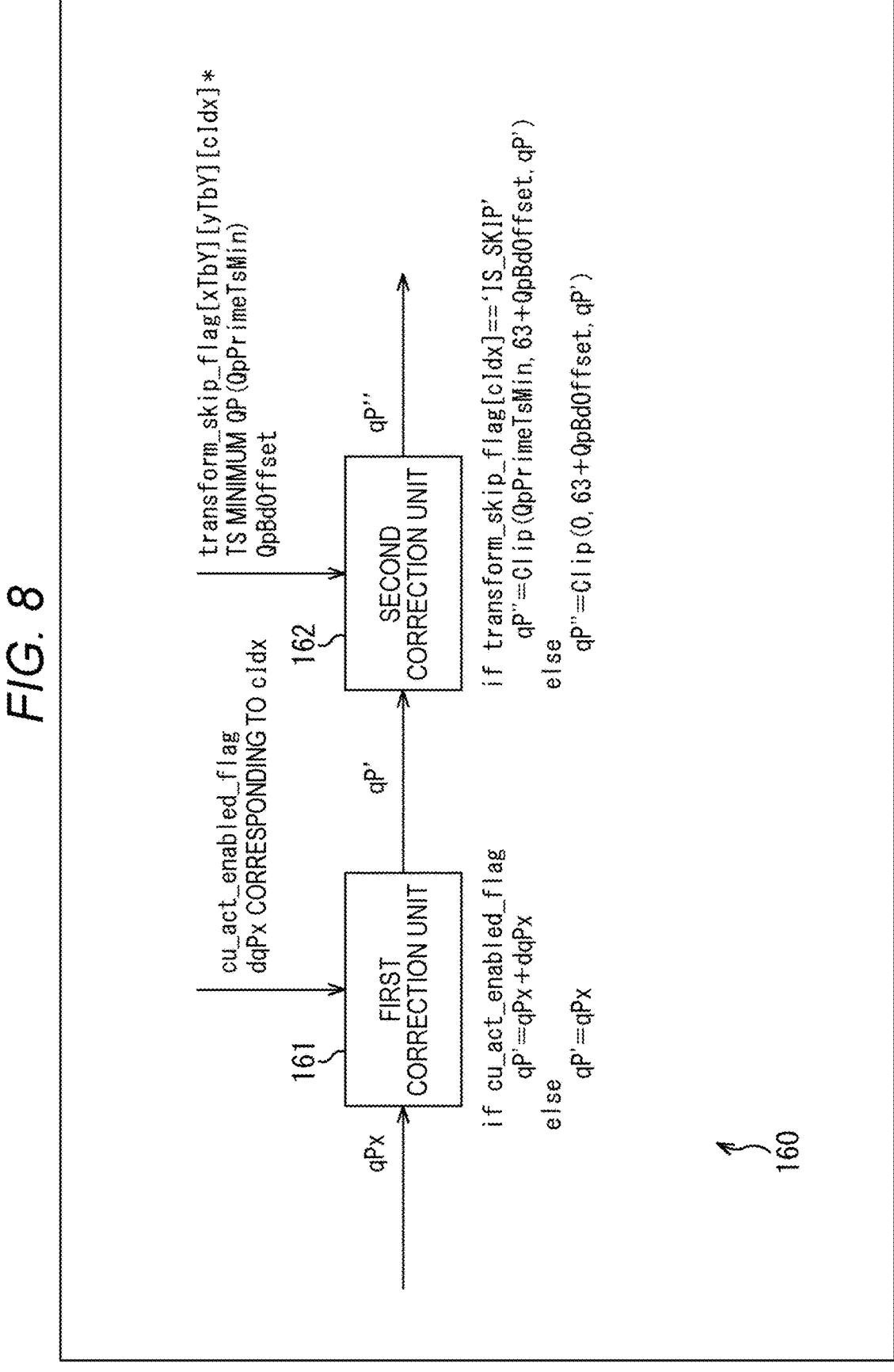
FIG. 8 is a block diagram illustrating a main configuration example of the quantization parameter correction device.

The above-described present technology can be applied to any device. FIG. 8 is a block diagram illustrating an example of a configuration of a quantization parameter correction device that is one aspect of an image processing device to which the present technology is applied. A quantization parameter correction device 160 illustrated in FIG. 8 is a device similar to the quantization parameter correction device 100, and corrects a quantization parameter used for quantization processing and inverse quantization processing of coefficient data related to an image. At that time, the quantization parameter correction device 160 corrects the quantization parameter by applying the above-described "method 4".

Note that FIG. 8 illustrates main processing units, data flows, and the like, and those illustrated in FIG. 8 are not necessarily everything. That is, in the quantization parameter correction device 160, there may be a processing unit not illustrated as a block in FIG. 8, or there may be processing or a data flow not illustrated as an arrow or the like in FIG. 8.

As illustrated in FIG. 8, the quantization parameter correction device 160 includes a first correction unit 161 and a second correction unit 162.

The first correction unit 161 is a processing unit similar to the first correction unit 101 of the quantization parameter correction device 100 and executes similar processing. That is, the first correction unit 161 executes processing regarding correction based on the parameter regarding adaptive color transform. For example, the first correction unit 161 acquires a quantization parameter qPx at a CU level corresponding to a component identifier cIdx indicating a component to be processed. Furthermore, the first correction unit 161 acquires cu_act_enabled_flag as the parameter regarding adaptive color transform. Moreover, the first correction unit 161 acquires a correction amount dqPx corresponding to the component identifier cIdx.

In the case where cu_act_enabled_flag is true (for example, "1"), the first correction unit 161 adds the correction amount dqPx corresponding to the component identifier cIdx to the quantization parameter qPx at the CU level corresponding to the component identifier cIdx to derive a first corrected quantization parameter qP'. Furthermore, in the case where cu_act_enabled_flag is false (for example, "0"), the first correction unit 161 adds the correction amount "0" to the quantization parameter qPx at the CU level corresponding to the component identifier cIdx to derive the first corrected quantization parameter qP'. That is, the first correction unit 161 executes processing of the following syntax.

```
if cu_act_enabled_flag
qP' = qPx + dqPx
else
qP' = qPx
```

The first correction unit 161 supplies the derived first corrected quantization parameter qP' to the second correction unit 162.

Similarly to the second correction unit 102 of the quantization parameter correction device 100, the second correction unit 162 executes processing regarding correction based on the parameter regarding transform skip. For example, the second correction unit 162 acquires the first corrected quantization parameter qP' supplied from the first correction unit 161. Furthermore, the second correction unit 162 acquires transform_skip_flag[xTbY][yTbY][cIdx] corresponding to the component identifier cIdx as the parameter regarding transform skip. Moreover, the second correction unit 162 acquires the minimum value OpPrimeTsMin of the quantization parameter at the time of transform skip as the parameter regarding transform skip.

Moreover, the second correction unit 162 acquires the correction amount QpBdOffset corresponding to the bit depth.

In a case where transform_skip_flag is true (for example, "1"), the second correction unit 162 clips a lower limit of the first corrected quantization parameter qP' using OpPrimeTsMin and clips an upper limit of the first corrected quantization parameter qP' using (63+QpBdOffset). The second correction unit 162 derives a second corrected quantization parameter qP" from the first corrected quantization parameter qP' by such clip processing. That is, the value of the second corrected quantization parameter q" is limited within the range from (OpPrimeTsMin to (63+QpBdOffset)) (the value of the second corrected quantization parameter qP" is controlled to fall within the range from (OpPrimeTsMin to (63+QpBdOffset))).

In contrast, in a case where transform_skip_flag is false (for example, "0"), the second correction unit 162 clips the lower limit of the quantization parameter using the value "0" and clips the upper limit of the first corrected quantization parameter qP' using (63+QpBdOffset). That is, the second correction unit 162 clips the upper limit and the lower limit of the first corrected quantization parameter qP' with the minimum value and the maximum value of the quantization parameter at the time of non-transform skip. The second correction unit 162 derives the second corrected quantization parameter qP" from the first corrected quantization parameter qP' by such clip processing. That is, the value of the second corrected quantization parameter qP" is limited within the range from (0 to (63+QpBdOffset)) (the value of the second corrected quantization parameter q" is controlled to fall within the range from (0 to (63+QpBdOffset))).

That is, the second correction unit 162 executes processing of the following syntax.

```
if transform_skip_flag[cIdx] == 'IS_SKIP'
qP" = Clip3(QpPrimeTsMin, 63+QpBdOffset, qP')
else
qP" = Clip3(0, 63+QpBdOffset, qP')
```

The second correction unit 162 outputs the derived second corrected quantization parameter qP" to the outside of the quantization parameter correction device 160 as a correction result (corrected quantization parameter) of the input quantization parameter qP.

In other words, in the case of transform skip, the quantization parameter correction device 160 executes processing as illustrated in the following expression (16) to correct the quantization parameter. Furthermore, in the case of non-transform skip, the quantization parameter correction device 120 executes processing as illustrated in expression (17) above to correct the quantization parameter.

$$qP'' = \text{Clip } 3(QpPrimeTsMin, 63 + QpBdOffset, \qquad (18)$$
$$qP - (\text{cu\_act\_enabled\_flag}[xTbY][yTbY]?(cIdx < 2?5:3):0))$$

$$qP'' = \text{Clip } 3(0, 63 + QpBdOffset, qP - \qquad (17)(\text{re-described})$$
$$(\text{cu\_act\_enabled\_flag}[xTbY][yTbY]?$$
$$(cIdx < 2?5:3):0))$$

That is, in the case of the method 4, calculation substantially similar to the case of the method 3 is executed, and a similar correction result is obtained.

In other words, the quantization parameter correction device 120 derives, similarly to the case of the method 3, the quantization parameter qP to be applied to a transform block to be processed corresponding to the component identifier cIdx by reference to the adaptive color transform flag (cu_act_enabled_flag), the correction amount dqP corresponding to ACT, the transform_skip_flag (transform_skip_flag) corresponding to the component identifier cIdx, the quantization parameter (qPx) at the CU level corresponding to the component identifier cIdx, the correction amount QpBdOffset corresponding to the bit depth, the minimum value "0" of the quantization parameter, the maximum value "63" of the quantization parameter before correction with the correction amount QpBdOffset corresponding to the bit depth, and the minimum value OpPrimeTsMin of the quantization parameter at the time of transform skip.

In this way, the quantization parameter correction device 160 corrects the quantization parameter to fall within a valid value on the basis of the minimum value and the maximum value of the quantization parameter after correcting the quantization parameter by adaptive color transform, in the case of non-transform skip. Furthermore, the quantization parameter correction device 160 corrects the quantization parameter to fall within a valid value on the basis of the minimum value and the maximum value of the quantization parameter of the case of transform skip after correcting the quantization parameter by adaptive color transform, in the case of transform skip. By doing so, the quantization parameter correction device 100 can correct the quantization parameter so that a quantization step size Δ<1 is avoided in quantization or inverse quantization in the case where the adaptive color transform and the transform skip are applied. Therefore, for example, an encoder or a decoder executes the quantization or the inverse quantization for coefficient data of an image using the quantization parameter corrected in this manner, so that the reduction in the PSNR can be suppressed and the reduction in the encoding efficiency can be suppressed, regardless of whether the transform skip or the non-transform skip is performed.

Note that mts_idx may be applied instead of transform_skip_flag, and notification of whether or not the transform skip is applied may be provided as one mode of mts_idx. That is, the quantization parameter correction device 160 (the second correction unit 162) may acquire mts_idx instead of transform_skip_flag and determine whether or not the transform skip is applied on the basis of the value. Furthermore, notification of OpPrimeTsMin may be provided for each component (Y, Cb, Cr, or CbCr). That is, the quantization parameter correction device 160 (the second correction unit 162) may acquire OpPrimeTsMin corresponding to the component identifier cIdx and clip the lower limit of the first corrected quantization parameter qP' using OpPrimeTsMin corresponding to the component identifier cIdx.

<Flow of Quantization Parameter Correction Processing>

Figure 9:
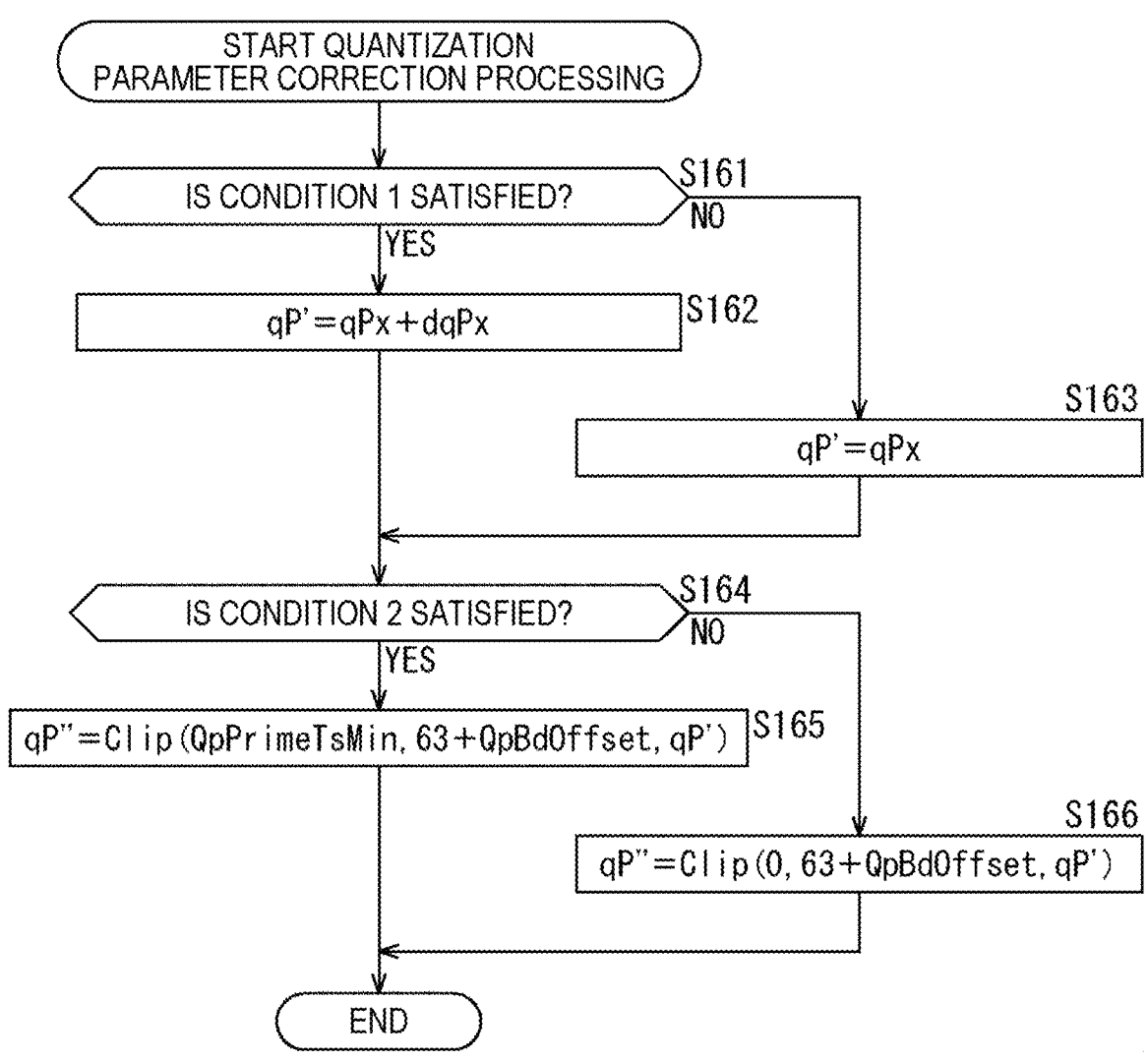
FIG. 9 is a flowchart illustrating an example of a flow of the quantization parameter correction processing.

Next, an example of a flow of quantization parameter correction processing executed by the quantization parameter correction device 160 will be described with reference to a flowchart of FIG. 9.

When the quantization parameter correction processing is started, in step S161, the first correction unit 161 of the quantization parameter correction device 160 determines whether or not to apply the adaptive color transform by determining whether or not condition 1 is satisfied. This condition 1 is similar to the case of the first embodiment (FIG. 3). In a case where it is determined that the condition 1 is satisfied (that is, the adaptive color transform is applied), the processing proceeds to step S162.

In step S162, the first correction unit 161 adds the correction amount dqPx corresponding to the component identifier cIdx to the quantization parameter qPx at the CU level corresponding to the component identifier cIdx to derive the first corrected quantization parameter qP'. This processing is executed similarly to the processing in step S102 of FIG. 3.

When the processing in step S162 is completed, the processing proceeds to step S164. Furthermore, in a case where it is determined in step S161 that the condition 1 is not satisfied (that is, the adaptive color transform is not applied), the processing proceeds to step S163.

In step S163, the first correction unit 161 adds the correction amount "0" to the quantization parameter qPx at the CU level corresponding to the component identifier cIdx to derive the first corrected quantization parameter qP'. This processing is executed similarly to the processing in step S103 of FIG. 3.

When the processing in step S163 is completed, the processing proceeds to step S164.

In step S164, the second correction unit 162 determines whether or not the transform skip is applied by determining whether or not condition 2 is satisfied. This condition 2 is similar to the case of the first embodiment (FIG. 3). When it is determined that the condition 2 is satisfied (that is, the transform skip is performed), the processing proceeds to step S165.

In step S165, the second correction unit 162 clips the upper limit and the lower limit of the first corrected quantization parameter qP' using (63+QpBdOffset) and QpPrimeTsMin to derive the second corrected quantization parameter qP". That is, the second correction unit 162 executes calculation of the following expression (19).

$$qP'' = \text{Clip } 3(QpPrimeTsMin, 63 + QpBdOffset, qP') \qquad (19)$$

When the processing of step S165 ends, the quantization parameter correction processing ends. Furthermore, in a case where it is determined in step S164 that the condition 2 is not satisfied (that is, the non-transform skip is applied), the processing proceeds to step S166.

In step S166, the second correction unit 162 clips the upper limit and the lower limit of the first corrected quantization parameter qP' using (63+QpBdOffset) and the value "0" to derive the second corrected quantization parameter qP". That is, the second correction unit 162 executes calculation of the above-described expression (15).

$$qP'' = \text{Clip } 3(0, 63 + QpBdOffset, qP') \qquad (15)(\text{re-described})$$

When the processing of step S166 ends, the quantization parameter correction processing ends.

By executing the quantization parameter correction processing as described above, the quantization parameter correction device 100 can correct the quantization parameter so that the quantization step size Δ<1 is avoided in the quantization or the inverse quantization when the adaptive color transform and the transform skip are applied. Therefore, for example, an encoder or a decoder executes the quantization or the inverse quantization for the coefficient data of an image using the quantization parameter corrected in this manner, so that the reduction in the PSNR can be suppressed and the reduction in the encoding efficiency can be suppressed.

6. Fifth Embodiment

<Image Encoding Device>

The present technology (various methods) described above can be applied to arbitrary apparatuses, devices, systems, and the like. For example, the present technology can be applied to an image encoding device that encodes image data.

Figure 10:
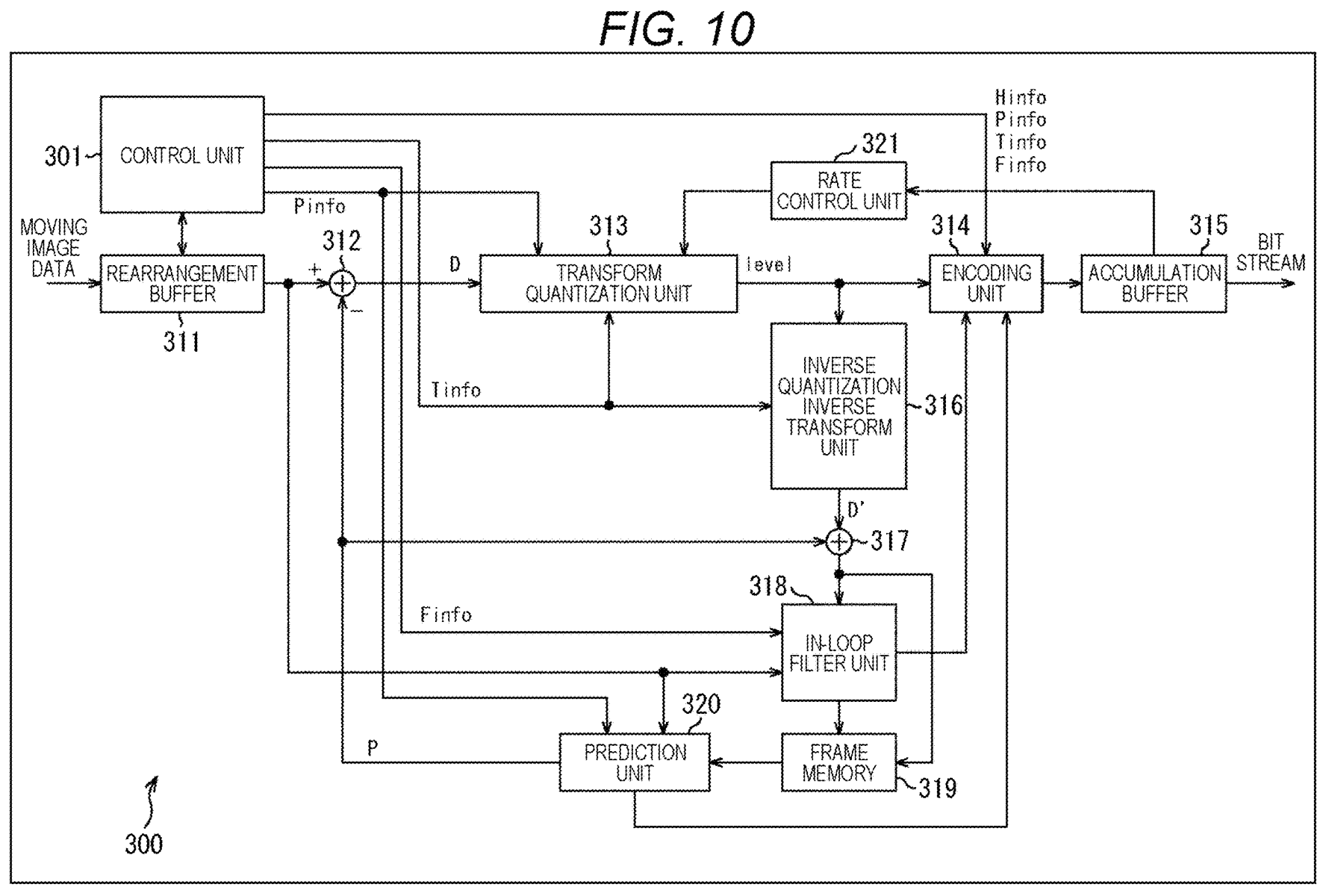

FIG. 10 is a block diagram illustrating an example of a configuration of an image encoding device that is one aspect of an image processing device to which the present technology is applied. An image encoding device 300 illustrated in FIG. 10 is a device that encodes image data of a moving image. For example, the image encoding device 300 encodes image data of a moving image by an encoding method such as versatile video coding (VVC), advanced video coding (AVC), or high efficiency video coding (HEVC) described in the above-described Non-Patent Documents.

Note that FIG. 10 illustrates main processing units, data flows, and the like, and those illustrated in FIG. 10 are not necessarily everything. That is, in the image encoding device 300, there may be a processing unit not illustrated as a block in FIG. 10, or processing or data flow not illustrated as an arrow or the like in FIG. 10. This is similar in other drawings for describing a processing unit and the like in the image encoding device 300.

As illustrated in FIG. 10, the image encoding device 300 includes a control unit 301, a rearrangement buffer 311, a calculation unit 312, a transform quantization unit 313, an encoding unit 314, and an accumulation buffer 315. Furthermore, the image encoding device 300 includes an inverse quantization inverse transform unit 316, a calculation unit 317, an in-loop filter unit 318, a frame memory 319, a prediction unit 320, and a rate control unit 321.

<Control Unit>

The control unit 301 divides moving image data held by the rearrangement buffer 311 into blocks (CUs, PUS, TUs, or the like) in units of processing on the basis of a block size in external or pre-designated units of processing.

Furthermore, the control unit 301 determines encoding parameters (header information Hinfo, prediction mode information Pinfo, transform information Tinfo, filter information Finfo, and the like) to be supplied to each block on the basis of, for example, rate-distortion optimization (RDO). For example, the control unit 301 can set a transform skip flag or the like.

Details of these encoding parameters will be described below. After determining the above-described encoding parameters, the control unit 301 supplies the encoding parameters to each block. Specifically, the encoding parameters are as follows.

The header information Hinfo is supplied to each block. The prediction mode information Pinfo is supplied to the encoding unit 314 and the prediction unit 320. The transform information Tinfo is supplied to the encoding unit 314, the transform quantization unit 313, and the inverse quantization inverse transform unit 316. The filter information Finfo is supplied to the encoding unit 314 and the in-loop filter unit 318.

<Rearrangement Buffer>

Each field (input image) of moving image data is input to the image encoding device 300 in reproduction order (display order). The rearrangement buffer 311 acquires and holds (stores) each input image in its reproduction order (display order). The rearrangement buffer 311 rearranges the input images in encoding order (decoding order) or divides the input images into blocks in units of processing on the basis of the control of the control unit 301. The rearrangement buffer 311 supplies the processed input image to the calculation unit 312.

<Calculation Unit>

The calculation unit 312 subtracts a predicted image P supplied from the prediction unit 320 from an image corresponding to a block in units of processing supplied from the rearrangement buffer 311 to derive residual data D, and supplies the residual data D to the transform quantization unit 313.

<Transform Quantization Unit>

The transform quantization unit 313 executes processing regarding transform quantization. For example, the transform quantization unit 313 acquires the residual data D supplied from the calculation unit 312. Furthermore, the transform quantization unit 313 acquires the prediction mode information Pinfo and the transform information Tinfo supplied from the control unit 301. The transform quantization unit 313 executes transform quantization processing for the residual data D on the basis of the prediction mode information Pinfo and the transform information Tinfo to derive quantized coefficient data level. In the transform quantization processing, for example, pieces of processing such as adaptive color transform, orthogonal transform, and quantization are executed. Of course, the processing included in the transform quantization processing is arbitrary, and some of the above-described pieces of processing may be omitted, or processing other than the above-described pieces of processing may be included. The transform quantization unit 313 supplies the derived quantized coefficient data level to the encoding unit 314 and the inverse quantization inverse transform unit 316.

<Encoding Unit>

The encoding unit 314 acquires the quantized coefficient data level (or the residual data D) supplied from the transform quantization unit 313. Furthermore, the encoding unit 314 acquires various encoding parameters (header information Hinfo, prediction mode information Pinfo, transform information Tinfo, filter information Finfo, and the like) supplied from the control unit 301. Moreover, the encoding unit 314 acquires information regarding a filter such as a filter coefficient supplied from the in-loop filter unit 318. Furthermore, the encoding unit 314 acquires information regarding an optimum prediction mode supplied from the prediction unit 320.

The encoding unit 314 performs entropy encoding (lossless encoding) for the quantized coefficient data level or the residual data D to generate a bit string (coded data). The encoding unit 314 can apply, for example, context-based adaptive binary arithmetic code (CABAC) as the entropy encoding. The encoding unit 314 can apply, for example, context-based adaptive variable length code (CAVLC) as the entropy encoding. Of course, the content of this entropy encoding is arbitrary and is not limited to these examples.

Furthermore, the encoding unit 314 derives residual information Rinfo from the quantized transform coefficient level, and encodes the residual information Rinfo to generate a bit string.

Moreover, the encoding unit 314 includes the information regarding a filter supplied from the in-loop filter unit 318 to the filter information Finfo, and includes the information regarding an optimal prediction mode supplied from the prediction unit 320 to the prediction mode information Pinfo. Then, the encoding unit 314 encodes the above-described various encoding parameters (header information Hinfo, prediction mode information Pinfo, transform information Tinfo, filter information Finfo, and the like) to generate a bit string.

Furthermore, the encoding unit 314 multiplexes the bit string of the various types of information generated as described above to generate coded data. The encoding unit 314 supplies the coded data to the accumulation buffer 315.

<Accumulation Buffer>

The accumulation buffer 315 temporarily stores the coded data obtained by the encoding unit 314. The accumulation buffer 315 outputs the stored coded data to an outside of the image encoding device 300 as a bitstream or the like at predetermined timing. For example, the coded data is transmitted to a decoding side via an arbitrary recording medium, an arbitrary transmission medium, an arbitrary information processing device, or the like. That is, the accumulation buffer 315 is also a transmission unit that transmits coded data (bitstream).

<Inverse Quantization Inverse Transform Unit>

The inverse quantization inverse transform unit 316 executes processing regarding inverse quantization inverse transform. For example, the inverse quantization inverse transform unit 316 acquires the quantized coefficient data level supplied from the transform quantization unit 313. For example, the inverse quantization inverse transform unit 316 acquires the transform information Tinfo supplied from the control unit 301.

The inverse quantization inverse transform unit 316 executes inverse quantization inverse transformation processing for the quantized coefficient data level on the basis of the transformation information Tinfo to derive residual data D'. This inverse quantization inverse transform processing is inverse processing of the transform quantization processing executed in the transform quantization unit 313.

That is, in the inverse quantization inverse transform processing, for example, processing such as inverse quantization, inverse orthogonal transform, and inverse adaptive color transform are executed. The inverse quantization is inverse processing of the quantization executed in the transform quantization unit 313. The inverse orthogonal transform is inverse processing of the orthogonal transform executed in the transform quantization unit 313. The inverse adaptive color transform is inverse processing of the adaptive color transform executed in the transform quantization unit 313. Of course, the processing included in the inverse quantization inverse transform processing is arbitrary, and some of the above-described pieces of processing may be omitted, or processing other than the above-described processing may be included. The inverse quantization inverse transform unit 316 supplies the derived residual data D' to the calculation unit 317.

Note that since the inverse quantization inverse transform unit 316 is similar to an inverse quantization inverse transform unit on a decoding side (to be described below), description of the decoding side (to be described below) can be applied to the inverse quantization inverse transform unit 316.

<Calculation Unit>

The calculation unit 317 acquires the residual data D' supplied from the inverse quantization inverse transform unit 316 and the predicted image P supplied from the prediction unit 320. The calculation unit 317 adds the residual data D' and the predicted image corresponding to the residual data D' to derive a locally decoded image. The calculation unit 317 supplies the derived locally decoded image to the in-loop filter unit 318 and the frame memory 319.

<In-Loop Filter Unit>

The in-loop filter unit 318 executes processing regarding in-loop filter processing. For example, the in-loop filter unit 318 acquires the locally decoded image supplied from the calculation unit 317. For example, the in-loop filter unit 318 acquires the filter information Finfo supplied from the control unit 301. For example, the in-loop filter unit 318 acquires the input image (original image) supplied from the rearrangement buffer 311. Note that the information input to the in-loop filter unit 318 is arbitrary, and information other than the aforementioned information may be included. For example, information such as a prediction mode, motion information, a code amount target value, a quantization parameter QP, a picture type, a block (a CU, a CTU, or the like) may be input to the in-loop filter unit 318, as necessary.

The in-loop filter unit 318 appropriately executes filter processing for the locally decoded image on the basis of the filter information Finfo. The in-loop filter unit 318 also uses the input image (original image) and other input information for the filter processing as necessary.

For example, the in-loop filter unit 318 can apply a bilateral filter as the filter processing. For example, the in-loop filter unit 318 can apply a deblocking filter (DBF) as the filter processing. For example, the in-loop filter unit 318 can apply an adaptive offset filter (sample adaptive offset (SAO)) as the filter processing. For example, the in-loop filter unit 318 can apply an adaptive loop filter (ALF) as the filter processing. Furthermore, the in-loop filter unit 318 can apply a plurality of filters in combination as the filter processing. Note that which filter is applied and in which order the filters are applied are arbitrary and can be selected as appropriate. For example, the in-loop filter unit 318 applies four in-loop filters of the bilateral filter, the deblocking filter, the adaptive offset filter, and the adaptive loop filter in this order as the filter processing.

Of course, the filter processing executed by the in-loop filter unit 318 is arbitrary and is not limited to the above example. For example, the in-loop filter unit 318 may apply a Wiener filter or the like.

The in-loop filter unit 318 supplies the filtered locally decoded image to the frame memory 319. Note that, in a case of transmitting the information regarding filters such as filter coefficients to the decoding side, the in-loop filter unit 318 supplies the information regarding filters to the encoding unit 314.

<Frame Memory>

The frame memory 319 executes processing regarding storage of data related to an image. For example, the frame memory 319 acquires the locally decoded image supplied from the calculation unit 317 and the filtered locally decoded image supplied from the in-loop filter unit 318, and retains (stores) the locally decoded images. Furthermore, the frame memory 319 reconstructs and retains a decoded image for each picture using the locally decoded images (stores the decoded image in a buffer in the frame memory 319). The frame memory 319 supplies the decoded image (or a part thereof) to the prediction unit 320 in response to a request from the prediction unit 320.

<Prediction Unit>

The prediction unit 320 executes processing regarding generation of a predicted image. For example, the prediction unit 320 acquires the prediction mode information Pinfo supplied from the control unit 301. For example, the prediction unit 320 acquires the input image (original image) supplied from the rearrangement buffer 311. For example, the prediction unit 320 acquires the decoded image (or a part thereof) read from the frame memory 319.

The prediction unit 320 executes prediction processing such as inter prediction or intra prediction using the prediction mode information Pinfo and the input image (original image). That is, the prediction unit 320 performs prediction and motion compensation by reference to the decoded image as a reference to generate the predicted image P. The prediction unit 320 supplies the generated predicted image P to the calculation units 312 and 317. Furthermore, the prediction unit 320 supplies the prediction mode selected by the above processing, that is, the information regarding an optimal prediction mode to the encoding unit 314, as necessary.

<Rate control Unit>

The rate control unit 321 executes processing regarding rate control. For example, the rate control unit 321 controls a rate of a quantization operation of the transform quantization unit 313 so that overflow or underflow does not occur on the basis of a code amount of the coded data accumulated in the accumulation buffer 315.

<Application of Present Technology>

The present technology described in <1. Correction of Quantization Parameter>, <2. First Embodiment>, <3. Second Embodiment>, <4. Third Embodiment>, and <5. Fourth Embodiment> can be applied to the image encoding device 300 having the above configuration.

<Control Unit>

For example, in a case of applying the above-described "method 1", the control unit 301 derives a quantization parameter qPx at a CU level corresponding to a component identifier cIdx and supplies the quantization parameter qPx to the transform quantization unit 313 and the inverse quantization inverse transform unit 316. The control unit 301 derives cu_act_enabled_flag as a parameter regarding adaptive color transform, and supplies cu_act_enabled_flag to the transform quantization unit 313 and the inverse quantization inverse transform unit 316. The control unit 301 derives a correction amount dqPx corresponding to the component identifier cIdx as the parameter regarding adaptive color transform, and supplies the correction amount dqPx to the transform quantization unit 313 and the inverse quantization inverse transform unit 316. The control unit 301 derives transform_skip_flag[xTbY][yTbY][cIdx] corresponding to the component identifier cIdx as a parameter regarding transform skip, and supplies the transform_skip_flag[xTbY][yTbY][cIdx] to the transform quantization unit 313 and the inverse quantization inverse transform unit 316. The control unit 301 derives a minimum value OpPrimeTsMin of the quantization parameter at the time of transform skip as the parameter regarding transform skip, and supplies the minimum value OpPrimeTsMin to the transform quantization unit 313 and the inverse quantization inverse transform unit 316. Furthermore, the control unit 301 also supplies these parameters to the encoding unit 314.

For example, in a case of applying the above-described "method 2", the control unit 301 supplies the parameters to be supplied in the case of applying the "method 1" to the transform quantization unit 313, the inverse quantization inverse transform unit 316, and the encoding unit 314. In addition to these parameters, the control unit 301 supplies a minimum value "0" of the quantization parameter at the time of non-transform skip to the inverse quantization inverse transform unit 316 and the encoding unit 314 as the parameter regarding transform skip.

For example, in a case of applying the above-described "method 3", the control unit 301 supplies the parameters to be supplied in the case of applying the "method 1" to the transform quantization unit 313, the inverse quantization inverse transform unit 316, and the encoding unit 314. In addition to these parameters, the control unit 301 supplies a correction amount QpBdOffset corresponding to a bit depth to the transform quantization unit 313, the inverse quantization inverse transform unit 316, and the encoding unit 314.

For example, in a case of applying the above-described "method 4", the control unit 301 supplies the parameters to be supplied in the case of applying the "method 3" to the transform quantization unit 313, the inverse quantization inverse transform unit 316, and the encoding unit 314.

<Transform Quantization Unit>

For example, in the case of applying the above-described "method 1", the transform quantization unit 313 acquires the quantization parameter qPx at the CU level corresponding to the component identifier cIdx supplied from the control unit 301. Furthermore, the transform quantization unit 313 acquires cu_act_enabled_flag supplied from the control unit 301 as the parameter regarding adaptive color transform. The transform quantization unit 313 acquires the correction amount dqPx corresponding to the component identifier cIdx supplied from the control unit 301 as the parameter regarding adaptive color transform. Moreover, the transform quantization unit 313 acquires transform_skip_flag[xTbY][yTbY][cIdx] corresponding to the component identifier cIdx supplied from the control unit 301 as the parameter regarding transform skip. The transform quantization unit 313 acquires the minimum value OpPrimeTsMin of the quantization parameter at the time of transform skip supplied from the control unit 301 as the parameter regarding transform skip. The transform quantization unit 313 executes transform quantization processing using the acquired parameters.

For example, in the case of applying the above-described "method 2", the transform quantization unit 313 acquires the quantization parameter qPx at the CU level corresponding to the component identifier cIdx supplied from the control unit 301. Furthermore, the transform quantization unit 313 acquires cu_act_enabled_flag supplied from the control unit 301 as the parameter regarding adaptive color transform. The transform quantization unit 313 acquires the correction amount dqPx corresponding to the component identifier cIdx supplied from the control unit 301 as the parameter regarding adaptive color transform. Moreover, the transform quantization unit 313 acquires transform_skip_flag[xTbY][yTbY][cIdx] corresponding to the component identifier cIdx supplied from the control unit 301 as the parameter regarding transform skip. The transform quantization unit 313 acquires the minimum value OpPrimeTsMin of the quantization parameter at the time of transform skip supplied from the control unit 301 as the parameter regarding transform skip. The transform quantization unit 313 acquires the minimum value "0" of the quantization parameter at the time of non-transform skip supplied from the control unit 301 as the parameter regarding transform skip. The transform quantization unit 313 executes transform quantization processing using the acquired parameters.

For example, in the case of applying the above-described "method 3", the transform quantization unit 313 acquires the quantization parameter qPx at the CU level corresponding to the component identifier cIdx supplied from the control unit 301. Furthermore, the transform quantization unit 313 acquires cu_act_enabled_flag supplied from the control unit 301 as the parameter regarding adaptive color transform. The transform quantization unit 313 acquires the correction amount dqPx corresponding to the component identifier cIdx supplied from the control unit 301 as the parameter regarding adaptive color transform. Moreover, the transform quantization unit 313 acquires transform_skip_flag[xTbY][yTbY][cIdx] corresponding to the component identifier cIdx supplied from the control unit 301 as the parameter regarding transform skip. The transform quantization unit 313 acquires the minimum value OpPrimeTsMin of the quantization parameter at the time of transform skip supplied from the control unit 301 as the parameter regarding transform skip. The transform quantization unit 313 acquires the correction amount QpBdOffset corresponding to the bit depth supplied from the control unit 301 as the parameter regarding transform skip. The transform quantization unit 313 executes transform quantization processing using the acquired parameters.

For example, in the case of applying the above-described "method 4", the transform quantization unit 313 acquires the same parameters as those acquired in the case of applying the "method 3". The transform quantization unit 313 executes transform quantization processing using the acquired parameters.

Configuration Example of Transform Quantization Unit

Figure 11:
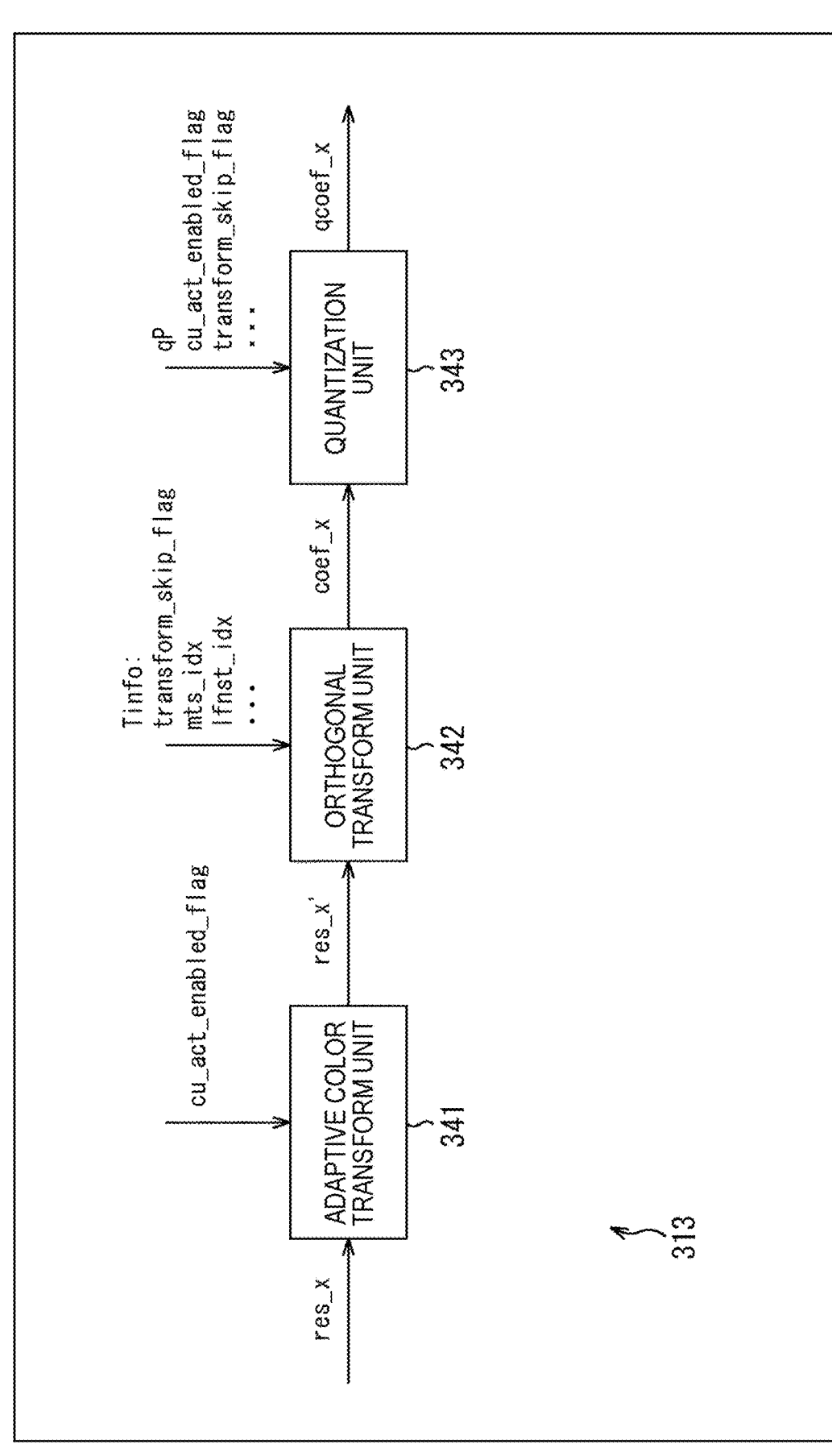
FIG. 11 is a block diagram illustrating a main configuration example of a transform quantization unit.

FIG. 11 is a block diagram illustrating a main configuration example of the transform quantization unit 313 in FIG.

10. As illustrated in FIG. 11, the transform quantization unit 313 includes an adaptive color transform unit 341, an orthogonal transform unit 342, and a quantization unit 343.

The adaptive color transform unit 341 executes processing regarding adaptive color transform (ALT). For example, the adaptive color transform unit 341 acquires residual data res_x (that is, the residual data D in FIG. 10) supplied from the calculation unit 312. The adaptive color transform unit 341 acquires cu_act_enabled_flag supplied from the control unit 301. The adaptive color transform unit 341 executes adaptive color transform for the residual data res_x on the basis of the value of cu_act_enabled_flag. For example, in a case where cu_act_enabled_flag is true (for example, "1"), the adaptive color transform unit 341 executes calculation as described in the expression (1) and performs RGB-to-YCgCo transform for the residual data res_x including R, G, and B components. By the processing, adaptive color transform coefficient data res_x' including components of Y, Cg, and Co is generated. The adaptive color transform unit 341 supplies the generated adaptive color transform coefficient data res_x' to the orthogonal transform unit 342.

The orthogonal transform unit 342 executes processing regarding orthogonal transform. For example, the orthogonal transform unit 342 acquires the adaptive color transform coefficient data res_x' supplied from the adaptive color transform unit 341. The orthogonal transform unit 342 acquires the transform information Tinfo and the prediction mode information Pinfo supplied from the control unit 301. For example, the orthogonal transform unit 342 can acquire information such as transform_skip_flag, mts_idx, and lfnst_idx as the transform information Tinfo. The orthogonal transform unit 342 orthogonally transforms the adaptive color transform coefficient data res_x' using the acquired information to generate orthogonally transformed coefficient data coef_x. The orthogonal transform unit 342 supplies the generated orthogonally transformed coefficient data coef_x to the quantization unit 343.

The quantization unit 343 executes processing regarding quantization. For example, the quantization unit 343 acquires the orthogonally transformed coefficient data coeff_x supplied from the orthogonal transform unit 342. The quantization unit 343 quantizes the orthogonally transformed coefficient data coeff_x to generate quantized coefficient data qcoef_x. The quantization unit 343 supplies the generated quantized coefficient data qcoef_x (that is, the quantized coefficient data level in FIG. 10) to the encoding unit 314 and the inverse quantization inverse transform unit 316.

For example, in the case of applying the above-described "method 1", the quantization unit 343 acquires the quantization parameter qPx at the CU level corresponding to the component identifier cIdx supplied from the control unit 301. Furthermore, the quantization unit 343 acquires cu_act_enabled_flag supplied from the control unit 301 as the parameter regarding the adaptive color transform. The quantization unit 343 acquires the correction amount dqPx corresponding to the component identifier cIdx supplied from the control unit 301 as the parameter regarding the adaptive color transform. Moreover, the quantization unit 343 acquires transform_skip_flag[xTbY][yTbY][cIdx] corresponding to the component identifier cIdx supplied from the control unit 301 as the parameter regarding the transform skip. The quantization unit 343 acquires the minimum value OpPrimeTsMin of the quantization parameter at the time of transform skip supplied from the control unit 301 as the parameter regarding the transform skip.

The quantization unit 343 quantizes the orthogonally transformed coefficient data coeff_x using the acquired parameters to generate the quantized coefficient data qcoef_x.

For example, in the case of applying the above-described "method 2", the quantization unit 343 acquires the quantization parameter qPx at the CU level corresponding to the component identifier cIdx supplied from the control unit 301. Furthermore, the quantization unit 343 acquires cu_act_enabled_flag supplied from the control unit 301 as the parameter regarding the adaptive color transform. The quantization unit 343 acquires the correction amount dqPx corresponding to the component identifier cIdx supplied from the control unit 301 as the parameter regarding the adaptive color transform. Moreover, the quantization unit 343 acquires transform_skip_flag[xTbY][yTbY][cIdx] corresponding to the component identifier cIdx supplied from the control unit 301 as the parameter regarding the transform skip. The quantization unit 343 acquires the minimum value OpPrimeTsMin of the quantization parameter at the time of transform skip supplied from the control unit 301 as the parameter regarding the transform skip. The quantization unit 343 acquires the minimum value "0" of the quantization parameter at the time of non-transform skip supplied from the control unit 301 as the parameter regarding transform skip.

The quantization unit 343 quantizes the orthogonally transformed coefficient data coeff_x using the acquired parameters to generate the quantized coefficient data qcoef_x.

For example, in the case of applying the above-described "method 3", the quantization unit 343 acquires the quantization parameter qPx at the CU level corresponding to the component identifier cIdx supplied from the control unit 301. Furthermore, the quantization unit 343 acquires cu_act_enabled_flag supplied from the control unit 301 as the parameter regarding the adaptive color transform. The quantization unit 343 acquires the correction amount dqPx corresponding to the component identifier cIdx supplied from the control unit 301 as the parameter regarding the adaptive color transform. Moreover, the quantization unit 343 acquires transform_skip_flag[xTbY][yTbY][cIdx] corresponding to the component identifier cIdx supplied from the control unit 301 as the parameter regarding the transform skip. The quantization unit 343 acquires the minimum value OpPrimeTsMin of the quantization parameter at the time of transform skip supplied from the control unit 301 as the parameter regarding the transform skip. The quantization unit 343 acquires the correction amount QpBdOffset corresponding to the bit depth supplied from the control unit 301 as the parameter regarding transform skip.

The quantization unit 343 quantizes the orthogonally transformed coefficient data coeff_x using the acquired parameters to generate the quantized coefficient data qcoef_x.

For example, in the case of applying the above-described "method 4", the quantization unit 343 acquires the same parameters as those acquired in the case of applying the "method 3". The quantization unit 343 quantizes the orthogonally transformed coefficient data coeff_x using the acquired parameters to generate the quantized coefficient data qcoef_x.

Configuration Example of Quantization Unit

Figure 12:
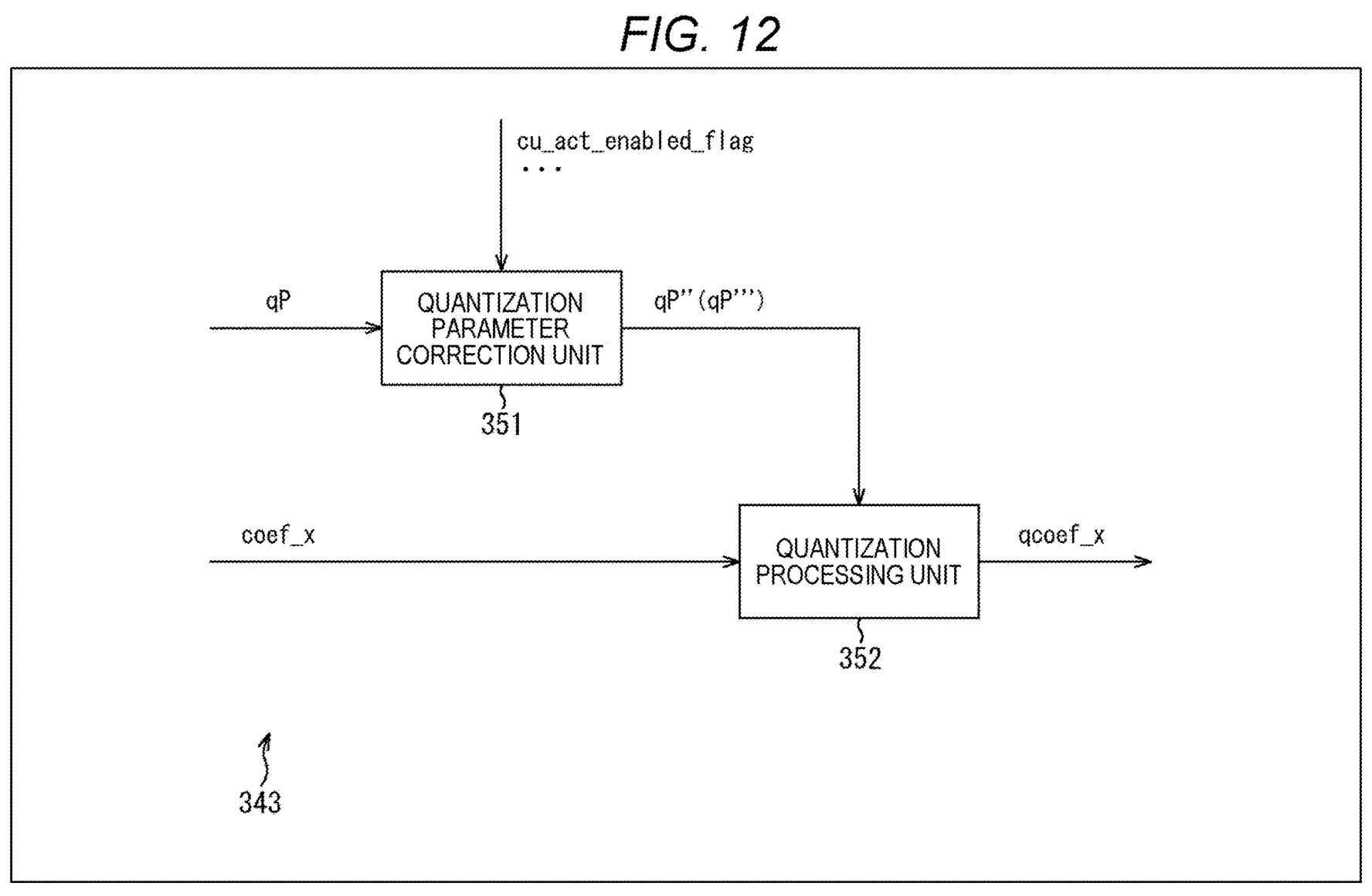

FIG. 12 is a block diagram illustrating a main configuration example of the quantization unit 343 in FIG. 11. As illustrated in FIG. 12, the quantization unit 343 includes a quantization parameter correction unit 351 and a quantization processing unit 352.

The quantization parameter correction unit 351 executes processing regarding correction of the quantization parameter. For example, the quantization parameter correction unit 351 acquires the quantization parameter qPx at the CU level corresponding to the component identifier cIdx. The quantization parameter correction unit 351 corrects the quantization parameter qPx at the CU level corresponding to the component identifier cIdx and supplies the corrected quantization parameter that is the quantization parameter after correction to the quantization processing unit 352.

The quantization processing unit 352 executes processing regarding quantization. For example, the quantization processing unit 352 acquires the orthogonally transformed coefficient data coef_x supplied from the orthogonal transform unit 342. The quantization processing unit 352 acquires the corrected quantization parameter supplied from the quantization parameter correction unit 351. The quantization processing unit 352 quantizes the orthogonally transformed coefficient data coef_x using the corrected quantization parameter to generate the quantized coefficient data qcoef_x. The quantization processing unit 352 supplies the generated quantized coefficient data qcoef_x (that is, the quantized coefficient data level in FIG. 10) to the encoding unit 314 and the inverse quantization inverse transform unit 316.

In a case where the present technology is applied in the quantization unit 343 having the above-described configuration, the quantization parameter correction unit 351 corrects the quantization parameter on the basis of the parameter regarding adaptive color transform and further corrects the quantization parameter on the basis of the parameter regarding transform skip. The quantization processing unit 352 quantizes the coefficient data of an image to be encoded by using the corrected quantization parameter that is the quantization parameter corrected by the quantization parameter correction unit 351.

For example, in the case of applying the above-described "method 1", the quantization parameter correction device 100 (FIG. 2) is applied as the quantization parameter correction unit 351. That is, the quantization parameter correction unit 351 acquires the quantization parameter qPx at the CU level corresponding to the component identifier cIdx supplied from the control unit 301. Furthermore, the quantization parameter correction unit 351 acquires cu_act_enabled_flag supplied from the control unit 301 as the parameter regarding the adaptive color transform. The quantization parameter correction unit 351 acquires the correction amount dqPx corresponding to the component identifier cIdx supplied from the control unit 301 as the parameter regarding the adaptive color transform. Moreover, the quantization parameter correction unit 351 acquires transform_skip_flag[xTbY][yTbY][cIdx] corresponding to the component identifier cIdx supplied from the control unit 301 as the parameter regarding transform skip. The quantization parameter correction unit 351 acquires the minimum value OpPrimeTsMin of the quantization parameter at the time of transform skip supplied from the control unit 301 as the parameter regarding transform skip.

The quantization parameter correction unit 351 corrects qPx by a method as described in the first embodiment, using the acquired cu_act_enabled_flag, dqPx, transform_skip_flag[xTbY][yTbY][cIdx], and OpPrimeTsMin. That is, the quantization parameter correction unit 351 executes calculation as in the expression (5) or the expression (6) to generate the second corrected quantization parameter qP".

The quantization parameter correction unit 351 supplies the generated second corrected quantization parameter qP" to the quantization processing unit 352.

By doing so, the quantization parameter correction unit 351 can correct the quantization parameter so that a quantization step size Δ<1 is avoided in the quantization when the adaptive color transform and the transform skip are applied. Therefore, the quantization processing unit 352 quantizes the coefficient data of an image using the quantization parameter corrected in this way, so that the quantization unit 343 (transform quantization unit 313) can suppress the reduction in the PSNR. Therefore, the image encoding device 300 can suppress the reduction in the encoding efficiency.

For example, in the case of applying the above-described "method 2", the quantization parameter correction device 120 (FIG. 4) is applied as the quantization parameter correction unit 351. That is, the quantization parameter correction unit 351 acquires the quantization parameter qPx at the CU level corresponding to the component identifier cIdx supplied from the control unit 301. Furthermore, the quantization parameter correction unit 351 acquires cu_act_enabled_flag supplied from the control unit 301 as the parameter regarding the adaptive color transform. The quantization parameter correction unit 351 acquires the correction amount dqPx corresponding to the component identifier cIdx supplied from the control unit 301 as the parameter regarding the adaptive color transform. Moreover, the quantization parameter correction unit 351 acquires transform_skip_flag[xTbY][yTbY][cIdx] corresponding to the component identifier cIdx supplied from the control unit 301 as the parameter regarding transform skip. The quantization parameter correction unit 351 acquires the minimum value OpPrimeTsMin of the quantization parameter at the time of transform skip supplied from the control unit 301 as the parameter regarding transform skip. The quantization parameter correction unit 351 acquires the minimum value "0" of the quantization parameter at the time of non-transform skip supplied from the control unit 301 as the parameter regarding transform skip.

The quantization parameter correction unit 351 corrects qPx by a method as described in the second embodiment, using the acquired cu_act_enabled_flag, dqPx, transform_skip_flag[xTbY][yTbY][cIdx], OpPrimeTsMin, and the value "0". That is, the quantization parameter correction unit 351 executes calculation as in the expression (5) or the expression (13) to generate the second corrected quantization parameter qP". The quantization parameter correction unit 351 supplies the generated second corrected quantization parameter qP" to the quantization processing unit 352.

By doing so, the quantization parameter correction unit 351 can correct the quantization parameter so that the quantization step size Δ<1 is avoided in the quantization, regardless of whether or not the transform skip is applied, in the case where the adaptive color transform is applied. Therefore, the quantization processing unit 352 quantizes the coefficient data of an image using the quantization parameter corrected in this way, so that the quantization unit 343 (transform quantization unit 313) can suppress the reduction in the PSNR. Therefore, the image encoding device 300 can suppress the reduction in the encoding efficiency.

For example, in the case of applying the above-described "method 3", the quantization parameter correction device 140 (FIG. 6) is applied as the quantization parameter correction unit 351. That is, the quantization parameter correction unit 351 acquires the quantization parameter qPx at the CU level corresponding to the component identifier cIdx supplied from the control unit 301. Furthermore, the quantization parameter correction unit 351 acquires cu_act_enabled_flag supplied from the control unit 301 as the parameter regarding the adaptive color transform. The quantization parameter correction unit 351 acquires the correction amount dqPx corresponding to the component identifier cIdx supplied from the control unit 301 as the parameter regarding the adaptive color transform. Moreover, the quantization parameter correction unit 351 acquires transform_skip_flag[xTbY][yTbY][cIdx] corresponding to the component identifier cIdx supplied from the control unit 301 as the parameter regarding transform skip. The quantization parameter correction unit 351 acquires the minimum value OpPrimeTsMin of the quantization parameter at the time of transform skip supplied from the control unit 301 as the parameter regarding transform skip. The quantization parameter correction unit 351 acquires the correction amount QpBdOffset corresponding to the bit depth supplied from the control unit 301 as the parameter regarding transform skip.

The quantization parameter correction unit 351 corrects qPx by a method as described in the third embodiment, using the acquired cu_act_enabled_flag, dqPx, transform_skip_flag[xTbY][yTbY][cIdx], OpPrimeTsMin, and QpBdOffset. That is, the quantization parameter correction unit 351 executes calculation as in the expression (16) or the expression (17) to generate the third corrected quantization parameter qP'''. The quantization parameter correction unit 351 supplies the generated third corrected quantization parameter qP''' to the quantization processing unit 352.

By doing so, the value of the corrected quantization parameter falls within a range of a minimum value to a maximum value of the quantization parameter, regardless of whether or not the transform skip is applied. Furthermore, in the case of transform skip, the lower limit of the quantization parameter is further clipped with the minimum value OpPrimeTsMin of the quantization parameter at the time of the transform skip. That is, the quantization parameter correction unit 351 can correct the quantization parameter so that the quantization step size $\Delta<1$ is avoided in the quantization, regardless of whether or not the transform skip is applied, in the case where the adaptive color transform is applied. Therefore, the quantization processing unit 352 quantizes the coefficient data of an image using the quantization parameter corrected in this way, so that the quantization unit 343 (transform quantization unit 313) can suppress the reduction in the PSNR. Therefore, the image encoding device 300 can suppress the reduction in the encoding efficiency.

For example, in the case of applying the above-described "method 4", the quantization parameter correction device 160 (FIG. 8) is applied as the quantization parameter correction unit 351. That is, the quantization parameter correction unit 351 acquires parameters similar to those in the case of the "method 3".

The quantization parameter correction unit 351 corrects qPx by a method as described in the fourth embodiment, using the acquired parameters (cu_act_enabled_flag, dqPx, transform_skip_flag[xTbY][yTbY][cIdx], OpPrimeTsMin, and QpBdOffset). That is, the quantization parameter correction unit 351 executes calculation as in the expression (18) or the expression (17) to generate the second corrected quantization parameter qP''. The quantization parameter correction unit 351 supplies the generated second corrected quantization parameter qP'' to the quantization processing unit 352.

That is, in the case of the method 4, calculation substantially similar to the case of the method 3 is executed, and a similar correction result is obtained. Therefore, even in this case, the quantization parameter correction unit 351 can correct the quantization parameter so that the quantization step size $\Delta<1$ is avoided in the quantization, regardless of whether or not the transform skip is applied, in the case where the adaptive color transform is applied, similarly to the case of the method 3. Therefore, the quantization processing unit 352 quantizes the coefficient data of an image using the quantization parameter corrected in this way, so that the quantization unit 343 (transform quantization unit 313) can suppress the reduction in the PSNR. Therefore, the image encoding device 300 can suppress the reduction in the encoding efficiency.

<Encoding Unit>

For example, in the case of applying the above-described "method 1", the encoding unit 314 acquires the quantization parameter qPx at the CU level corresponding to the component identifier cIdx supplied from the control unit 301. Furthermore, the encoding unit 314 acquires cu_act_enabled_flag supplied from the control unit 301 as the parameter regarding the adaptive color transform. The encoding unit 314 acquires the correction amount dqPx corresponding to the component identifier cIdx supplied from the control unit 301 as the parameter regarding the adaptive color transform. Moreover, the encoding unit 314 acquires transform_skip_flag[xTbY][yTbY][cIdx] corresponding to the component identifier cIdx supplied from the control unit 301 as the parameter regarding the transform skip. The encoding unit 314 acquires the minimum value OpPrimeTsMin of the quantization parameter at the time of transform skip supplied from the control unit 301 as the parameter regarding transform skip. The encoding unit 314 encodes the acquired parameters, generates a bit string, and includes the bit string in the coded data.

By doing so, these pieces of information are signaled. That is, these pieces of information are supplied to the decoding-side device (decoder or the like). Therefore, the decoding-side device can correct the quantization parameter so that the quantization step size $\Delta<1$ is avoided in the case where the adaptive color transform and the transform skip are applied in the decoding processing. Therefore, the decoding-side device can execute inverse quantization using the quantization parameter corrected in this manner in the decoding processing. Therefore, the decoding side device can suppress the reduction in the PSNR. Therefore, the decoding-side device can implement suppression of reduction in the encoding efficiency.

For example, in the case of applying the above-described "method 2", the encoding unit 314 acquires the quantization parameter qPx at the CU level corresponding to the component identifier cIdx supplied from the control unit 301. Furthermore, the encoding unit 314 acquires cu_act_enabled_flag supplied from the control unit 301 as the parameter regarding the adaptive color transform. The encoding unit 314 acquires the correction amount dqPx corresponding to the component identifier cIdx supplied from the control unit 301 as the parameter regarding the adaptive color transform. Moreover, the encoding unit 314 acquires transform_skip_flag[xTbY][yTbY][cIdx] corresponding to the component identifier cIdx supplied from the control unit 301 as the parameter regarding the transform skip. The encoding unit 314 acquires the minimum value OpPrimeTsMin of the quantization parameter at the time of transform skip supplied from the control unit 301 as the parameter regarding transform skip. The encoding unit 314 acquires the minimum value "0" of the quantization parameter at the time of non-transform skip supplied from the control unit 301 as the parameter regarding transform skip. The encoding unit 314 encodes the acquired parameters, generates a bit string, and includes the bit string in the coded data.

By doing so, these pieces of information are signaled. That is, these pieces of information are supplied to the decoding-side device (decoder or the like). Therefore, the decoding side device can correct the quantization parameter so that the quantization step size $\Delta<1$ is avoided in the case of applying adaptive color transform, regardless of whether or not the transform skip is applied in the decoding processing. Therefore, the decoding-side device can execute inverse quantization using the quantization parameter corrected in this manner in the decoding processing. Therefore, the decoding side device can suppress the reduction in the PSNR. Therefore, the decoding-side device can implement suppression of reduction in the encoding efficiency.

For example, in the case of applying the above-described "method 3", the encoding unit 314 acquires the quantization parameter qPx at the CU level corresponding to the component identifier cIdx supplied from the control unit 301. Furthermore, the encoding unit 314 acquires cu_act_en-abled_flag supplied from the control unit 301 as the parameter regarding the adaptive color transform. The encoding unit 314 acquires the correction amount dqPx corresponding to the component identifier cIdx supplied from the control unit 301 as the parameter regarding the adaptive color transform. Moreover, the encoding unit 314 acquires trans-form_skip_flag[xTbY][yTbY][cIdx] corresponding to the component identifier cIdx supplied from the control unit 301 as the parameter regarding the transform skip. The encoding unit 314 acquires the minimum value OpPrimeTsMin of the quantization parameter at the time of transform skip sup-plied from the control unit 301 as the parameter regarding transform skip. The encoding unit 314 acquires the correc-tion amount QpBdOffset corresponding to the bit depth supplied from the control unit 301 as the parameter regard-ing transform skip. The encoding unit 314 encodes the acquired parameters, generates a bit string, and includes the bit string in the coded data.

By doing so, these pieces of information are signaled. That is, these pieces of information are supplied to the decoding-side device (decoder or the like). Therefore, the value of the corrected quantization parameter falls within the range from the minimum value to the maximum value of the quantization parameter regardless of whether or not the transform skip is applied in the decoding processing by the decoding-side device. Furthermore, in the case of transform skip, the lower limit of the quantization parameter is further clipped with the minimum value QpPrimeTsMin of the quantization parameter at the time of the transform skip. That is, the decoding side device can correct the quantization parameter so that the quantization step size $\Delta<1$ is avoided in the case of applying adaptive color transform, regardless of whether or not the transform skip is applied in the decoding processing. Therefore, the decoding-side device can execute inverse quantization using the quantization parameter corrected in this manner in the decoding process-ing. Therefore, the decoding side device can suppress the reduction in the PSNR. Therefore, the decoding-side device can implement suppression of reduction in the encoding efficiency.

For example, in the case of applying the above-described "method 4", the encoding unit 314 acquires parameters similar to those in the case of the "method 3". The encoding unit 314 encodes the acquired parameters (cu_act_enabled_ flag, dqPx, transform_skip_flag[xTbY][yTbY][cIdx], OpP-rimeTsMin, and QpBdOffset), generates a bit string, and includes the bit string in the coded data.

By doing so, these pieces of information are signaled. That is, these pieces of information are supplied to the decoding-side device (decoder or the like). Therefore, even in this case, the decoding side device can correct the quantization parameter so that the quantization step size $\Delta<1$ is avoided in the case of applying adaptive color transform, regardless of whether or not the transform skip is applied in the decoding processing. Therefore, the decoding-side device can execute inverse quantization using the quantiza-tion parameter corrected in this manner in the decoding processing. Therefore, the decoding side device can sup-press the reduction in the PSNR. Therefore, the decoding-side device can implement suppression of reduction in the encoding efficiency.

<Flow of Image Encoding Processing>

Next, a flow of each processing executed by the above image encoding device 300 will be described. First, an example of a flow of image encoding processing will be described with reference to the flowchart in FIG. 13.

When the image encoding processing is started, in step S301, the rearrangement buffer 311 is controlled by the control unit 301 and rearranges frames of input moving image data from the display order to the encoding order.

In step S302, the control unit 301 sets the unit of pro-cessing (performs block division) for an input image held by the rearrangement buffer 311.

In step S303, the control unit 301 sets the encoding parameters (for example, header information Hinfo, predic-tion mode information Pinfo, transform information Tinfo, and the like) for the input image held by the rearrangement buffer 311.

In step S304, the prediction unit 320 executes the predic-tion processing and generates a predicted image or the like in an optimum prediction mode. For example, in the pre-diction processing, the prediction unit 320 executes the intra prediction to generate a predicted image in an optimal intra prediction mode, executes the inter prediction to generate a predicted image in an optimal inter prediction mode, and selects an optimal prediction mode from among the pre-dicted images on the basis of a cost function value and the like.

In step S305, the calculation unit 312 calculates a differ-ence between the input image and the predicted image in the optimal mode selected by the prediction processing in step S304. That is, the calculation unit 312 generates the residual data D between the input image and the predicted image. The residual data D obtained in this manner has a smaller data amount than the original image data. Therefore, the data amount can be compressed as compared with a case of encoding the image as it is.

In step S306, the transform quantization unit 313 executes the transform quantization processing for the residual data D generated by the processing in step S305, using the encoding parameters such as the transform information Tinfo gener-ated in step S303, and generates the quantized coefficient data level.

In step S307, the inverse quantization inverse transform unit 316 executes the inverse quantization inverse transform processing for the quantized coefficient data level generated in step S306, using the encoding parameters such as the transform information Tinfo generated in step S303, and generates the residual data D'.

This inverse quantization inverse transform processing is inverse processing of the transform quantization processing of step S306. A decoding-side device (image decoding device 400) to be described below also executes similar processing. Therefore, the inverse quantization inverse transform processing will be described as processing of the decoding-side device (the image decoding device 400). Then, the description can be applied to this inverse quantization inverse transform processing (step S307).

In step S308, the calculation unit 317 adds the predicted image obtained by the prediction processing in step S304 to the residual data D' obtained by the inverse quantization inverse transform processing in step S307, thereby generating a locally decoded image.

In step S309, the in-loop filter unit 318 executes the in-loop filter processing for the locally decoded image derived by the processing in step S308.

In step S310, the frame memory 319 stores the locally decoded image derived by the processing in step S308 and the locally decoded image filtered in step S309.

In step S311, the encoding unit 314 encodes the quantized coefficient data level obtained by the transform quantization processing in step S306 to generate coded data. Furthermore, at this time, the encoding unit 314 encodes the various encoding parameters (header information Hinfo, prediction mode information Pinfo, and transform information Tinfo). Moreover, the encoding unit 314 derives the residual information RInfo from the quantized transform coefficient data level and encodes the residual information RInfo.

In step S312, the accumulation buffer 315 accumulates the coded data thus obtained, and outputs the coded data to the outside of the image encoding device 300, for example, as a bitstream. The bitstream is transmitted to the decoding-side device via a transmission path or a recording medium, for example. Furthermore, the rate control unit 321 controls the rate as necessary. When the processing in step S312 ends, the image encoding processing ends.

<Flow of Transform Quantization Processing>

Next, an example of a flow of the transform quantization processing executed in step S306 of FIG. 13 will be described with reference to the flowchart of FIG. 14.

When the transform quantization processing is started, in step S341, the adaptive color transform unit 341 performs adaptive color transform for the residual data res_x generated by the processing of step S305 on the basis of cu_act_enabled_flag generated in step S303 (FIG. 13) to generate the adaptive color transform coefficient data res_x'.

In step S342, the orthogonal transform unit 342 orthogonally transforms the adaptive color transform coefficient data res_x' generated in step S341 by using the transform information Tinfo, the prediction mode information Pinfo, and the like generated in step S303 (FIG. 13) to generate the orthogonally transformed coefficient data coef_x.

In step S343, the quantization unit 343 quantizes the orthogonally transformed coefficient data coef_x generated in step S342 by using the transform information Tinfo and the like generated in step S303 (FIG. 13) to generate the quantized coefficient data qcoef_x.

Figure 13:
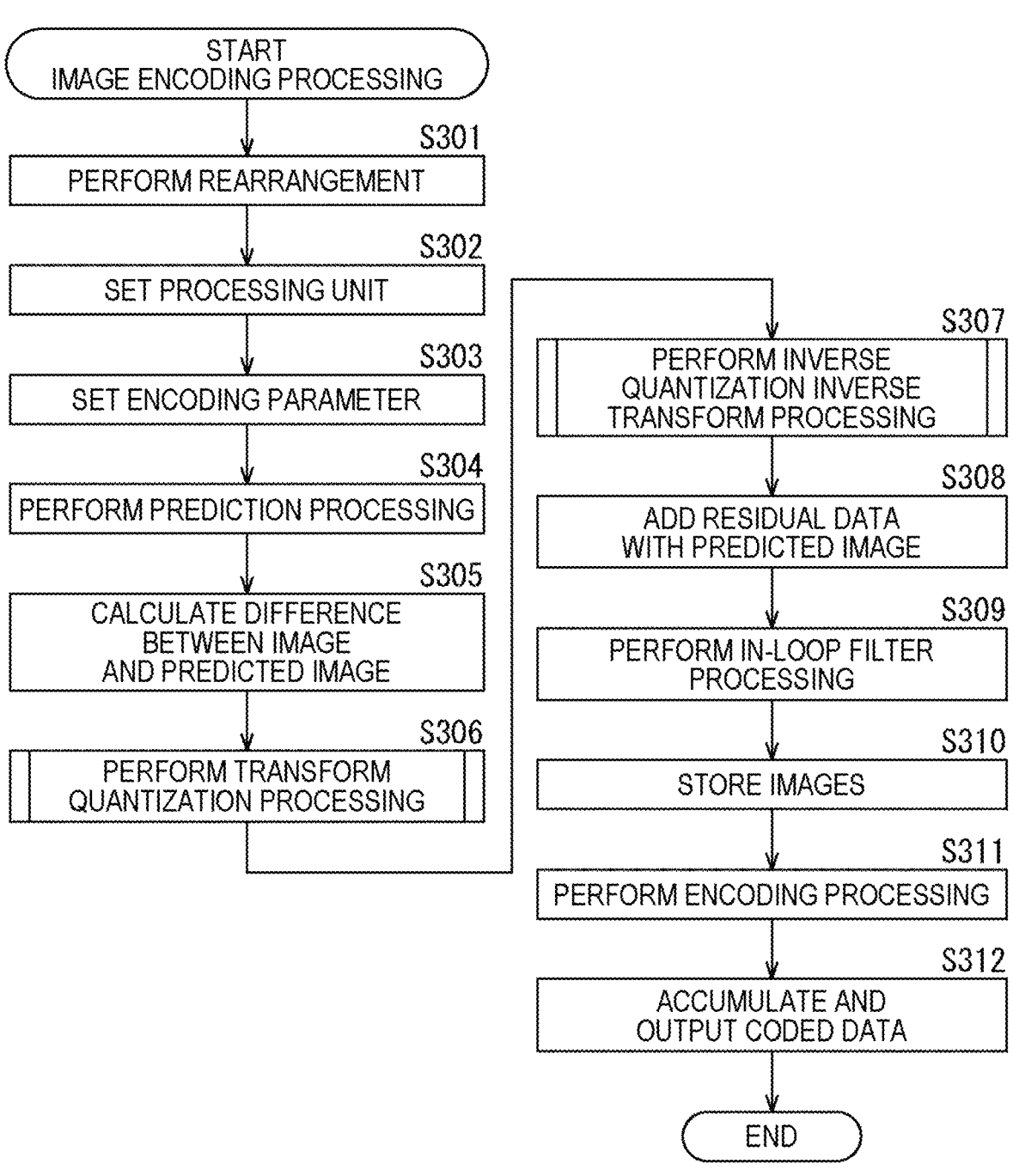
FIG. 13 is a flowchart illustrating an example of a flow of image encoding processing.

When the processing of step S343 ends, the processing returns to FIG. 13.

<Flow of Quantization Processing>

Next, an example of a flow of the quantization processing executed in step S343 of FIG. 14 will be described with reference to the flowchart of FIG. 15.

When the quantization processing is started, in step S351, the quantization parameter correction unit 351 executes the quantization parameter correction processing, corrects the quantization parameter, and generates the corrected quantization parameter.

In step S352, the quantization processing unit 352 quantizes the orthogonally transformed coefficient data coef_x generated in step S342 (FIG. 14) using the corrected quantization parameter generated in step S351 to generate the quantized coefficient data qcoef_x.

Figure 14:
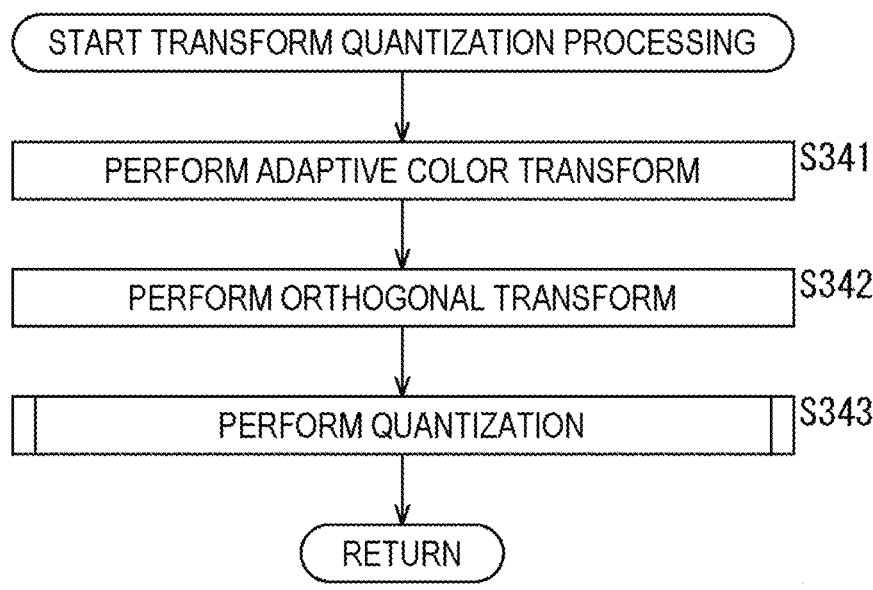
FIG. 14 is a flowchart for describing an example of a flow of transform quantization processing.
Figure 15:
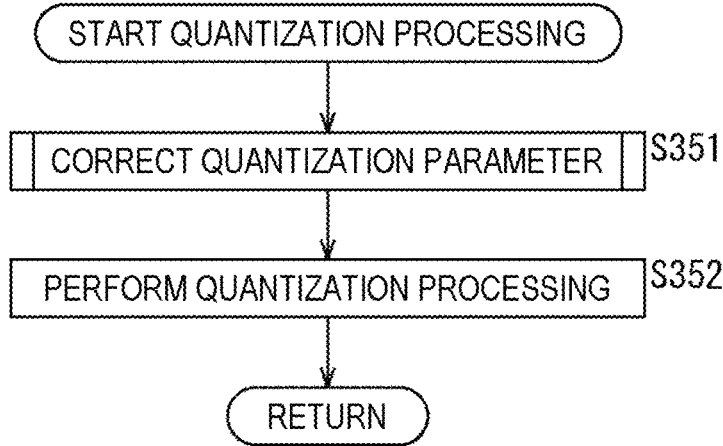
FIG. 15 is a flowchart for describing an example of a flow of quantization processing.

When the processing of step S352 ends, the quantization processing ends, and the processing returns to FIG. 14.

The present technology described in <1. Correction of Quantization Parameter>, <2. First Embodiment>, <3. Second Embodiment>, <4. Third Embodiment>, and <5. Fourth Embodiment> can be applied to such quantization processing.

That is, in a case where the present technology is applied in the above quantization processing, in step S351, the quantization parameter correction unit 351 corrects the quantization parameter on the basis of the parameter regarding adaptive color transform and further corrects the quantization parameter on the basis of the parameter regarding transform skip. In step S352, the quantization processing unit 352 quantizes the coefficient data of an image to be encoded by using the corrected quantization parameter that is the quantization parameter that has been corrected.

For example, in the case of applying the above-described "method 1", the quantization parameter correction unit 351 applies the quantization parameter correction processing described with reference to the flowchart in FIG. 3 as the quantization parameter correction processing in step S351. That is, the quantization parameter correction unit 351 executes calculation as in the expression (5) or the expression (6) to generate the second corrected quantization parameter qP".

By doing so, the quantization parameter correction unit 351 can correct the quantization parameter so that the quantization step size Δ<1 is avoided in the quantization when the adaptive color transform and the transform skip are applied. Therefore, the quantization processing unit 352 quantizes the coefficient data of an image using the quantization parameter corrected in this way, so that the quantization unit 343 (transform quantization unit 313) can suppress the reduction in the PSNR. Therefore, the image encoding device 300 can suppress the reduction in the encoding efficiency.

For example, in the case of applying the above-described "method 2", the quantization parameter correction unit 351 applies the quantization parameter correction processing described with reference to the flowchart in FIG. 5 as the quantization parameter correction processing in step S351. That is, the quantization parameter correction unit 351 executes calculation as in the expression (5) or the expression (13) to generate the second corrected quantization parameter qP".

By doing so, the quantization parameter correction unit 351 can correct the quantization parameter so that the quantization step size Δ<1 is avoided in the quantization, regardless of whether or not the transform skip is applied, in the case where the adaptive color transform is applied. Therefore, the quantization processing unit 352 quantizes the coefficient data of an image using the quantization parameter corrected in this way, so that the quantization unit 343 (transform quantization unit 313) can suppress the reduction in the PSNR. Therefore, the image encoding device 300 can suppress the reduction in the encoding efficiency.

For example, in the case of applying the above-described "method 3", the quantization parameter correction unit 351 applies the quantization parameter correction processing described with reference to the flowchart in FIG. 7 as the quantization parameter correction processing in step S351. That is, the quantization parameter correction unit 351 executes calculation as in the expression (16) or the expression (17) to generate the third corrected quantization parameter qP'''.

By doing so, the value of the corrected quantization parameter falls within a range of a minimum value to a maximum value of the quantization parameter, regardless of whether or not the transform skip is applied. In the case of transform skip, the lower limit of the quantization parameter is further clipped with the minimum value OpPrimeTsMin of the quantization parameter at the time of the transform skip. That is, the quantization parameter correction unit 351 can correct the quantization parameter so that the quantization step size Δ<1 is avoided in the quantization, regardless of whether or not the transform skip is applied, in the case where the adaptive color transform is applied. Therefore, the quantization processing unit 352 quantizes the coefficient data of an image using the quantization parameter corrected in this way, so that the quantization unit 343 (transform quantization unit 313) can suppress the reduction in the PSNR. Therefore, the image encoding device 300 can suppress the reduction in the encoding efficiency.

For example, in the case of applying the above-described "method 4", the quantization parameter correction unit 351 applies the quantization parameter correction processing described with reference to the flowchart in FIG. 9 as the quantization parameter correction processing in step S351. That is, the quantization parameter correction unit 351 executes calculation as in the expression (18) or the expression (17) to generate the second corrected quantization parameter qP''.

That is, in the case of the method 4, calculation substantially similar to the case of the method 3 is executed, and a similar correction result is obtained. Therefore, even in this case, the quantization parameter can be corrected so that the quantization step size Δ<1 is avoided in the quantization, regardless of whether or not the transform skip is applied, in the case where the adaptive color transform is applied, similarly to the case of the method 3. Therefore, the quantization processing unit 352 quantizes the coefficient data of an image using the quantization parameter corrected in this way, so that the quantization unit 343 (transform quantization unit 313) can suppress the reduction in the PSNR. Therefore, the image encoding device 300 can suppress the reduction in the encoding efficiency.

<Encoding>

Note that, in step S311 in FIG. 13, the encoding unit 314 encodes the various encoding parameters (header information Hinfo, prediction mode information Pinfo, and transform information Tinfo). In a case where the present technology is applied, the encoding unit 314 encodes the above-described various parameters to be applied to the correction of the quantization parameter as the encoding parameters. For example, in the case of applying the "method 1", the encoding unit 314 encodes parameters such as the quantization parameter qPx at the CU level corresponding to the component identifier cIdx, cu_act_enabled_flag, the correction amount dqPx corresponding to the component identifier cIdx, transform_skip_flag[xTbY][yTbY][cIdx] corresponding to the component identifier cIdx, and the minimum value OpPrimeTsMin of the quantization parameter at the time of transform skip. Furthermore, in the case of applying the "method 2", the encoding unit 314 encodes the minimum value "0" of the quantization parameter at the time of non-transform skip, in addition to the parameters to be encoded in the case of applying the "method 1". Moreover, in the case of applying the "method 3" or the "method 4", the encoding unit 314 encodes the correction amount QpBdOffset corresponding to the bit depth, in addition to the parameters to be encoded in the case of applying the "method 1".

By doing so, these pieces of information are signaled, so that the decoding side device can suppress the reduction in the PSNR. Therefore, the decoding-side device can implement suppression of reduction in the encoding efficiency.

7. Sixth Embodiment

<Image Decoding Device>

The present technology (various methods) described above can also be applied to an image decoding device that decodes coded data of image data.

Figure 16:
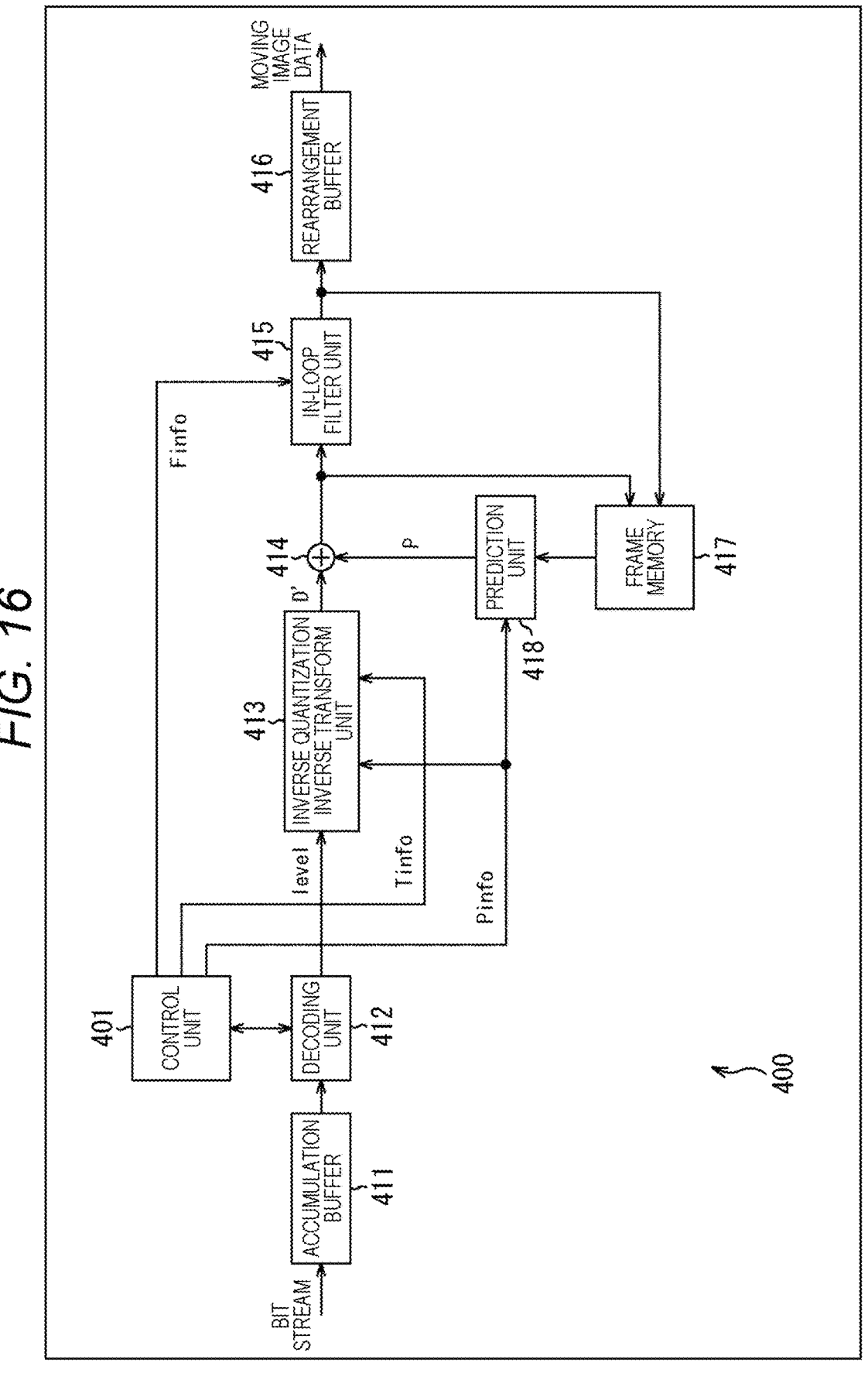
FIG. 16 is a block diagram illustrating a main configuration example of an image decoding device.

FIG. 16 is a block diagram illustrating an example of a configuration of an image decoding device as one aspect of an image processing device to which the present technology is applied. An image decoding device 400 illustrated in FIG. 16 is a device that decodes coded data of a moving image. For example, the image decoding device 400 decodes coded data of a moving image encoded by an encoding method such as VVC, AVC, or HEVC described in the above-described Non-Patent Documents. For example, the image decoding device 400 can decode coded data (bitstream) generated by the above-described image encoding device 300 (FIG. 10).

Note that FIG. 16 illustrates main processing units, data flows, and the like, and those illustrated in FIG. 16 are not necessarily everything. That is, in the image decoding device 400, there may be a processing unit not illustrated as a block in FIG. 16, or processing or data flow not illustrated as an arrow or the like in FIG. 16. This is similar in other drawings for describing a processing unit and the like in the image decoding device 400.

As illustrated in FIG. 16, the image decoding device 400 includes a control unit 401, an accumulation buffer 411, a decoding unit 412, an inverse quantization inverse transform unit 413, a calculation unit 414, an in-loop filter unit 415, a rearrangement buffer 416, a frame memory 417, and a prediction unit 418. Note that the prediction unit 418 includes an intra prediction unit and an inter prediction unit (not illustrated).

<Control Unit>

The control unit 401 executes processing regarding decoding control. For example, the control unit 401 acquires encoding parameters (header information Hinfo, prediction mode information Pinfo, transform information Tinfo, residual information Rinfo, filter information Finfo, and the like) included in the bitstream via the decoding unit 412. Furthermore, the control unit 401 can estimate encoding parameters not included in the bitstream. Moreover, the control unit 401 controls the processing units (the accumulation buffer 411 to the prediction unit 418) of the image decoding device 400 on the basis of the acquired (or estimated) encoding parameters to control decoding.

For example, the control unit 401 supplies the header information Hinfo to the inverse quantization inverse transform unit 413, the prediction unit 418, and the in-loop filter unit 415. Furthermore, the control unit 401 supplies the prediction mode information Pinfo to the inverse quantization inverse transform unit 413 and the prediction unit 418. Moreover, the control unit 401 supplies the transform information Tinfo to the inverse quantization inverse transform unit 413. Furthermore, the control unit 401 supplies the residual information Rinfo to the decoding unit 412. Moreover, the control unit 401 supplies the filter information Finfo to the in-loop filter unit 415.

Of course, the above example is an example, and the present embodiment is not limited to this example. For example, each encoding parameter may be supplied to an arbitrary processing unit. Furthermore, other information may be supplied to an arbitrary processing unit.

<Header Information Hinfo>

The header information Hinfo includes, for example, header information such as a video parameter set (VPS), a sequence parameter set (SPS), a picture parameter set (PPS), a picture header (PH), and a slice header (SH). The header information Hinfo includes, for example, information defining image size (width PicWidth and height PicHeight), bit depth (luminance bitDepthY and chrominance bitDepthC), a chrominance array type ChromaArrayType, CU size maximum value MaxCUSize and minimum value MinCUSize, maximum depth MaxQTDepth and minimum depth MinQT-Depth of quad-tree division, maximum depth MaxBTDepth and minimum depth MinBTDepth of binary-tree division, a maximum value MaxTSSize of a transform skip block (also called maximum transform skip block size), an on/off flag of each coding tool (also called enabled flag), and the like.

For example, an example of the on/off flag of the coding tool included in the header information Hinfo includes an on/off flag related to transform and quantization processing below. Note that the on/off flag of the coding tool can also be interpreted as a flag indicating whether or not a syntax related to the coding tool exists in the coded data. Furthermore, a case where the value of the on/off flag is 1 (true) indicates that the coding tool is available. A case where the value of the on/off flag is 0 (false) indicates that the coding tool is unavailable. Note that the interpretation of the flag value may be reversed.

<Prediction Mode Information Pinfo>

The prediction mode information Pinfo includes, for example, information such as size information PBSize (prediction block size) of a prediction block (PB) to be processed, intra prediction mode information IPinfo, and motion prediction information MVinfo.

The intra prediction mode information IPinfo includes, for example, prev_intra_luma_pred_flag, mpm_idx, and rem_intra_pred_mode in JCTVC-W1005, 7.3.8.5 Coding Unit syntax, a luminance intra prediction mode IntraPred-ModeY derived from the syntax, and the like.

Furthermore, the intra prediction mode information IPinfo can include, for example, an inter-component prediction flag (ccp_flag (cclmp_flag)), a multi-class linear prediction mode flag (mclm_flag), a chrominance sample position type identifier (chroma_sample_loc_type_idx), a chrominance MPM identifier (chroma_mpm_idx), a luminance intra prediction mode (IntraPredModeC) derived from these syntaxes, and the like.

The inter-component prediction flag (ccp_flag (cclmp_flag)) is flag information indicating whether or not to apply inter-component linear prediction. For example, ccp_flag==1 indicates that inter-component prediction is applied, and ccp_flag==0 indicates that the inter-component prediction is not applied.

The multi-class linear prediction mode flag (mclm_flag) is information regarding a linear prediction mode (linear prediction mode information). More specifically, the multi-class linear prediction mode flag (mclm_flag) is flag information indicating whether or not to set a multi-class linear prediction mode. For example, "0" indicates one-class mode (single class mode) (for example, CCLMP), and "1" indicates two-class mode (multi-class mode) (for example, MCLMP).

The chrominance sample position type identifier (chroma_sample_loc_type_idx) is an identifier for identifying a type of a pixel position of a chrominance component (also referred to as a chrominance sample position type).

Note that the chrominance sample position type identifier (chroma_sample_loc_type_idx) is transmitted as (by being stored in) information (chroma_sample_loc_info ( )) regarding the pixel position of the chrominance component.

The chrominance MPM identifier (chroma_mpm_idx) is an identifier indicating which prediction mode candidate in a chrominance intra prediction mode candidate list (intraPredModeCandListC) is to be specified as a chrominance intra prediction mode.

The motion prediction information MVinfo can include, for example, information such as merge_idx, merge_flag, inter_pred_idc, ref_idx_LX, mvp_lX_flag, X={0, 1}, mvd, and the like (see, for example, JCTVC-W1005, 7.3.8.6 Prediction Unit Syntax).

Of course, the information included in the prediction mode information Pinfo is arbitrary, and information other than the above information may be included.

<Transform Information Tinfo>

The transform information Tinfo can include, for example, the following information:

the width TBWSize and the height TBHSize of the transform block to be processed: logarithmic values log 2TBWSize and log 2TBHSize of TBWSize and TBH-Size having a base of 2;

a transform_skip_flag (ts_flag): a flag indicating whether or not to skip (inverse) primary transform and (inverse) secondary transform;

a scan identifier (scanIdx);

a quantization parameter (qp); and a quantization matrix (scaling matrix): for example, JCTVC-W1005, 7.3.4 Scaling list data syntax.

Of course, the information included in the transform information Tinfo is arbitrary, and information other than the above information may be included:

<Residual Information Rinfo>

The residual information Rinfo (for example, see 7.3.8.11 Residual Coding syntax of JCTVC-W1005) can include, for example, the following information:

cbf (coded_block_flag): a residual data presence/absence flag;

last_sig_coeff_x_pos: a last nonzero coefficient X coordinate;

last_sig_coeff_y_pos: a last nonzero coefficient Y coordinate;

coded_sub_block_flag: a subblock nonzero coefficient presence/absence flag;

sig_coeff_flag: a nonzero coefficient presence/absence flag;

gr1_flag: a flag indicating whether or not the level of the nonzero coefficient is larger than 1 (also referred to as GR1 flag); gr2_flag: a flag indicating whether or not the level of the nonzero coefficient is larger than 2 (also referred to as GR2 flag); sign flag: a sign indicating positive or negative of the nonzero coefficient (also referred to as sign code); and coeff_abs level remaining: a residual level of the nonzero coefficient (also called a nonzero coefficient residual level).

Of course, the information included in the residual information Rinfo is arbitrary, and information other than the above information may be included.

<Filter Information Finfo>

The filter information Finfo can include, for example, control information regarding the following filtering processing:

control information regarding a deblocking filter (DBF);

control information regarding a pixel adaptive offset (SAO);

control information regarding an adaptive loop filter (ALF); and control information regarding other linear and nonlinear filters.

Furthermore, for example, the filter information Finfo may include a picture to which each filter is applied, information for specifying an area in the picture, filter on/off control information for each CU, filter on/off control information for slice and tile boundaries, and the like. Of course, the information included in the filter information Finfo is arbitrary, and information other than the above information may be included.

<Accumulation Buffer 22>

The accumulation buffer 411 acquires the bitstream input to the image decoding device 400 and holds (stores) the bitstream. The accumulation buffer 411 extracts the coded data included in the accumulated bitstream and supplies the coded data to the decoding unit 412 at predetermined timing or in a case where a predetermined condition is satisfied.

<Decoding Unit>

The decoding unit 412 executes processing regarding image decoding. For example, the decoding unit 412 acquires the coded data supplied from the accumulation buffer 411, performs entropy decoding (lossless decoding) for a syntax value of each syntax element from the bit string according to a definition of a syntax table, and derives encoding parameters.

The encoding parameters may include, for example, information such as the header information Hinfo, prediction mode information Pinfo, transform information Tinfo, residual information Rinfo, and filter information Finfo. That is, the decoding unit 412 decodes and parses (analyzes and acquires) such information from the bitstream.

The decoding unit 412 executes such processing (decoding, parsing, and the like) under the control of the control unit 401, and supplies the obtained information to the control unit 401.

Moreover, the decoding unit 412 decodes the coded data by reference to the residual information Rinfo. At that time, the decoding unit 412 applies entropy decoding (lossless decoding) such as CABAC or CAVLC, for example. That is, the decoding unit 412 decodes the coded data by a decoding method corresponding to the encoding method of the encoding processing executed by the encoding unit 314 of the image encoding device 300.

For example, CABAC is assumed to be applied. The decoding unit 412 performs arithmetic decoding using a context model for the coded data and derives quantized coefficient data level at each coefficient position in each transformation block. The decoding unit 412 supplies the derived quantized coefficient data level to the inverse quantization inverse transform unit 413.

<Inverse Quantization Inverse Transform Unit>

The inverse quantization inverse transform unit 413 executes processing regarding inverse quantization and inverse coefficient transform. For example, the inverse quantization inverse transform unit 413 acquires the quantized coefficient data level supplied from the decoding unit 412. The inverse quantization inverse transform unit 413 acquires the encoding parameters such as the prediction mode information Pinfo and the transform information Tinfo supplied from the control unit 401.

The inverse quantization inverse transform unit 413 executes inverse quantization inverse transform processing for the quantized coefficient data level on the basis of the encoding parameters such as the prediction mode information Pinfo and the transform information Tinfo to derive residual data D'. This inverse quantization inverse transform processing is inverse processing of the transform quantization processing executed in the transform quantization unit 313. That is, in the inverse quantization inverse transform processing, for example, processing such as inverse quantization, inverse orthogonal transform, and inverse adaptive color transform are executed. The inverse quantization is inverse processing of the quantization executed in the transform quantization unit 313. The inverse orthogonal transform is inverse processing of the orthogonal transform executed in the transform quantization unit 313. The inverse adaptive color transform is inverse processing of the adaptive color transform executed in the transform quantization unit 313. Of course, the processing included in the inverse quantization inverse transform processing is arbitrary, and some of the above-described pieces of processing may be omitted, or processing other than the above-described processing may be included. The inverse quantization inverse transform unit 413 supplies the derived residual data D' to the calculation unit 414.

<Calculation Unit>

The calculation unit 414 executes processing regarding addition of information regarding an image. For example, the calculation unit 414 acquires the residual data D' supplied from the inverse quantization inverse transform unit 413 and a predicted image supplied from the prediction unit 418. The calculation unit 414 adds the residual data and the predicted image (predicted signal) corresponding to the residual data to derive a locally decoded image. The calculation unit 414 supplies the derived locally decoded image to the in-loop filter unit 415 and the frame memory 417.

<In-Loop Filter Unit>

The in-loop filter unit 415 executes processing regarding in-loop filter processing. For example, the in-loop filter unit 415 acquires the locally decoded image supplied from the calculation unit 414. The in-loop filter unit 415 acquires the filter information Finfo supplied from the control unit 401. Note that the information input to the in-loop filter unit 415 is arbitrary, and information other than the aforementioned information may be input.

The in-loop filter unit 415 appropriately executes filter processing for the locally decoded image on the basis of the filter information Finfo. For example, the in-loop filter unit 415 can apply a bilateral filter as the filter processing. For example, the in-loop filter unit 415 can apply a deblocking filter (DBF) as the filter processing. For example, the in-loop filter unit 415 can apply an adaptive offset filter (sample adaptive offset (SAO)) as the filter processing. For example, the in-loop filter unit 415 can apply an adaptive loop filter (ALF) as the filter processing. Furthermore, the in-loop filter unit 415 can apply a plurality of filters in combination as the filter processing. Note that which filter is applied and in which order the filters are applied are arbitrary and can be selected as appropriate. For example, the in-loop filter unit 415 applies four in-loop filters of the bilateral filter, the deblocking filter, the adaptive offset filter, and the adaptive loop filter in this order as the filter processing.

The in-loop filter unit 415 executes the filter processing corresponding to the filter processing executed by the encoding-side device (for example, the in-loop filter unit 318 of the image encoding device 300). Of course, the filter processing executed by the in-loop filter unit 415 is arbitrary and is not limited to the above example. For example, the in-loop filter unit 415 may apply a Wiener filter or the like.

The in-loop filter unit 415 supplies the filtered locally decoded image to the rearrangement buffer 416 and the frame memory 417.

<Rearrangement Buffer>

The rearrangement buffer 416 receives the locally decoded image supplied from the in-loop filter unit 415 as an input, and holds (stores) the locally decoded image. The rearrangement buffer 416 reconstructs a decoded image for each picture, using locally decoded image, and holds (stores in the buffer) the decoded image. The rearrangement buffer 416 rearranges the obtained decoded images from a decoding order to a reproduction order. The rearrangement buffer 416 outputs a rearranged decoded image group to the outside of the image decoding device 400 as moving image data.

<Frame Memory>

The frame memory 417 executes processing regarding storage of data related to an image. For example, the frame memory 417 acquires the locally decoded image supplied from the calculation unit 414, reconstructs the decoded image for each picture, and stores the decoded image in the buffer in the frame memory 417.

Furthermore, the frame memory 417 acquires the locally decoded image that has undergone the in-loop filter processing supplied from the in-loop filter unit 415, reconstructs the decoded image for each picture, and stores the decoded image in the buffer in the frame memory 417. The frame memory 417 appropriately supplies the stored decoded image (or a part thereof) to the prediction unit 418 as a reference image.

Note that the frame memory 417 may store the header information Hinfo, the prediction mode information Pinfo, the transform information Tinfo, the filter information Finfo, and the like related to generation of the decoded image.

<Prediction Unit>

The prediction unit 418 executes processing regarding generation of a predicted image. For example, the prediction unit 418 acquires the prediction mode information Pinfo supplied from the control unit 401. Furthermore, the prediction unit 418 acquires the decoded image (or a part thereof) read from the frame memory 417. The prediction unit 418 executes prediction processing in a prediction mode adopted at the time of encoding on the basis of the prediction mode information Pinfo, and generates a predicted image by referring to the decoded image as a reference image. The prediction unit 418 supplies the generated predicted image to the calculation unit 414.

<Application of Present Technology>

The present technology described in <1. Correction of Quantization Parameter>, <2. First Embodiment>, <3. Second Embodiment>, <4. Third Embodiment>, and <5. Fourth Embodiment> can be applied to the image decoding device 400 having the above configuration.

<Decoding Unit>

As described above, the decoding unit 412 parses the encoding parameters such as the header information Hinfo, the prediction mode information Pinfo, the transform information Tinfo, the residual information Rinfo, and the filter information Finfo from the bitstream.

Therefore, in a case where the present technology is applied, the decoding unit 412 decodes the bitstream, and parses parameters to be used for correction of the quantization parameter supplied from the encoding-side device (for example, the image encoding device 300).

For example, in a case of applying "method 1", the decoding unit 412 parses the parameters such as a quantization parameter qPx at a CU level corresponding to a component identifier cIdx, cu_act_enabled_flag, a correction amount dqPx corresponding to the component identifier cIdx, transform_skip_flag[xTbY][yTbY][cIdx] corresponding to the component identifier cIdx, and a minimum value OpPrimeTsMin of a quantization parameter at the time of transform skip. Furthermore, in a case of applying "method 2", the decoding unit 412 parses a minimum value "0" of the quantization parameter at the time of non-transform skip, in addition to the parameters to be encoded in the case of applying the "method 1". Furthermore, in a case of applying "method 3" or the "method 4", the decoding unit 412 parses a correction amount QpBdOffset corresponding to a bit depth, in addition to the parameters to be encoded in the case of applying the "method 1".

<Control Unit>

For example, in the case of applying the "method 1", the control unit 401 acquires the quantization parameter qPx at the CU level corresponding to the component identifier cIdx from the decoding unit 412, and supplies the quantization parameter qPx to the inverse quantization inverse transform unit 413. The control unit 401 acquires cu_act_enabled_flag from the decoding unit 412 as a parameter regarding adaptive color transform, and supplies the cu_act_enabled_flag to the inverse quantization inverse transform unit 413. The control unit 401 acquires the correction amount dqPx corresponding to the component identifier cIdx from the decoding unit 412 as the parameter regarding adaptive color transform, and supplies the correction amount dqPx to the inverse quantization inverse transform unit 413. The control unit 401 acquires transform_skip_flag[xTbY][yTbY][cIdx] corresponding to the component identifier cIdx from the decoding unit 412 as a parameter regarding transform skip, and supplies the transform_skip_flag[xTbY][yTbY][cIdx] to the inverse quantization inverse transform unit 413. The control unit 401 acquires the minimum value OpPrimeTsMin of the quantization parameter at the time of transform skip from the decoding unit 412 as the parameter regarding transform skip, and supplies the minimum value OpPrimeTsMin to the inverse quantization inverse transform unit 413.

For example, in the case of applying the "method 2", the control unit 401 supplies the parameters to be supplied in the case of applying the "method 1" to the inverse quantization inverse transform unit 413. In addition to these parameters, the control unit 401 supplies the minimum value "0" of the quantization parameter at the time of non-transform skip to the inverse quantization inverse transform unit 413 as the parameter regarding transform skip.

For example, in the case of applying the "method 3", the control unit 401 supplies the parameters to be supplied in the case of applying the "method 1" to the inverse quantization inverse transform unit 413. In addition to these parameters, the control unit 401 supplies the correction amount QpBdOffset corresponding to the bit depth to the inverse quantization inverse transform unit 413.

For example, in the case of applying the "method 4", the control unit 401 supplies the parameters to be supplied in the case of applying the "method 3" to the inverse quantization inverse transform unit 413.

<Inverse Quantization Inverse Transform Unit>

For example, in the case of applying the above-described "method 1", the inverse quantization inverse transform unit 413 acquires the quantization parameter qPx at the CU level corresponding to the component identifier cIdx supplied from the control unit 401. Furthermore, the inverse quantization inverse transform unit 413 acquires cu_act_enabled_ flag supplied from the control unit 401 as the parameter regarding the adaptive color transform. The inverse quantization inverse transform unit 413 acquires the correction amount dqPx corresponding to the component identifier cIdx supplied from the control unit 401 as the parameter regarding the adaptive color transform. Moreover, the inverse quantization inverse transform unit 413 acquires transform_skip_flag[xTbY][yTbY][cIdx] corresponding to the component identifier cIdx supplied from the control unit 401 as the parameter regarding the transform skip. The inverse quantization inverse transform unit 413 acquires the minimum value OpPrimeTsMin of the quantization parameter at the time of transform skip supplied from the control unit 401 as the parameter regarding the transform skip. The inverse quantization inverse transform unit 413 executes inverse quantization inverse transform processing using the acquired parameters.

For example, in the case of applying the above-described "method 2", the inverse quantization inverse transform unit 413 acquires the quantization parameter qPx at the CU level corresponding to the component identifier cIdx supplied from the control unit 401. Furthermore, the inverse quantization inverse transform unit 413 acquires cu_act_enabled_ flag supplied from the control unit 401 as the parameter regarding the adaptive color transform. The inverse quantization inverse transform unit 413 acquires the correction amount dqPx corresponding to the component identifier cIdx supplied from the control unit 401 as the parameter regarding the adaptive color transform. Moreover, the inverse quantization inverse transform unit 413 acquires transform_skip_flag[xTbY][yTbY][cIdx] corresponding to the component identifier cIdx supplied from the control unit 401 as the parameter regarding the transform skip. The inverse quantization inverse transform unit 413 acquires the minimum value OpPrimeTsMin of the quantization parameter at the time of transform skip supplied from the control unit 401 as the parameter regarding the transform skip. The inverse quantization inverse transform unit 413 acquires the minimum value "0" of the quantization parameter at the time of non-transform skip supplied from the control unit 401 as the parameter regarding transform skip. The inverse quantization inverse transform unit 413 executes inverse quantization inverse transform processing using the acquired parameters.

For example, in the case of applying the above-described "method 3", the inverse quantization inverse transform unit 413 acquires the quantization parameter qPx at the CU level corresponding to the component identifier cIdx supplied from the control unit 401. Furthermore, the inverse quantization inverse transform unit 413 acquires cu_act_enabled_ flag supplied from the control unit 401 as the parameter regarding the adaptive color transform. The inverse quantization inverse transform unit 413 acquires the correction amount dqPx corresponding to the component identifier cIdx supplied from the control unit 401 as the parameter regarding the adaptive color transform. Moreover, the inverse quantization inverse transform unit 413 acquires transform_skip_flag[xTbY][yTbY][cIdx] corresponding to the component identifier cIdx supplied from the control unit 401 as the parameter regarding the transform skip. The inverse quantization inverse transform unit 413 acquires the minimum value OpPrimeTsMin of the quantization parameter at the time of transform skip supplied from the control unit 401 as the parameter regarding the transform skip. The inverse quantization inverse transform unit 413 acquires the correction amount QpBdOffset corresponding to the bit depth supplied from the control unit 401 as the parameter regarding transform skip. The inverse quantization inverse transform unit 413 executes inverse quantization inverse transform processing using the acquired parameters.

For example, in the case of applying the above-described "method 4", the inverse quantization inverse transform unit 413 acquires the same parameters as those acquired in the case of applying the "method 3". The inverse quantization inverse transform unit 413 executes inverse quantization inverse transform processing using the acquired parameters.

Configuration Example of Inverse Quantization Inverse Transform Unit

Figure 17:
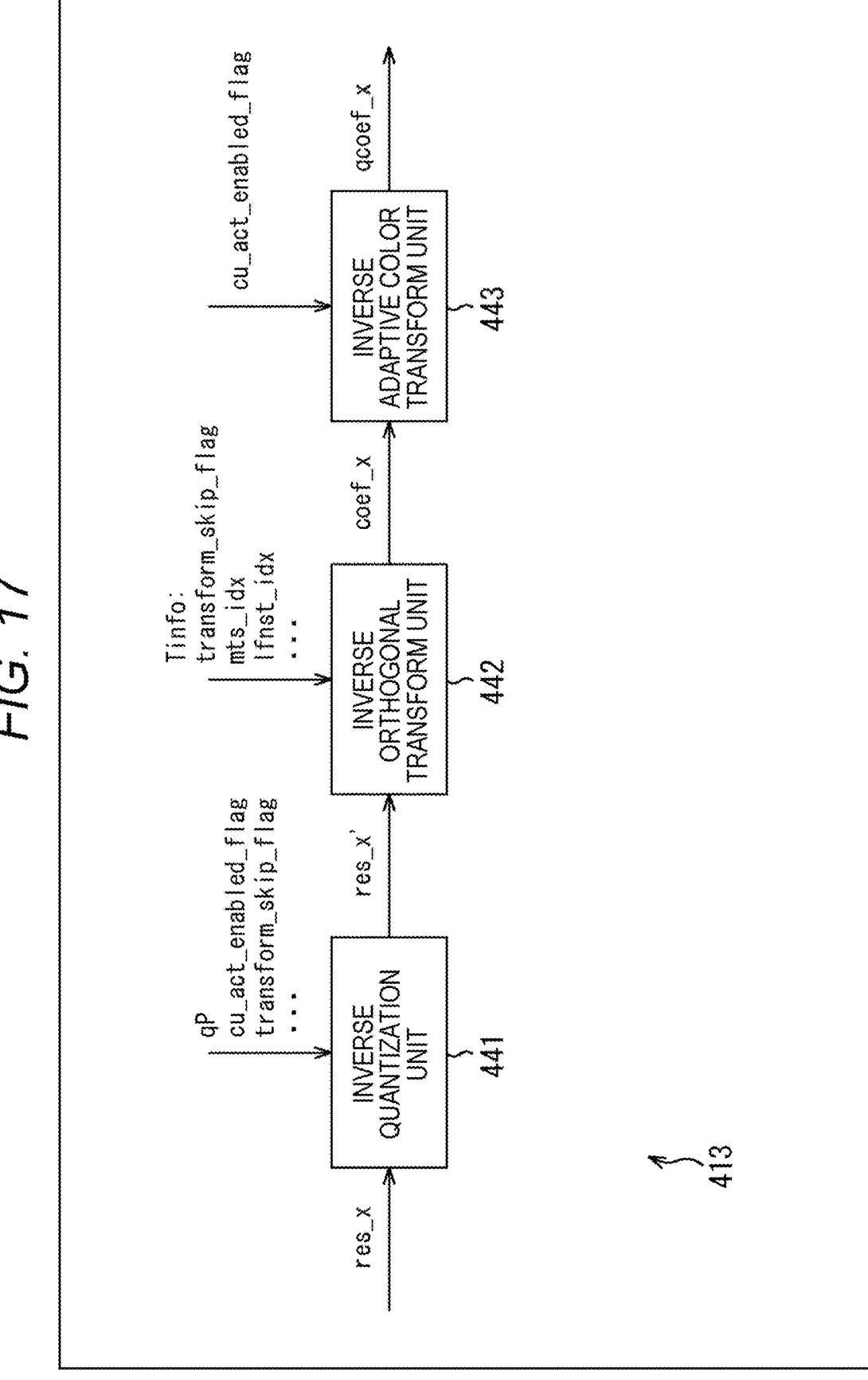
FIG. 17 is a block diagram illustrating a main configuration example of an inverse quantization inverse transform unit.

FIG. 17 is a block diagram illustrating a main configuration example of the inverse quantization inverse transform unit 413 in FIG. 16. As illustrated in FIG. 17, the inverse quantization inverse transform unit 413 includes an inverse quantization unit 441, an inverse orthogonal transform unit 442, and an inverse adaptive color transform unit 443.

The inverse quantization unit 441 executes processing regarding inverse quantization. For example, the inverse quantization unit 441 acquires quantized coefficient data qcoeff_x (that is, the quantized coefficient data level in FIG. 16) supplied from the decoding unit 412. The inverse quantization unit 441 inversely quantizes the quantized coefficient data qcoeff_x to generate orthogonally transformed coefficient data coef_x. The inverse quantization unit 441 supplies the generated orthogonally transformed coefficient data coef_x to the inverse orthogonal transform unit 442.

The inverse orthogonal transform unit 442 executes processing regarding inverse orthogonal transform. For example, the inverse orthogonal transform unit 442 acquires the orthogonally transformed coefficient data coeff_x supplied from the inverse quantization unit 441. The inverse orthogonal transform unit 442 acquires the transform information Tinfo and the prediction mode information Pinfo supplied from the control unit 401. For example, the inverse orthogonal transform unit 442 can acquire information such as transform_skip_flag, mts_idx, and lfnst_idx as the transform information Tinfo. The inverse orthogonal transform unit 442 inversely orthogonally transforms the orthogonally transformed coefficient data coeff_x using the acquired information to generate adaptive color transform coefficient data res_x'. The inverse orthogonal transform unit 442 supplies the generated adaptive color transform coefficient data res_x' to the inverse adaptive color transform unit 443.

The inverse adaptive color transform unit 443 executes processing regarding inverse adaptive color transform. For example, the inverse adaptive color transform unit 443 acquires the adaptive color transform coefficient data res_x' supplied from the inverse orthogonal transform unit 442. The inverse adaptive color transform unit 443 acquires cu_act_enabled_flag supplied from the control unit 401. The inverse adaptive color transform unit 443 executes adaptive color transform for the residual data res_x on the basis of the value of cu_act_enabled_flag. For example, in a case where cu_act_enabled_flag is true (for example, "1"), the inverse adaptive color transform unit 443 executes calculation as in the above-described expression (2) and performs YCgCo- RGB transform for the adaptive color transform coefficient data res_x' including components of Y, Cg, and Co. By the processing, the residual data res_x (that is, the residual data D in FIG. 10) including the components of R, G, and B is generated. The inverse adaptive color transform unit 443 supplies the generated residual data res_x to the calculation unit 414.

For example, in the case of applying the above-described "method 1", the inverse quantization unit 441 acquires the quantization parameter qPx at the CU level corresponding to the component identifier cIdx supplied from the control unit 401. Furthermore, the inverse quantization unit 441 acquires cu_act_enabled_flag supplied from the control unit 401 as the parameter regarding the adaptive color transform. The inverse quantization unit 441 acquires the correction amount dqPx corresponding to the component identifier cIdx supplied from the control unit 401 as the parameter regarding the adaptive color transform. Moreover, the inverse quantization unit 441 acquires transform_skip_flag[xTbY][yTbY][cIdx] corresponding to the component identifier cIdx supplied from the control unit 401 as the parameter regarding the transform skip. The inverse quantization unit 441 acquires the minimum value OpPrimeTsMin of the quantization parameter at the time of transform skip supplied from the control unit 401 as the parameter regarding the transform skip.

The inverse quantization unit 441 inversely quantizes the quantized coefficient data qcoef_x using the acquired parameters to generate orthogonally transformed coefficient data coeff_x.

For example, in the case of applying the above-described "method 2", the inverse quantization unit 441, the inverse quantization unit 441 acquires the quantization parameter qPx at the CU level corresponding to the component identifier cIdx supplied from the control unit 401. Furthermore, the inverse quantization unit 441 acquires cu_act_enabled_flag supplied from the control unit 401 as the parameter regarding the adaptive color transform. The inverse quantization unit 441 acquires the correction amount dqPx corresponding to the component identifier cIdx supplied from the control unit 401 as the parameter regarding the adaptive color transform. Moreover, the inverse quantization unit 441 acquires transform_skip_flag[xTbY][yTbY][cIdx] corresponding to the component identifier cIdx supplied from the control unit 401 as the parameter regarding the transform skip. The inverse quantization unit 441 acquires the minimum value QpPrimeTsMin of the quantization parameter at the time of transform skip supplied from the control unit 401 as the parameter regarding the transform skip. The inverse quantization unit 441 acquires the minimum value "0" of the quantization parameter at the time of non-transform skip supplied from the control unit 401 as the parameter regarding transform skip.

The inverse quantization unit 441 inversely quantizes the quantized coefficient data qcoef_x using the acquired parameters to generate orthogonally transformed coefficient data coeff_x.

For example, in the case of applying the above-described "method 3", the inverse quantization unit 441, the inverse quantization unit 441 acquires the quantization parameter qPx at the CU level corresponding to the component identifier cIdx supplied from the control unit 401. Furthermore, the inverse quantization unit 441 acquires cu_act_enabled_flag supplied from the control unit 401 as the parameter regarding the adaptive color transform. The inverse quantization unit 441 acquires the correction amount dqPx corresponding to the component identifier cIdx supplied from the control unit 401 as the parameter regarding the adaptive color transform. Moreover, the inverse quantization unit 441 acquires transform_skip_flag[xTbY][yTbY][cIdx] corresponding to the component identifier cIdx supplied from the control unit 401 as the parameter regarding the transform skip. The inverse quantization unit 441 acquires the minimum value OpPrimeTsMin of the quantization parameter at the time of transform skip supplied from the control unit 401 as the parameter regarding the transform skip. The inverse quantization unit 441 acquires the correction amount QpBdOffset corresponding to the bit depth supplied from control unit 401 as the parameter regarding transform skip.

The inverse quantization unit 441 inversely quantizes the quantized coefficient data qcoef_x using the acquired parameters to generate orthogonally transformed coefficient data coeff_x.

For example, in the case of applying the above-described "method 4", the inverse quantization unit 441 acquires the same parameters as those acquired in the case of applying the "method 3". The inverse quantization unit 441 inversely quantizes the quantized coefficient data qcoef_x using the acquired parameters to generate orthogonally transformed coefficient data coeff_x.

Configuration Example of Inverse Quantization Unit

Figure 18:
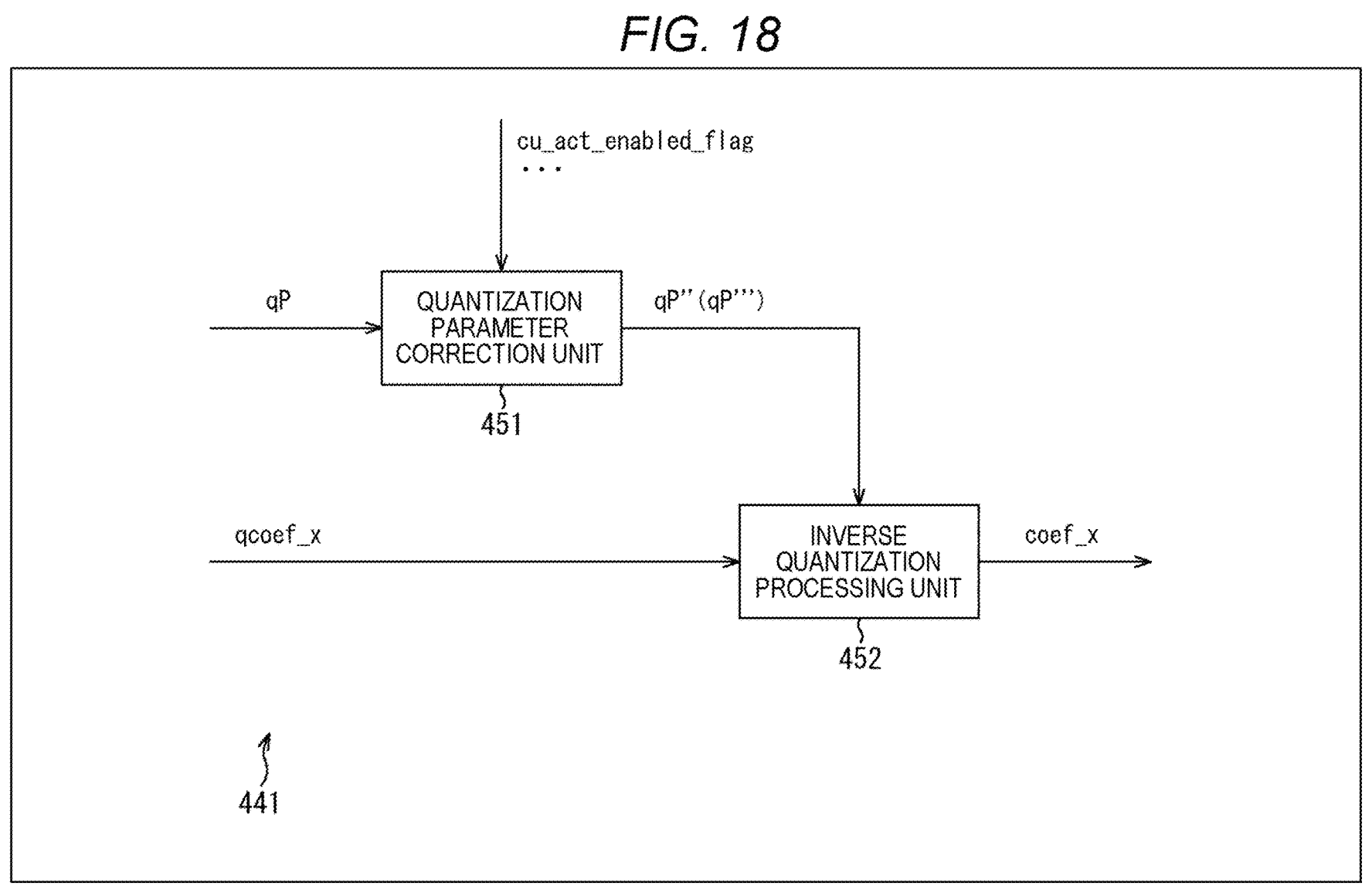

FIG. 18 is a block diagram illustrating a main configuration example of the inverse quantization unit 441 of FIG. 17. As illustrated in FIG. 18, the inverse quantization unit 441 includes a quantization parameter correction unit 451 and an inverse quantization processing unit 452.

The quantization parameter correction unit 451 executes processing regarding correction of the quantization parameter. For example, the quantization parameter correction unit 451 acquires the quantization parameter qPx at the CU level corresponding to the component identifier cIdx. The quantization parameter correction unit 451 corrects the quantization parameter qPx at the CU level corresponding to the component identifier cIdx and supplies the corrected quantization parameter that is the quantization parameter after correction to the inverse quantization processing unit 452.

The inverse quantization processing unit 452 executes processing regarding inverse quantization. For example, the inverse quantization processing unit 452 acquires the quantized coefficient data qcoef_x supplied from the decoding unit 412. The inverse quantization processing unit 452 acquires the corrected quantization parameter supplied from the quantization parameter correction unit 451. The inverse quantization processing unit 452 inversely quantizes the quantized coefficient data qcoef_x using the corrected quantization parameter to generate the orthogonally transformed coefficient data coef_x. The inverse quantization processing unit 452 supplies the generated orthogonally transformed coefficient data coef_x to the inverse orthogonal transform unit 442.

In a case where the present technology is applied in the inverse quantization unit 441 having the above-described configuration, the quantization parameter correction unit 451 corrects the quantization parameter on the basis of the parameter regarding adaptive color transform and further corrects the quantization parameter on the basis of the parameter regarding transform skip. The inverse quantization processing unit 452 inversely quantizes the quantized coefficient data obtained by quantizing the coefficient data of an image, using the corrected quantization parameter that is the quantization parameter corrected by the quantization parameter correction unit 451.

For example, in the case of applying the above-described "method 1", the quantization parameter correction device 100 (FIG. 2) is applied as the quantization parameter correction unit 451. That is, the quantization parameter correction unit 451 acquires the quantization parameter qPx at the CU level corresponding to the component identifier cIdx supplied from the control unit 401. Furthermore, the quantization parameter correction unit 451 acquires cu_act_enabled_flag supplied from the control unit 401 as the parameter regarding the adaptive color transform. The quantization parameter correction unit 451 acquires the correction amount dqPx corresponding to the component identifier cIdx supplied from the control unit 401 as the parameter regarding the adaptive color transform. The quantization parameter correction unit 451 acquires transform_skip_flag[xTbY][yTbY][cIdx] corresponding to the component identifier cIdx supplied from the control unit 401 as the parameter regarding the transform skip. The quantization parameter correction unit 451 acquires the minimum value OpPrimeTsMin of the quantization parameter at the time of transform skip supplied from the control unit 401 as the parameter regarding the transform skip.

The quantization parameter correction unit 451 corrects qPx by a method as described in the first embodiment, using the acquired cu_act_enabled_flag, dqPx, transform_skip_flag[xTbY][yTbY][cIdx], and OpPrimeTsMin. That is, the quantization parameter correction unit 451 executes calculation as in the expression (5) or the expression (6) to generate the second corrected quantization parameter qP". The quantization parameter correction unit 451 supplies the generated second corrected quantization parameter qP" to the inverse quantization processing unit 452.

By doing so, the quantization parameter correction unit 451 can correct the quantization parameter so that the quantization step size Δ<1 is avoided in the inverse quantization when the adaptive color transform and the transform skip are applied. Therefore, the inverse quantization processing unit 452 inversely quantizes the quantized coefficient data using the quantization parameter corrected in this manner, so that the inverse quantization unit 441 (inverse quantization inverse transform unit 413) can suppress the reduction in the PSNR. Therefore, the image decoding device 400 can suppress the reduction in the encoding efficiency.

For example, in the case of applying the above-described "method 2", the quantization parameter correction device 100 (FIG. 2) is applied as the quantization parameter correction unit 451. That is, the quantization parameter correction unit 451 acquires the quantization parameter qPx at the CU level corresponding to the component identifier cIdx supplied from the control unit 401. Furthermore, the quantization parameter correction unit 451 acquires cu_act_enabled_flag supplied from the control unit 401 as the parameter regarding the adaptive color transform. The quantization parameter correction unit 451 acquires the correction amount dqPx corresponding to the component identifier cIdx supplied from the control unit 401 as the parameter regarding the adaptive color transform. The quantization parameter correction unit 451 acquires transform_skip_flag[xTbY][yTbY][cIdx] corresponding to the component identifier cIdx supplied from the control unit 401 as the parameter regarding the transform skip. The quantization parameter correction unit 451 acquires the minimum value OpPrimeTsMin of the quantization parameter at the time of transform skip supplied from the control unit 401 as the parameter regarding the transform skip. The quantization parameter correction unit 451 acquires the minimum value "0" of the quantization parameter at the time of non-transform skip supplied from the control unit 401 as the parameter regarding transform skip.

The quantization parameter correction unit 451 corrects qPx by a method as described in the second embodiment, using the cu_act_enabled_flag, dqPx, transform_skip_flag[xTbY][yTbY][cIdx], QpPrimeTsMin, and the value "0". That is, the quantization parameter correction unit 451 executes calculation as in the expression (5) or the expression (13) to generate the second corrected quantization parameter qP". The quantization parameter correction unit 451 supplies the generated second corrected quantization parameter qP" to the inverse quantization processing unit 452.

By doing so, the quantization parameter correction unit 451 can correct the quantization parameter so that the quantization step size Δ<1 is avoided in the inverse quantization, regardless of whether or not the transform skip is applied in the inverse quantization, in the case where the adaptive color transform is applied. Therefore, the inverse quantization processing unit 452 inversely quantizes the quantized coefficient data using the quantization parameter corrected in this manner, so that the inverse quantization suppress the reduction in the PSNR. Therefore, the image decoding device 400 can suppress the reduction in the encoding efficiency.

For example, in the case of applying the above-described "method 3", the quantization parameter correction device 100 (FIG. 2) is applied as the quantization parameter correction unit 451. That is, the quantization parameter correction unit 451 acquires the quantization parameter qPx at the CU level corresponding to the component identifier cIdx supplied from the control unit 401. Furthermore, the quantization parameter correction unit 451 acquires cu_act_enabled_flag supplied from the control unit 401 as the parameter regarding the adaptive color transform. The quantization parameter correction unit 451 acquires the correction amount dqPx corresponding to the component identifier cIdx supplied from the control unit 401 as the parameter regarding the adaptive color transform. The quantization parameter correction unit 451 acquires transform_skip_flag[xTbY][yTbY][cIdx] corresponding to the component identifier cIdx supplied from the control unit 401 as the parameter regarding the transform skip. The quantization parameter correction unit 451 acquires the minimum value OpPrimeTsMin of the quantization parameter at the time of transform skip supplied from the control unit 401 as the parameter regarding the transform skip. The quantization parameter correction unit 451 acquires the correction amount QpBdOffset corresponding to the bit depth supplied from the control unit 401 as the parameter regarding transform skip.

The quantization parameter correction unit 451 corrects qPx by a method as described in the second embodiment, using the cu_act_enabled_flag, dqPx, transform_skip_flag[xTbY][yTbY][cIdx], OpPrimeTsMin, and QpBdOffset. That is, the quantization parameter correction unit 451 executes calculation as in the expression (16) or the expression (17) to generate the third corrected quantization parameter qP'''. The quantization parameter correction unit 451 supplies the generated third corrected quantization parameter qP''' to the inverse quantization processing unit 452.

By doing so, the value of the corrected quantization parameter falls within a range of a minimum value to a maximum value of the quantization parameter, regardless of whether or not the transform skip is applied. Furthermore, in the case of transform skip, the lower limit of the quantization parameter is further clipped with the minimum value OpPrimeTsMin of the quantization parameter at the time of the transform skip. That is, the quantization parameter correction unit 451 can correct the quantization parameter so that the quantization step size Δ<1 is avoided in the inverse quantization, regardless of whether or not the transform skip is applied, in the case where the adaptive color transform is applied. Therefore, the inverse quantization processing unit 452 inversely quantizes the quantized coefficient data using the quantization parameter corrected in this manner, so that the inverse quantization unit 441 (inverse quantization inverse transform unit 413) can suppress the reduction in the PSNR. Therefore, the image decoding device 400 can suppress the reduction in the encoding efficiency.

For example, in the case of applying the above-described "method 4", the quantization parameter correction device 160 (FIG. 8) is applied as the quantization parameter correction unit 451. That is, the quantization parameter correction unit 451 acquires parameters similar to those in the case of the "method 3".

The quantization parameter correction unit 451 corrects qPx by a method as described in the fourth embodiment, using the acquired parameters (cu_act_enabled_flag, dqPx, transform_skip_flag[xTbY][yTbY][cIdx], OpPrimeTsMin, and QpBdOffset). That is, the quantization parameter correction unit 451 executes calculation as in the expression (18) or the expression (17) to generate the second corrected quantization parameter qP". The quantization parameter correction unit 451 supplies the generated second corrected quantization parameter qP" to the inverse quantization processing unit 452.

That is, in the case of the method 4, calculation substantially similar to the case of the method 3 is executed, and a similar correction result is obtained. Therefore, even in this case, the quantization parameter correction unit 451 can correct the quantization parameter so that the quantization step size Δ<1 is avoided in the inverse quantization, regardless of whether or not the transform skip is applied, in the case where the adaptive color transform is applied, similarly to the case of the method 3. Therefore, the inverse quantization processing unit 452 inversely quantizes the quantized coefficient data using the quantization parameter corrected in this manner, so that the inverse quantization unit 441 (inverse quantization inverse transform unit 413) can suppress the reduction in the PSNR. Therefore, the image decoding device 400 can suppress the reduction in the encoding efficiency.

The description of the inverse quantization inverse transform unit 413 described in the present embodiment can also be applied to the inverse quantization inverse transform unit 316 of the image encoding device 300. Note that, in that case, a supply source of the encoding parameter is the control unit 301. Furthermore, the supply source of the quantized coefficient data is the transform quantization unit 313. Moreover, a supply destination of the residual data D' is the calculation unit 317.

<Flow of Image Decoding Processing>

Next, a flow of each processing executed by the above image decoding device 400 will be described. First, an example of a flow of image decoding processing will be described with reference to the flowchart in FIG. 19.

When the image decoding processing is started, in step S401, the accumulation buffer 411 acquires and holds (accumulates) the bitstream (coded data) supplied from the outside of the image decoding device 400.

In step S402, the decoding unit 412 executes the decoding processing. For example, the decoding unit 412 parses (analyzes and acquires) the various encoding parameters (for example, header information Hinfo, prediction mode information Pinfo, transform information Tinfo, and the like) from the bitstream. The control unit 401 supplies the acquired various encoding parameters to the various processing units to set the various encoding parameters.

Furthermore, the control unit 401 sets the unit of processing on the basis of the obtained encoding parameters. Moreover, the decoding unit 412 decodes the bitstream according to the control of the control unit 401 to obtain the quantized coefficient data level.

In step S403, the inverse quantization inverse transform unit 413 executes the inverse quantization inverse transform processing to generate the residual data D'. The inverse quantization inverse transform processing will be described below.

In step S404, the prediction unit 418 generates a predicted image. For example, the prediction unit 418 executes the prediction processing by a prediction method designated by the encoding side on the basis of the encoding parameters and the like set in step S402, and generates the predicted image P by referring to the reference image stored in the frame memory 417.

In step S405, the calculation unit 414 adds the residual data D' obtained in step S403 and the predicted image P obtained in step S404 to derive a locally decoded image Rlocal.

In step S406, the in-loop filter unit 415 executes the in-loop filter processing for the locally decoded image Rlocal obtained by the processing of step S405.

In step S407, the rearrangement buffer 416 derives the decoded image R using the locally decoded image Rlocal filtered by the processing in step S406, and rearranges the decoded image R group from the decoding order to the reproduction order. The decoded image R group rearranged in the reproduction order is output to the outside of the image decoding device 400 as a moving image.

Furthermore, in step S408, the frame memory 417 stores at least one of the locally decoded image Rlocal obtained by the processing in step S405 or the locally decoded image Rlocal filtered by the processing in step S406.

When the processing in step S408 ends, the image decoding processing ends.

<Flow of Inverse Quantization Inverse Transform Processing>

Next, an example of a flow of the inverse quantization inverse transform processing executed in step S403 of FIG. 19 will be described with reference to the flowchart of FIG. 20.

When the inverse quantization inverse transform processing is started, in step S441, the inverse quantization unit 441 inversely quantizes the quantized coefficient data qcoef_x using the transform information Tinfo and the like set in step S402 (FIG. 19) to generate the orthogonally transformed coefficient data coef_x. The quantized coefficient data qcoef_x corresponds to the quantized coefficient data level generated in the processing of step S402 of FIG. 19.

In step S442, the inverse orthogonal transform unit 442 inversely orthogonally transforms the orthogonally transformed coefficient data coef_x generated in step S441, using the transform information Tinfo and the like set in step S402 (FIG. 19), to generate the adaptive color transform coefficient data res_x'.

In step S443, the inverse adaptive color transform unit 443 performs inverse adaptive color transform for the adaptive color transform coefficient data res_x' generated in step S442 on the basis of cu_act_enabled_flag set in step S402 (FIG. 19) to generate the residual data res_x (residual data D').

Figure 19:
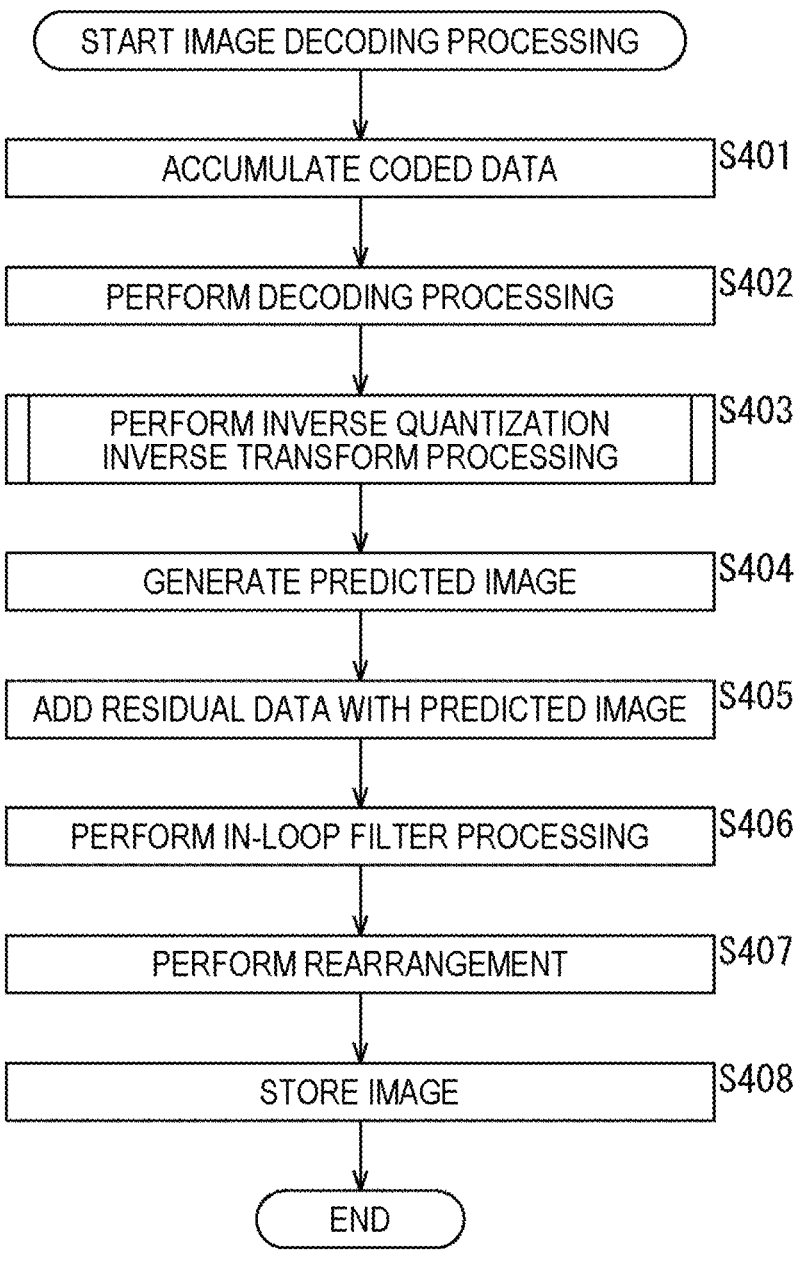
FIG. 19 is a flowchart illustrating an example of a flow of image decoding processing.

When the processing of step S443 ends, the inverse quantization inverse transform processing ends, and the processing returns to FIG. 19.

<Flow of Quantization Processing>

Next, an example of a flow of the inverse quantization processing executed in step S441 of FIG. 20 will be described with reference to the flowchart of FIG. 21.

When the inverse quantization processing is started, in step S451, the quantization parameter correction unit 451 executes the quantization parameter correction processing, corrects the quantization parameter, and generates the corrected quantization parameter.

In step S452, the inverse quantization processing unit 452 inversely quantizes the quantized coefficient data qcoef_x using the corrected quantization parameter generated in step S451 to generate the orthogonally transformed coefficient data coef_x.

Figure 20:
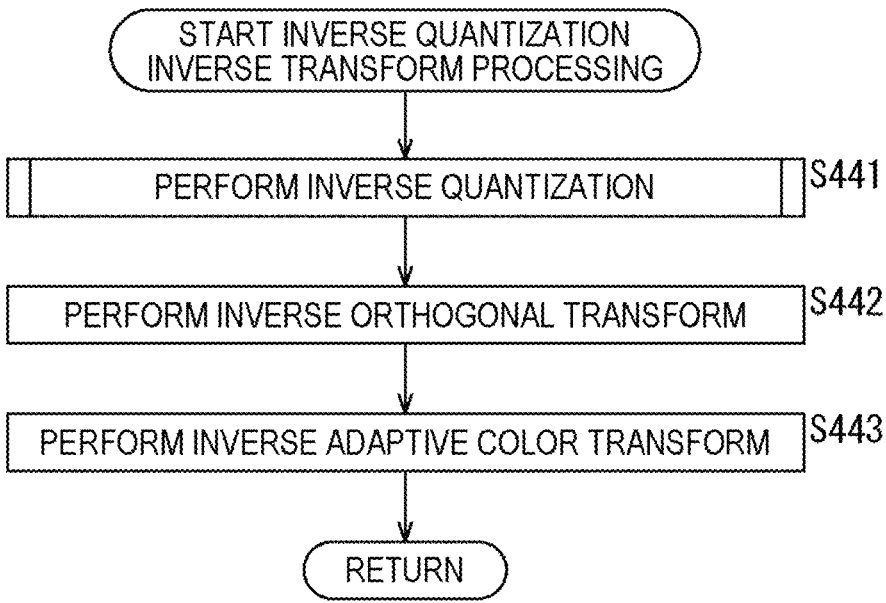
FIG. 20 is a flowchart illustrating an example of a flow of inverse quantization inverse transform processing.
Figure 21:
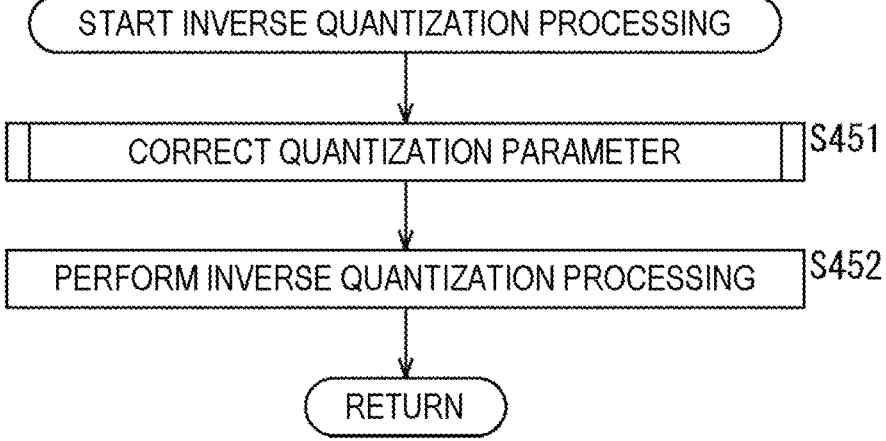
FIG. 21 is a flowchart illustrating an example of a flow of inverse quantization processing.

When the processing of step S452 ends, the inverse quantization processing ends, and the processing returns to FIG. 20.

The present technology described in <1. Correction of Quantization Parameter>, <2. First Embodiment>, <3. Second Embodiment>, <4. Third Embodiment>, and <5. Fourth Embodiment> can be applied to such inverse quantization processing.

That is, in a case where the present technology is applied in the above inverse quantization processing, in step S451, the quantization parameter correction unit 451 corrects the quantization parameter on the basis of the parameter regarding adaptive color transform and further corrects the quantization parameter on the basis of the parameter regarding transform skip. In step S452, the inverse quantization processing unit 452 inversely quantizes the quantized coefficient data obtained by quantizing the coefficient data of an image, using the corrected quantization parameter that is the quantization parameter that has been corrected.

For example, in the case of applying the above-described "method 1", the quantization parameter correction unit 451 applies the quantization parameter correction processing described with reference to the flowchart in FIG. 3 as the quantization parameter correction processing in step S351. That is, the quantization parameter correction unit 451 executes calculation as in the expression (5) or the expression (6) to generate the second corrected quantization parameter qP".

By doing so, the quantization parameter correction unit 451 can correct the quantization parameter so that the quantization step size $\Delta<1$ is avoided in the inverse quantization when the adaptive color transform and the transform skip are applied. Therefore, the inverse quantization processing unit 452 inversely quantizes the quantized coefficient data using the quantization parameter corrected in this manner, so that the inverse quantization suppress the reduction in the PSNR. Therefore, the image decoding device 400 can suppress the reduction in the encoding efficiency.

For example, in the case of applying the above-described "method 2", the quantization parameter correction unit 451 applies the quantization parameter correction processing described with reference to the flowchart in FIG. 5 as the quantization parameter correction processing in step S351. That is, the quantization parameter correction unit 451 executes calculation as in the expression (5) or the expression (13) to generate the second corrected quantization parameter qP".

By doing so, the quantization parameter correction unit 451 can correct the quantization parameter so that the quantization step size $\Delta<1$ is avoided in the inverse quantization, regardless of whether or not the transform skip is applied in the inverse quantization, in the case where the adaptive color transform is applied. Therefore, the inverse quantization processing unit 452 inversely quantizes the quantized coefficient data using the quantization parameter corrected in this manner, so that the inverse quantization unit 441 (inverse quantization inverse transform unit 413) can suppress the reduction in the PSNR. Therefore, the image decoding device 400 can suppress the reduction in the encoding efficiency.

For example, in the case of applying the above-described "method 3", the quantization parameter correction unit 451 applies the quantization parameter correction processing described with reference to the flowchart in FIG. 7 as the quantization parameter correction processing in step S351. That is, the quantization parameter correction unit 451 executes calculation as in the expression (16) or the expression (17) to generate the third corrected quantization parameter qP"'.

By doing so, the value of the corrected quantization parameter falls within a range of a minimum value to a maximum value of the quantization parameter, regardless of whether or not the transform skip is applied. Furthermore, in the case of transform skip, the lower limit of the quantization parameter is further clipped with the minimum value OpPrimeTsMin of the quantization parameter at the time of the transform skip. That is, the quantization parameter correction unit 451 can correct the quantization parameter so that the quantization step size $\Delta<1$ is avoided in the inverse quantization, regardless of whether or not the transform skip is applied, in the case where the adaptive color transform is applied. Therefore, the inverse quantization processing unit 452 inversely quantizes the quantized coefficient data using the quantization parameter corrected in this manner, so that the inverse quantization unit 441 (inverse quantization inverse transform unit 413) can suppress the reduction in the PSNR. Therefore, the image decoding device 400 can suppress the reduction in the encoding efficiency.

For example, in the case of applying the above-described "method 4", the quantization parameter correction unit 451 applies the quantization parameter correction processing described with reference to the flowchart in FIG. 9 as the quantization parameter correction processing in step S351. That is, the quantization parameter correction unit 451 executes calculation as in the expression (18) or the expression (17) to generate the second corrected quantization parameter qP".

That is, in the case of the method 4, calculation substantially similar to the case of the method 3 is executed, and a similar correction result is obtained. Therefore, even in this case, the quantization parameter can be corrected so that the quantization step size $\Delta<1$ is avoided, regardless of whether or not the transform skip is applied, in the case where adaptive color transform is applied, similarly to the case of the method 3. Therefore, the inverse quantization processing unit 452 inversely quantizes the quantized coefficient data using the quantization parameter corrected in this manner, so that the inverse quantization unit 441 (inverse quantization inverse transform unit 413) can suppress the reduction in the PSNR. Therefore, the image decoding device 400 can suppress the reduction in the encoding efficiency.

<Decoding Unit>

Note that, in step S402 in FIG. 19, the decoding unit 412 decodes the various encoding parameters (header information Hinfo, prediction mode information Pinfo, and transform information Tinfo). Therefore, in a case where the present technology is applied, the decoding unit 412 decodes the above-described various parameters to be applied to the correction of the quantization parameter. For example, in the case of applying "method 1", the decoding unit 412 decodes the parameters such as the quantization parameter qPx at the CU level corresponding to the component identifier cIdx, cu_act_enabled_flag, the correction amount dqPx corresponding to the component identifier cIdx, transform_skip_flag[xTbY][yTbY][cIdx] corresponding to the component identifier cIdx, and the minimum value OpPrimeTsMin of the quantization parameter at the time of transform skip. Furthermore, in the case of applying the "method 2", the encoding unit 314 decodes the minimum value "0" of the quantization parameter at the time of non-transform skip, in addition to the parameters to be encoded in the case of applying the "method 1". Furthermore, in a case of applying the "method 3" or the "method 4", the encoding unit 314 decodes the correction amount QpBdOffset corresponding to the bit depth, in addition to the parameters to be encoded in the case of applying the "method 1".

By doing so, the image decoding device 400 can obtain the signaled information. Therefore, the image decoding device 400 can suppress the reduction in the PSNR. Therefore, the image decoding device 400 can implement suppression of the reduction in the encoding efficiency.

The description of the inverse quantization inverse transform process (step S403 in FIG. 19 and FIG. 20) described in the present embodiment can also be applied to the inverse quantization inverse transform processing (step S307) executed in the image encoding processing (FIG. 13).

8. Supplementary Note

<Computer>

The above-described series of processing can be executed by hardware or by software. In the case of executing the series of processing by software, a program that configures the software is installed in a computer. Here, the computer includes a computer incorporated in dedicated hardware, a computer, for example, general-purpose personal computer, capable of executing various functions by installing various programs, and the like.

FIG. 22 is a block diagram illustrating a configuration example of hardware of a computer that executes the above-described series of processing by a program.

In a computer 800 illustrated in FIG. 22, a central processing unit (CPU) 801, a read only memory (ROM) 802, and a random access memory (RAM) 803 are mutually connected by a bus 804.

An input/output interface 810 is also connected to the bus 804. An input unit 811, an output unit 812, a storage unit 813, a communication unit 814, and a drive 815 are connected to the input/output interface 810.

The input unit 811 includes, for example, a keyboard, a mouse, a microphone, a touch panel, an input terminal, and the like. The output unit 812 includes, for example, a display, a speaker, an output terminal, and the like. The storage unit 813 includes, for example, a hard disk, a RAM disk, a nonvolatile memory, and the like. The communication unit 814 includes, for example, a network interface. The drive 815 drives a removable medium 821 such as a magnetic disk, an optical disk, a magneto-optical disk, or a semiconductor memory.

In the computer configured as described above, the CPU 801 loads, for example, a program stored in the storage unit 813 into the RAM 803 and executes the program via the input/output interface 810 and the bus 804, so that the above-described series of processing is executed. Furthermore, the RAM 803 appropriately stores data and the like necessary for the CPU 801 to execute the various types of processing.

The program to be executed by the computer can be recorded and applied on the removable medium 821 as a package medium or the like, for example, and can be provided. In that case, the program can be installed to the storage unit 813 via the input/output interface 810 by attaching the removable medium 821 to the drive 815.

Furthermore, this program can be provided via a wired or wireless transmission medium such as a local area network, the Internet, or digital satellite broadcast. In that case, the program can be received by the communication unit 814 and installed in the storage unit 813.

Other than the above method, the program can be installed in the ROM 802 or the storage unit 813 in advance.

<Applicable Object of Present Technology>

The present technology can be applied to any image encoding method and decoding method. That is, specifications of various types of processing regarding image encoding/decoding such as transform (inverse transform), quantization (inverse quantization), encoding (decoding), and prediction are arbitrary and are not limited to the above-described examples as long as no contradiction occurs with the above-described present technology. Furthermore, part of the processing may be omitted as long as no contradiction occurs with the above-described present technology.

Furthermore, the present technology can be applied to a multi-view image encoding system that encodes a multi-view image including images of a plurality of viewpoints (views). Furthermore, the present technology can be applied to a multi-view image decoding system that decodes coded data of a multi-view image including images of a plurality of viewpoints (views). In this case, the present technology is simply applied to encoding and decoding of each viewpoint (view).

Moreover, the present technology can be applied to a hierarchical image encoding (scalable encoding) system that encodes a hierarchical image that is multi-layered (hierarchized) so as to have a scalability function for a predetermined parameter. Furthermore, the present technology can be applied to a hierarchical image decoding (scalable decoding) system that decodes coded data of a hierarchical image that is multi-layered (hierarchized) so as to have a scalability function for a predetermined parameter. In this case, the present technology is simply applied to encoding/decoding of each layer (layer).

Furthermore, although the quantization parameter correction device 100, the quantization parameter correction device 120, the quantization parameter correction device 140, the quantization parameter correction device 160, the image encoding device 300, and the image decoding device 400 have been described as application examples of the present technology, the present technology can be applied to an arbitrary configuration.

The present technology can be applied to, for example, various electron devices, such as transmitters and receivers (such as television receivers and mobile phones) in satellite broadcasting, cable broadcasting such as cable TV, distribution on the Internet, and distribution to terminals by cellular communication, or devices (for example, hard disk recorders and cameras) that record images on media such as optical disks, magnetic disks, and flash memories, and reproduce images from these storage media.

Furthermore, the present technology can be implemented as a configuration of a part of a device such as a processor (for example, a video processor) as a system large scale integration (LSI) or the like, a module (for example, a video module) using a plurality of processors or the like, a unit (for example, a video unit) using a plurality of modules or the like, or a set (for example, a video set) in which other functions are added to the unit (that is, a configuration of a part of the device).

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service regarding an image (moving image) to an arbitrary terminal such as a computer, an audio visual (AV) device, a portable information processing terminal, or an internet of things (IoT) device.

Note that, in this specification, the term "system" means a set of a plurality of configuration elements (devices, modules (parts), and the like), and whether or not all the configuration elements are in the same casing is irrelevant. Therefore, a plurality of devices housed in separate casings and connected via a network, and one device that houses a plurality of modules in one casing are both systems.

<Field and Application to which Present Technology is Applicable>

The systems, devices, processing units, and the like to which the present technology is applied can be used in arbitrary fields such as traffic, medical care, crime prevention, agriculture, livestock industry, mining, beauty, factory, household appliance, weather, and natural surveillance, for example. Furthermore, uses in the arbitrary fields are also arbitrary.

For example, the present technology can be applied to systems and devices provided for providing content for appreciation and the like. Furthermore, for example, the present technology can also be applied to systems and devices used for traffic, such as traffic condition monitoring and automatic driving control. Moreover, for example, the present technology can also be applied to systems and devices provided for security. Furthermore, for example, the present technology can be applied to systems and devices provided for automatic control of machines and the like. Moreover, for example, the present technology can also be applied to systems and devices provided for agriculture or livestock industry. Furthermore, the present technology can also be applied to systems and devices that monitor nature states such as volcanos, forests, and ocean, wildlife, and the like. Moreover, for example, the present technology can also be applied to systems and devices provided for sports.

<Others>

Note that the "flag" in the present specification is information for identifying a plurality of states, and includes not only information used for identifying two states of true (1) and false (0) but also information capable of identifying three or more states. Therefore, the value that the "flag" can take may be, for example, a binary value of I/O or may be a ternary value or more. That is, the number of bits constituting the "flag" is arbitrary, and may be 1 bit or a plurality of bits. Furthermore, the identification information (including flag) is assumed to be in not only a form of including the identification information in a bitstream but also a form of including difference information of the identification information from certain reference information in a bitstream. Therefore, in the present specification, the "flag" and "identification information" include not only the information itself but also the difference information for the reference information.

Furthermore, various types of information (metadata and the like) regarding coded data (bitstream) may be transmitted or recorded in any form as long as the various types of information are associated with the coded data. Here, the term "associate" means that, for example, one data can be used (linked) when the other data is processed. That is, data associated with each other may be collected as one data or may be individual data. For example, information associated with coded data (image) may be transmitted on a transmission path different from that of the coded data (image). Furthermore, for example, information associated with coded data (image) may be recorded on a different recording medium (or another recording area of the same recording medium) from the coded data (image). Note that this "association" may be a part of data instead of entire data. For example, an image and information corresponding to the image may be associated with each other in an arbitrary unit such as a plurality of frames, one frame, or a part in a frame.

Note that, in the present specification, terms such as "combining", "multiplexing", "adding", "integrating", "including", "storing", and "inserting" mean putting a plurality of things into one, such as putting coded data and metadata into one data, and means one method of the above-described "association".

Furthermore, embodiments of the present technology are not limited to the above-described embodiments, and various modifications can be made without departing from the gist of the present technology.

For example, the configuration described as one device (or processing unit) may be divided into and configured as a plurality of devices (or processing units). On the contrary, the configuration described as a plurality of devices (or processing units) may be collectively configured as one device (or processing unit). Furthermore, a configuration other than the above-described configuration may be added to the configuration of each device (or each processing unit). Moreover, a part of the configuration of a certain device (or processing unit) may be included in the configuration of another device (or another processing unit) as long as the configuration and operation of the system as a whole are substantially the same.

Furthermore, for example, the above-described program may be executed in an arbitrary device. In that case, the device is only required to have necessary functions (functional blocks and the like) and obtain necessary information.

Furthermore, for example, each step of one flowchart may be executed by one device, or may be shared and executed by a plurality of devices. Moreover, in a case where a plurality of processes is included in one step, the plurality of processes may be executed by one device, or may be shared and executed by a plurality of devices. In other words, the plurality of processes included in one step can be executed as processes of a plurality of steps. Conversely, the processing described as a plurality of steps can be collectively executed as one step.

Furthermore, the program executed by the computer may have the following characteristics. For example, the processing of steps describing the program may be executed in time series in the order described in the present specification.

Furthermore, pieces of the processing of steps describing the program may be executed in parallel. Moreover, the processing of steps describing the program may be individually executed at necessary timing such as when called. That is, the processing of each step may be executed in an order different from the above-described order as long as no contradiction occurs. Furthermore, processing of steps describing the program may be executed in parallel with processing of another program. Moreover, the processing of steps describing the program may be executed in combination with processing of another program.

Furthermore, for example, a plurality of techniques related to the present technology can be implemented independently as a single body as long as there is no contradiction. Of course, an arbitrary number of the present technologies can be implemented together. For example, part or whole of the present technology described in any of the embodiments can be implemented in combination with part or whole of the present technology described in another embodiment. Further, part or whole of the above-described arbitrary present technology can be implemented in combination with another technology not described above.

Note that the present technology can also have the following configurations.

(1) An image processing device including:

a quantization parameter correction unit configured to correct a quantization parameter on the basis of a parameter regarding adaptive color transform and further correct the quantization parameter on the basis of a parameter regarding transform skip; and a quantization unit configured to quantize coefficient data of an image to be encoded by using a corrected quantization parameter that is the quantization parameter corrected by the quantization parameter correction unit.

(2) The image processing device according to (1), in which, in a case of applying the adaptive color transform, the quantization parameter correction unit corrects the quantization parameter with a correction amount corresponding to a component to be processed.

(3) The image processing device according to (2), in which the correction amount is "0" in a case of not applying the adaptive color transform.

(4) The image processing device according to any one of (1) to (3), in which, in a case of applying the transform skip, the quantization parameter correction unit clips a lower limit of the quantization parameter corrected on the basis of the parameter regarding adaptive color transform with a preset minimum value of the quantization parameter of a case of applying the transform skip.

(5) The image processing device according to (4), in which, in a case of not applying the transform skip, the quantization parameter correction unit omits the clip of the lower limit of the quantization parameter corrected on the basis of the parameter regarding adaptive color transform.

(6) The image processing device according to any one of (1) to (5), in which, in a case of not applying the transform skip, the quantization parameter correction unit clips a lower limit of the quantization parameter corrected on the basis of the parameter regarding adaptive color transform with a preset minimum value of the quantization parameter.

(7) The image processing device according to (6), in which the minimum value of the quantization parameter is "0".

(8) The image processing device according to any one of (1) to (7), in which, in a case of applying the transform skip, the quantization parameter correction unit clips a lower limit of the quantization parameter corrected on the basis of the parameter regarding adaptive color transform with a preset minimum value of the quantization parameter of the case of applying the transform skip, and clips an upper limit of the quantization parameter corrected on the basis of the parameter regarding adaptive color transform with a preset sum of a maximum value of the quantization parameter and a correction amount based on a bit depth.

(9) The image processing device according to (8), in which, in a case of not applying the transform skip, the quantization parameter correction unit clips the lower limit of the quantization parameter corrected on the basis of the parameter regarding adaptive color transform with the preset minimum value of the quantization parameter, and clips the upper limit of the quantization parameter corrected on the basis of the parameter regarding adaptive color transform with the preset sum of a maximum value of the quantization parameter and a correction amount based on a bit depth.

(10) An image processing method including:

correcting a quantization parameter on the basis of a parameter regarding adaptive color transform and further correcting the quantization parameter on the basis of a parameter regarding transform skip; and quantizing coefficient data of an image to be encoded by using a corrected quantization parameter that is the quantization parameter that has been corrected.

(11) An image processing device including:

a quantization parameter correction unit configured to correct a quantization parameter on the basis of a parameter regarding adaptive color transform and further correct the quantization parameter on the basis of a parameter regarding transform skip; and an inverse quantization unit configured to inversely quantize quantized coefficient data that is obtained by quantizing coefficient data of an image by using a corrected quantization parameter that is the quantization parameter corrected by the quantization parameter correction unit.

(12) The image processing device according to (11), in which, in a case of applying the adaptive color transform, the quantization parameter correction unit corrects the quantization parameter with a correction amount corresponding to a component to be processed.

(13) The image processing device according to (12), in which the correction amount is "0" in a case of not applying the adaptive color transform.

(14) The image processing device according to any one of (11) to (13), in which, in a case of applying the transform skip, the quantization parameter correction unit clips a lower limit of the quantization parameter corrected on the basis of the parameter regarding adaptive color transform with a preset minimum value of the quantization parameter of a case of applying the transform skip.

(15) The image processing device according to (14), in which, in a case of not applying the transform skip, the quantization parameter correction unit omits the clip of the lower limit of the quantization parameter corrected on the basis of the parameter regarding adaptive color transform.

(16) The image processing device according to any one of (11) to (15), in which, in a case of not applying the transform skip, the quantization parameter correction unit clips a lower limit of the quantization parameter corrected on the basis of the parameter regarding adaptive color transform with a preset minimum value of the quantization parameter.

(17) The image processing device according to (16), in which the minimum value of the quantization parameter is "0".

(18) The image processing device according to any one of (11) to (17), in which, in a case of applying the transform skip, the quantization parameter correction unit clips a lower limit of the quantization parameter corrected on the basis of the parameter regarding adaptive color transform with a preset minimum value of the quantization parameter of the case of applying the transform skip, and clips an upper limit of the quantization parameter corrected on the basis of the parameter regarding adaptive color transform with a preset sum of a maximum value of the quantization parameter and a correction amount based on a bit depth.

(19) The image processing device according to (18), in which, in a case of not applying the transform skip, the quantization parameter correction unit clips the lower limit of the quantization parameter corrected on the basis of the parameter regarding adaptive color transform with the preset minimum value of the quantization parameter, and clips the upper limit of the quantization parameter corrected on the basis of the parameter regarding adaptive color transform with the preset sum of a maximum value of the quantization parameter and a correction amount based on a bit depth.

(20) An image processing method including:

correcting a quantization parameter on the basis of a parameter regarding adaptive color transform and further correcting the quantization parameter on the basis of a parameter regarding transform skip; and inversely quantizing quantized coefficient data that is obtained by quantizing coefficient data of an image by using a corrected quantization parameter that is the quantization parameter that has been corrected.

REFERENCE SIGNS LIST

100 Quantization parameter correction device
101 First correction unit
102 Second correction unit
120 Quantization parameter correction device
121 First correction unit
122 Second correction unit
140 Quantization parameter correction device
141 First correction unit
142 Second correction unit
143 Third correction unit
160 Quantization parameter correction device
161 First correction unit
162 Second correction unit 300 Image encoding device
301 Control unit
313 Transform quantization unit
314 Encoding unit
341 Adaptive color transform unit
342 Orthogonal transform unit
343 Quantization unit
351 Quantization parameter correction unit
352 Quantization processing unit
400 Image decoding device
401 Control unit
412 Decoding unit
413 Inverse quantization inverse transform unit
441 Inverse quantization unit
442 Inverse orthogonal transform unit
443 Inverse adaptive color transform unit
451 Quantization parameter correction unit
452 Inverse quantization processing unit

The invention claimed is:

1. An image processing device comprising:
circuitry configured to
clip, as a minimum value of a quantization parameter of a case of applying the transform skip, a lower limit of a quantization parameter corrected on a basis of a parameter regarding adaptive color transform; and
quantize coefficient data of an image to be encoded by using a corrected quantization parameter that is the quantization parameter clipped by the quantization parameter correction unit.

2. The image processing device according to claim 1, wherein,
the circuitry is further configured to clip, as a sum of a maximum value of the quantization parameter and a correction amount based on a bit depth, an upper limit of the quantization parameter corrected on a basis of the parameter regarding adaptive color transform.

3. The image processing device according to claim 2, wherein,
the circuitry is further configured to clip, as a minimum value in a case of not applying the transform skip, clip the lower limit of the quantization parameter corrected on a basis of the parameter regarding adaptive color transform.

4. The image processing device according to claim 3, wherein,
the circuitry is configured to clip, as the sum of the maximum value of the quantization parameter and the correction amount based on the bit depth, the upper limit of the quantization parameter corrected on a basis of the parameter regarding adaptive color transform.

5. The image processing device according to claim 1, wherein,
the circuitry is further configured to correct according to a correction amount corresponding to a component to be processed.

6. The image processing device according to claim 5, wherein,
under a condition of not applying the transform skip, the correction amount is 0.

7. An image processing method comprising:
clipping, as a minimum value of a quantization parameter of a case of applying the transform skip, a lower limit of a quantization parameter corrected on a basis of a parameter regarding adaptive color transform; and
quantizing coefficient data of an image to be encoded by using a corrected quantization parameter that is the quantization parameter clipped by the clipping.

8. An image processing device comprising:

circuitry configured to clip, as a minimum value of a quantization parameter of a case of applying a transform skip, a lower limit of a quantization parameter corrected on a basis of a parameter regarding adaptive color transform; and inversely quantize quantized coefficient data that is obtained by quantizing coefficient data of an image by using a corrected quantization parameter that is the quantization parameter clipped by the circuitry.

9. The image processing device according to claim 8, wherein, the circuitry is further configured to clips, as a sum of a maximum value of the quantization parameter and a correction amount based on a bit depth, an upper limit of the quantization parameter corrected on a basis of the parameter regarding adaptive color transform.

10. The image processing device according to claim 9, wherein, the circuitry is configured to clip, as a minimum value in a case of not applying the transform skip, the lower limit of the quantization parameter corrected on a basis of the parameter regarding adaptive color transform.

11. The image processing device according to claim 10, wherein, the circuitry is configured to clip, as the sum of the maximum value of the quantization parameter and the correction amount based on the bit depth, the upper limit of the quantization parameter corrected on a basis of the parameter regarding adaptive color transform.

12. The image processing device according to claim 8, wherein, the circuitry is configured to correct according to a correction amount corresponding to a component to be processed.

13. The image processing device according to claim 12, wherein, under a condition of not applying the transform skip, the correction amount is 0.

14. An image processing method comprising:

clipping, as a minimum value of a quantization parameter of a case of applying a transform skip, a lower limit of a quantization parameter corrected on a basis of a parameter regarding adaptive color transform; and inversely quantizing quantized coefficient data that is obtained by quantizing coefficient data of an image by using a corrected quantization parameter that is the quantization parameter clipped by the clipping.

* * * * *